US011835246B2

(12) United States Patent
Chang et al.

(10) Patent No.: US 11,835,246 B2
(45) Date of Patent: Dec. 5, 2023

(54) MANAGING USER ACCOUNT PARTICIPATION IN EMISSIONS DEMAND RESPONSE EVENTS

(71) Applicant: Google LLC, Mountain View, CA (US)

(72) Inventors: Samuel Y. Chang, Mountain View, CA (US); Kristoffer J. Donhowe, Mountain View, CA (US); Ramya Bhagavatula, Palo Alto, CA (US); Jeffrey Gleeson, Danville, CA (US); Kevin Chen, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/350,801

(22) Filed: Jun. 17, 2021

(65) Prior Publication Data

US 2022/0404051 A1    Dec. 22, 2022

(51) Int. Cl.
*F24F 11/47* (2018.01)
*F24F 11/58* (2018.01)
(Continued)

(52) U.S. Cl.
CPC .............. *F24F 11/47* (2018.01); *F24F 11/58* (2018.01); *F24F 11/63* (2018.01);
(Continued)

(58) Field of Classification Search
CPC .. F24F 11/47; F24F 11/58; F24F 11/63; F24F 2110/10; F24F 2130/10; F24F 2140/60
See application file for complete search history.

(56) References Cited

U.S. PATENT DOCUMENTS 7,440,871 B2 * 10/2008 McConnell ............ G06Q 99/00
                                                          705/500
9,595,070 B2    3/2017 Matsuoka et al.
(Continued)

OTHER PUBLICATIONS

"WattTime—The Power to Choose Clean Energy" [Web page], (n.d.). Retrieved on Mar. 30, 2021 from https://www.watttime.org/, 5 pages.

(Continued)

*Primary Examiner* — Christopher E. Everett
*Assistant Examiner* — Christopher W Carter
(74) *Attorney, Agent, or Firm* — Kilpatrick Townsend & Stockton LLP

(57) ABSTRACT

Techniques for performing an emissions demand response event are described. In an example, a cloud-based HVAC control server system obtains a history of emissions rates. Based on the history of emissions rates, a future time period of predicted high emissions is identified. An emission demand response event participation level of an account mapped to a thermostat is determined for the future time period of predicted high emissions. The emissions demand response event participation level may be one of a plurality of emissions demand response event participation levels. based on the emissions demand response event participation level of the account, an emissions demand response event is generated during the future time period of predicted high emissions. The cloud-based HVAC control server system then causes a thermostat to control an HVAC system in accordance with the generated emissions demand response event.

20 Claims, 42 Drawing Sheets

(51) Int. Cl.
    *F24F 11/63*     (2018.01)
    *F24F 130/10*    (2018.01)
    *F24F 110/10*    (2018.01)
    *F24F 140/60*    (2018.01)

(52) U.S. Cl.
    CPC ....... *F24F 2110/10* (2018.01); *F24F 2130/10* (2018.01); *F24F 2140/60* (2018.01)

(56) References Cited

U.S. PATENT DOCUMENTS

| | | | |
|---|---|---|---|
| 2009/0281677 A1* | 11/2009 | Botich | G06Q 10/00 705/400 |
| 2012/0083938 A1 | 4/2012 | Takagi et al. | |
| 2012/0109394 A1 | 5/2012 | Takagi et al. | |
| 2012/0278270 A1* | 11/2012 | Ding | G06Q 10/04 706/48 |
| 2012/0319642 A1 | 12/2012 | Suyama et al. | |
| 2014/0277769 A1* | 9/2014 | Matsuoka | G05B 13/0265 700/278 |
| 2014/0324507 A1* | 10/2014 | Koch | G06Q 10/063116 705/7.22 |
| 2015/0170171 A1 | 6/2015 | McCurnin et al. | |
| 2016/0091904 A1 | 3/2016 | Horesh et al. | |
| 2017/0097622 A1 | 4/2017 | Ohama et al. | |
| 2018/0031533 A1* | 2/2018 | Rawat | G01N 33/0036 |

OTHER PUBLICATIONS

International Search Report and Written Opinion for PCT/US2022/032057 dated Sep. 27, 2022, all pages.

* cited by examiner

MANAGING USER ACCOUNT PARTICIPATION IN EMISSIONS DEMAND RESPONSE EVENTS

CROSS-REFERENCES TO RELATED APPLICATIONS

This application shares a common description and figures with U.S. patent application Ser. No. 17/350,793, filed on Jun. 17, 2021, entitled "DYNAMIC ADAPTATION OF EMISSIONS DEMAND RESPONSE EVENTS," U.S. patent application Ser. No. 17/350,787, filed on Jun. 17, 2021, entitled "MANAGING EMISSIONS DEMAND RESPONSE EVENT GENERATION," and U.S. patent application Ser. No. 17/350,808, filed on Jun. 17, 2021, entitled "MANAGING EMISSIONS DEMAND RESPONSE EVENT INTENSITY."

BACKGROUND

A thermostat can be used to control heating system, cooling system, fans, ventilation systems, dehumidifiers, humidifiers, or any other related systems. Users can benefit from using a smart thermostat that can communicate via a wireless network with a cloud-based server. Such wireless network connectivity can allow for the thermostat to be controlled remotely by a user or by various services provided by the cloud-based server. Scheduling the electricity consumption of an HVAC system controlled by a thermostat to coincide with times of cleaner electricity availability can reduce carbon emissions.

SUMMARY

Various embodiments, are described related to a method for performing an emissions demand response event. In some embodiments, a method for performing an emissions demand response event is described. The method may comprise obtaining, by a cloud-based HVAC control server system, a history of emissions rates. The method may comprise identifying, by the cloud-based HVAC control server system, based on the history of emissions rates, a future time period of predicted high emissions. The method may comprise determining, by the cloud-based HVAC control server system, from a plurality of emissions demand response event participation levels, an emissions demand response event participation level of an account mapped to a thermostat during the future time period of predicted high emissions. The method may comprise generating, by the cloud-based HVAC control server system, based on the emissions demand response event participation level of the account, an emissions demand response event during the future time period of predicted high emissions. The method may comprise causing, by the cloud-based HVAC control server system, the thermostat mapped to the account to control an HVAC system in accordance with the generated emissions demand response event.

Embodiments of such a method may include one or more of the following features: the plurality of emissions demand response event participation levels may comprise a first participation level and a second participation level. The second participation level may cause a greater amount of emissions savings than the first participation level. Determining the emissions demand response event participation level of the account further may comprise outputting a request for a selection between the first participation level and the second participation level. Determining the emissions demand response event participation level of the account further may comprise receiving, in response to the request, a selection from the first participation level and the second participation level for a duration of the future time period of predicted high emissions. Determining the emissions demand response event participation level of the account further may comprise storing an indication of the selection of the first participation level or the second participation level for the duration of the future time period of predicted high emissions.

In some embodiments, a predefined maximum number of events per day is greater for the second participation level than the first participation level. Generating the emissions demand response event further may comprise determining that the emissions demand response event participation level of the account may be set to the second participation level. Generating the emissions demand response event further may comprise determining that a number of previously generated emissions demand response events may be fewer than the predefined maximum number of events per day. Causing the thermostat associated with the account to control an HVAC system in accordance with the generated emissions demand response event may be at least partially based on the determination that the number of previously generated emissions demand response events may be fewer than the predefined maximum number of events per day.

In some embodiments, a predefined maximum event duration is longer for the second participation level than the first participation level. Generating the emissions demand response event further may comprise determining that the emissions demand response event participation level of the account may be set to the second participation level. Generating the emissions demand response event further may comprise increasing a duration of the generated emissions demand response event in response to determining that the emissions demand response event participation level of the account may be set to the second participation level.

In some embodiments, causing the thermostat mapped to the account to control the HVAC system in accordance with the emissions demand response event comprises adjusting a setpoint temperature of the thermostat. Generating the emissions demand response event further may comprise determining that the emissions demand response event participation level of the account may be set to the second participation level. Generating the emissions demand response event further may comprise increasing an adjustment to the setpoint temperature of the thermostat in response to determining that the emissions demand response event participation level of the account may be set to the second participation level.

In some embodiments, causing the thermostat mapped to the account to control the HVAC system in accordance with the emissions demand response event comprises adjusting a setpoint temperature of the thermostat. The method may further comprise receiving, after adjusting the setpoint temperature, an adjustment to the setpoint temperature in an opposite direction. The method may further comprise causing the thermostat to stop controlling the HVAC system in accordance with the emissions demand response event. Causing the thermostat mapped to the account to control the HVAC system in accordance with the emissions demand response event may comprise adjusting a setpoint temperature of the thermostat. The method may further comprise receiving, after adjusting the setpoint temperature, an adjustment to the setpoint temperature in an opposite direction. The method may further comprise modifying, based on the adjustment, the emissions demand response event participation level of the account mapped to the thermostat.

In some embodiments, modifying the emissions demand response event participation level of the account mapped to the thermostat comprises reducing a predefined maximum number of events per day. Modifying the emissions demand response event participation level of the account mapped to the thermostat may comprise reducing a predefined maximum event duration. Modifying the emissions demand response event participation level of the account mapped to the thermostat may comprise reducing a predefined maximum setpoint adjustment. The future time period of predicted high emissions may be one week. The method further may comprise obtaining, a weather forecast for a predefined future time period. Identifying the future time period of predicted high emissions may be further based on the weather forecast. Generating the emissions demand response event further may comprise determining an energy price during the future time period of predicted high emissions. The emissions demand response event participation level of the account mapped to the thermostat may be based on the energy price.

In some embodiments, a system for performing an emissions demand response event is described. The system may comprise a cloud-based power control server system. The cloud-based power control server system may comprise one or more processors. The cloud-based power control server system may comprise a memory communicatively coupled with and readable by the one or more processors and having stored therein processor-readable instructions which, when executed by the one or more processors, cause the one or more processors to obtain a history of emissions rates. The one or more processors may identify, based on the history of emissions rates, a future time period of predicted high emissions. The one or more processors may determine from a plurality of emissions demand response event participation levels, an emissions demand response event participation level of an account mapped to a thermostat during the future time period of predicted high emissions. The one or more processors may generate based on the emissions demand response event participation level of the account, an emissions demand response event during the future time period of predicted high emissions. The one or more processors may cause the thermostat mapped to the account to control an HVAC system in accordance with the generated emissions demand response event.

Embodiments of such a system may further comprise a plurality of thermostats comprising the thermostat. The system may further comprise an application executed on a mobile device configured to control the thermostat via communication with the cloud-based power control server system. In some embodiments, the plurality of emissions demand response event participation levels comprises a first participation level and a second participation level. The second participation level may cause a greater amount of emissions savings than the first participation level. A predefined maximum event duration may be longer for the second participation level than the first participation level. The processor-readable instructions, when executed, further cause the one or more processors to generate the emissions demand response event by determining that the emissions demand response event participation level of the account may be set to the second participation level. The processor-readable instructions, when executed, further cause the one or more processors to generate the emissions demand response event by increasing a duration of the generated emissions demand response event in response to determining that the emissions demand response event participation level of the account may be set to the second participation level.

In some embodiments, a non-transitory processor-readable medium is described. The medium may comprise processor-readable instructions configured to cause one or more processors to obtain a history of emissions rates. The medium may comprise processor-readable instructions configured to cause one or more processors to identify based on the history of emissions rates, a future time period of predicted high emissions. The medium may comprise processor-readable instructions configured to determine from a plurality of emissions demand response event participation levels, an emissions demand response event participation level of an account mapped to a thermostat during the future time period of predicted high emissions. The medium may comprise processor-readable instructions configured to generate based on the emissions demand response event participation level of the account, an emissions demand response event during the future time period of predicted high emissions. The medium may comprise processor-readable instructions configured to cause the thermostat mapped to the account to control an HVAC system in accordance with the generated emissions demand response event.

Embodiments of such a medium may include one or more of the following features: causing the thermostat mapped to the account to control the HVAC system in accordance with the emissions demand response event may comprise adjusting a setpoint temperature of the thermostat. The processor-readable instructions may be further configured to receive, after adjusting the setpoint temperature, an adjustment to the setpoint temperature in an opposite direction. The processor-readable instructions may be further configured to modify, based on the adjustment, the emissions demand response event participation level of the account mapped to the thermostat. Modifying the emissions demand response event participation level of the account mapped to the thermostat may comprise reducing a predefined maximum number of events per day.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
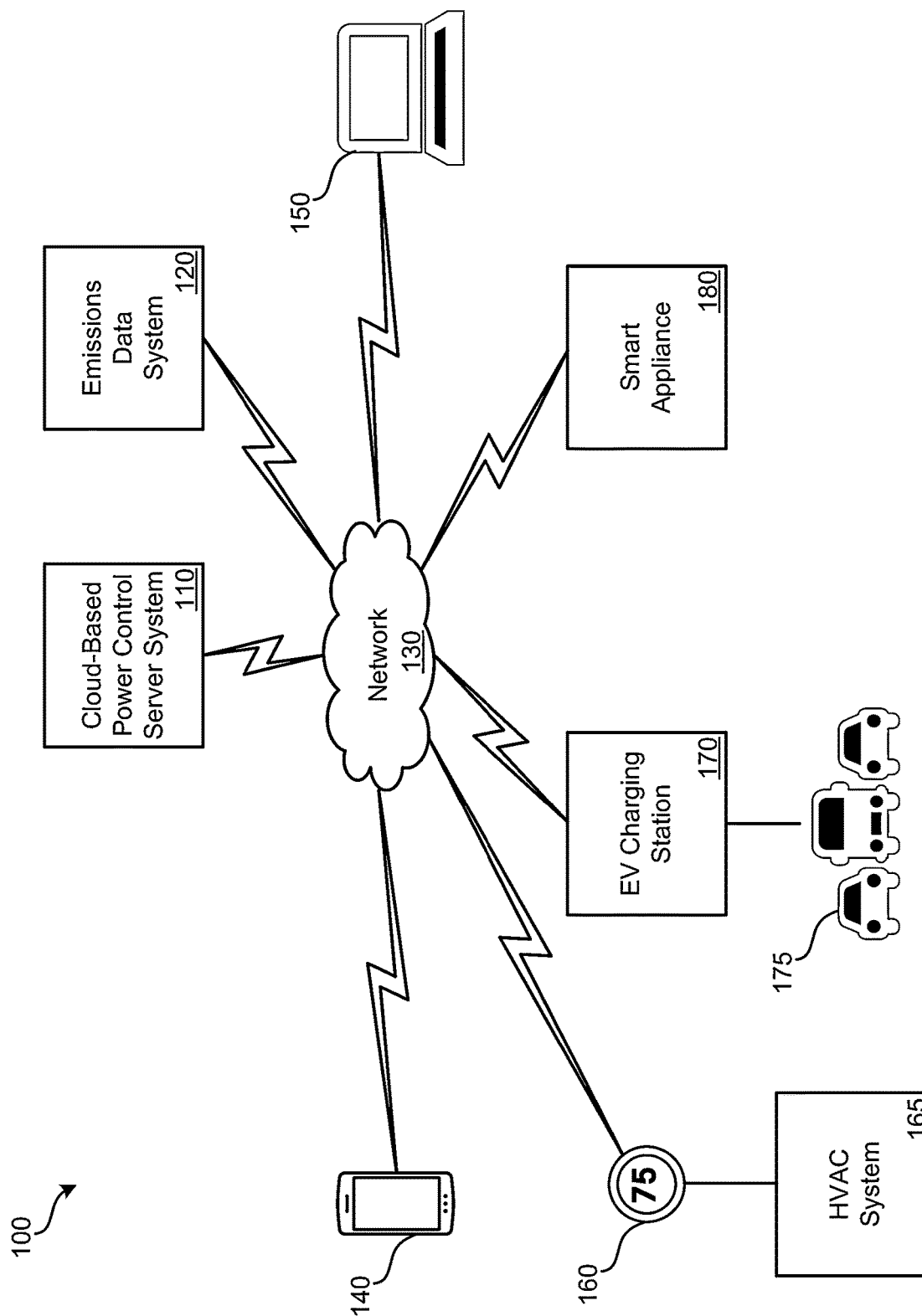
FIG. 1 illustrates an embodiment of a system for managing emissions demand response events.

Utility companies face ongoing challenges with consistently satisfying the demand for electricity while reducing the overall generation of carbon emissions. The variance in consumers' demand for electricity, combined with the varying availability of cleaner electricity, can often make it challenging to satisfy the consumers' demands and consistently maintain a low level of carbon emissions.

The variances in consumer demand and cleaner electricity supply can be attributed to a number of factors. Consumer demand may be driven by factors such as the weather, a consumer being home or away, the time of day, the day of the week, or the time of year. For example, utility companies may experience increased demand during extreme heat or cold waves or in the evenings when residents have returned to their homes and have increased their electricity consumption. Similarly, the supply of cleaner electricity may depend on factors such as the weather, the time of year, and/or season. For instance, during stormy weather or during the winter when the days are shorter, the availability of solar power may decrease. Similarly, there may be seasonal or daily variations in wind patterns that correlate with a decrease or increase in electricity generated by wind turbines.

When cleaner electricity supply is unable to meet demands, a utility company may need to rely on sources of electricity that tend to create more pollution, including carbon dioxide. For instance, when demand is relatively low, a greater portion of demand may be satisfied using clean and relatively clean electricity sources, such as wind, solar, and hydropower. However, when demand increases and/or cleaner electricity supply is lower, other, more polluting, power sources may need to be utilized, such as diesel generators, coal-fired power stations, and natural gas turbines.

To reduce the consumption of electricity when more polluting power sources are in use, which can be referred to as "dirtier electricity" and, thus, decrease pollution, Emissions Demand Response ("EDR") events may be utilized. The objective of EDR events is to reduce the aggregate use of dirty energy and increase the aggregate use of clean energy. EDR events may achieve this objective by shifting electricity consumption earlier or later in time to coincide with times when electricity will be produced using cleaner energy sources and away from times when electricity will be produced using dirtier energy sources. For example, an EDR event may attempt to shift electrical load from times when the electricity will be produced using petroleum to times when electricity will be produced using wind or solar energy. As another example, for a grid with natural gas and coal power plants, and minimal carbon free energy, an EDR event may shift electrical load from times when coal will be used to generate electricity towards times when natural gas will be used to generate electricity.

At any particular point in time, an adjustment to the consumption of electricity will correspond with an adjustment in the production of electricity by one or more power plants in order to balance the supply of electricity with the demand. Each of the one or more power plants producing the electricity will have their own emissions characteristics, which could be measured as the amount of carbon emissions generated per unit of electricity produced. As the demand for electricity increases, the production of electricity, and therefore emissions, may also increase depending on the source of the electricity. Similarly, as the demand for electricity decreases, the production of electricity, and therefore emissions, may also decrease depending on the source of the electricity. The amount of emissions produced in the generation of the additional electricity will be based on the emissions characteristics associated with the source of the electricity as will the amount of emissions eliminated by the generation of less electricity. The aggregate amount of emissions that would be produced or reduced as the electrical load changes can be represented by a value, called the Marginal Emissions Rate ("MER"), and is usually measured by weight of carbon dioxide per unit of energy consumed or produced, for instance, lbs-CO2/MWh.

MER Forecasts may be generated to predict the MER at various times in the future. By using current and forecast MER data, EDR events may be generated to shift the electricity load from times when electricity consumption will produce higher levels of carbon emissions to times when carbon emission will be significantly less. In some embodiments, a goal is to reduce carbon emissions with shifts of electric loads including, but not limited to, HVAC loads such as electric-powered cooling (e.g., air conditioners), running a fan, and electric-powered heating systems. The aggregation of many small shifts across many structures (e.g., homes, buildings, apartments, offices) can result in large changes in the emissions resulting from that electricity usage.

One way of shifting electric loads can be by making adjustments to user thermostat temperature setpoints. Using the current and predicted emissions rate data, a system can determine when and for how long an adjustment to user setpoints will achieve reduced emissions. Similarly, because the system knows whether the emissions rate will rise or fall, it can determine whether to increase or decrease the thermostat setpoint temperature. With forecasted emissions data, the system can generate scheduled events at various points during the span of time covered by the forecast. However, due to the uncertain nature of forecasted data, updated forecasts and current emissions data can be used to periodically or occasionally modify the previously generated events, thereby achieving improvements in carbon emissions reduction.

In the past, achieving a reduction in carbon emissions, especially by individuals, could be challenging due to the perceived amount of effort required to reduce one's carbon footprint. People who may otherwise be reluctant to take active steps to reduce their carbon footprint, can reduce carbon emissions with very little effort by allowing automatic adjustments to their thermostat setpoints. However, the perceived amount of discomfort associated with reducing carbon emissions creates an additional barrier to overcome. This is especially true in the context of heating or cooling, as some people may be sensitive to even minor changes in the ambient temperatures. Similarly, some people may be sensitive to the number of times their thermostat setpoint is automatically adjusted each day.

The features described herein advantageously address this sensitivity in a number of ways. For example, people can have the ability to opt-in and/or opt-out of emissions reduction programs of varying levels at any time. Further, even when opted-into a program, people can have the ability to make real-time adjustments to their setpoint temperature at any time during the execution of an emissions reduction event, as described further below. One objective achieved by some of the embodiments is the judicious creation of a balance between aggressive thermostat control, which provides good potential reduction of carbon emissions, but could result in more annoyance or discomfort and associated real-time setpoint overrides, and less aggressive control, which generally provides more comfort and less annoyance, and less probability of real-time setpoint overrides, but which does not provide as much potential for reduction of carbon emissions.

One way of balancing discomfort with a reduction in carbon emissions can be by placing constraints on the generation, execution, and termination of EDR events. For example, the number of load shifting events per day may be limited or the number of a specific type of EDR event may be limited. Similarly, constraining events to certain times during the day and spacing them throughout the day, and/or limiting the aggressiveness of temperature offsets from the normally scheduled temperature setpoints, may reduce the perceived level of discomfort to a user. With more advanced systems, characteristics specific to a user account associated with a thermostat may be used to determine characteristics of an EDR event. For instance, a system may learn over time that occupants in a home or building with a thermostat associated with a first account are willing to tolerate more frequent events with small changes to the setpoint temperature while occupants in a home or building associated with a second account are willing to tolerate events with a larger adjustment to the setpoint temperature but with less. Therefore, by adjusting the constraints per user account or by thermostat associated with a user account, an increased amount of carbon emissions reduction may be achieved while limiting the amount of user discomfort. Further detail regarding these embodiments, and others, is provided in relation to the figures.

While the above description focuses on the use of smart thermostats, the embodiments detailed herein can be applied to other smart controllable systems that use significant amounts of electricity for which use can be time-shifted. For example, the consumption of electricity by various appliances such as Electric Vehicle ("EV") charging stations and smart refrigerators may be shifted from times when energy consumption will produce high levels of carbon emissions to times when carbon emission will be lower. As another example, electrical load from other older or 'non-connected' devices may still be shifted using various devices designed to control the amount of electricity flowing to a particular device such as smart outlets or smart light sockets.

Further detail regarding the generation and management of EDR events is provided in relation to the figures. FIG. 1 illustrates an embodiment of a system 100 for managing EDR events. System 100 can include: cloud-based power control server system 110; emissions data system 120; network 130; mobile device 140; personal computer 150; smart thermostat 160; Electric Vehicle ("EV") charging station 170; and smart appliance 180. Smart thermostat 160 can be connected to Heating, Ventilation, and Air Conditioning ("HVAC") system 165. EV charging station 170 may be connected to electric vehicles 175. In some embodiments, one or more of the components of system 100 may be communicatively connected to other components of system 100 via network 130.

Figure 2:
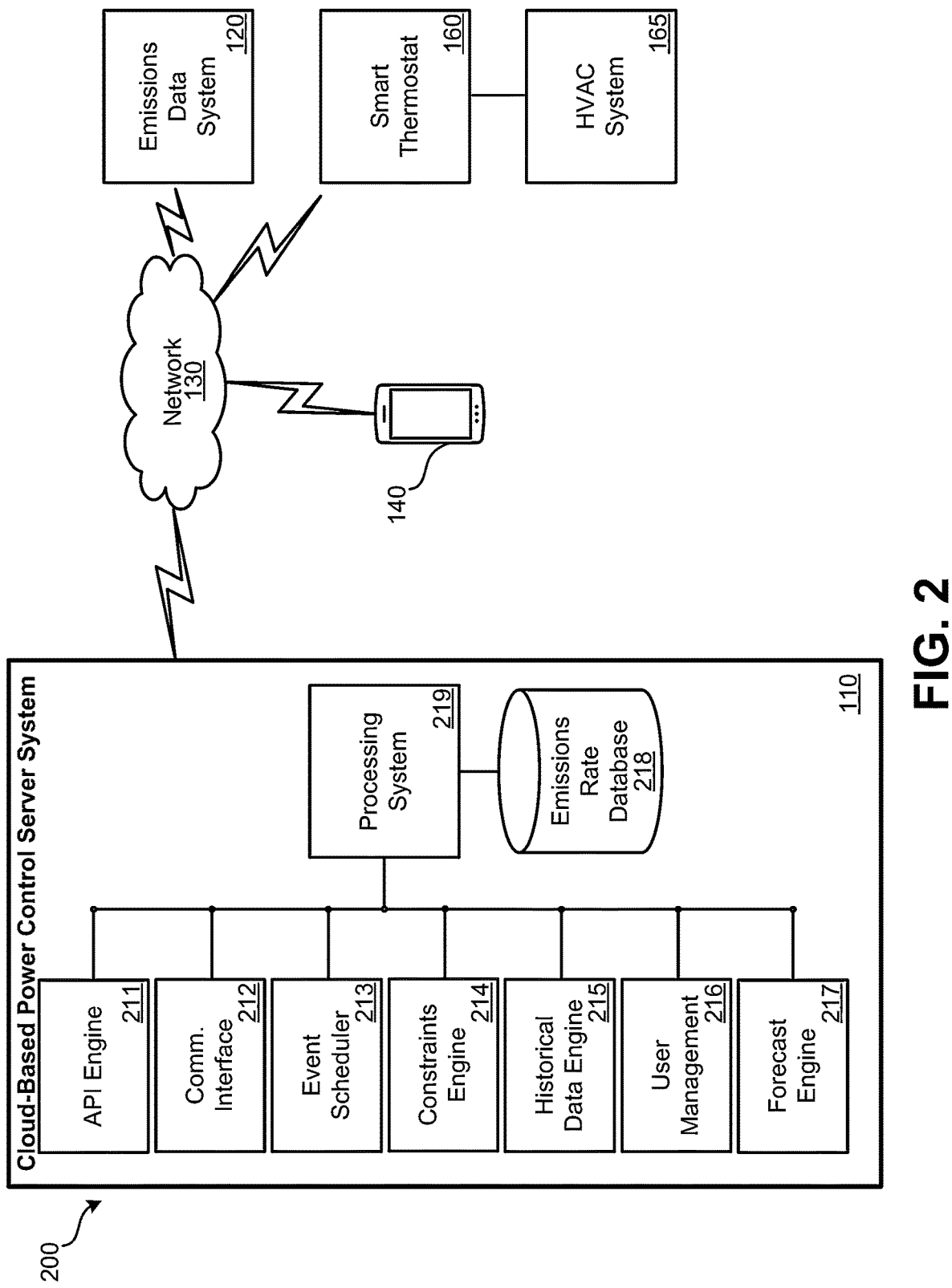
FIG. 2 illustrates an embodiment of a system for managing emissions demand response events.

Cloud-based power control server system 110 can include one or more processors configured to perform various functions, such as generate and manage EDR events, as further described in relation to FIG. 2, infra. Cloud-based power control server system 110 can include one or more physical servers running one or more processes. Cloud-based power control server system 110 can also include one or more processes distributed across a cloud-based server system. In some embodiments, cloud-based power control server system 110 is connected over network 130 to any or all of the other components of system 100. For instance, cloud-based power control server system 110 may connect to emissions data system 120 to receive current and forecast emissions data. In some embodiments, the current and forecast emissions data is represented as a percentage value representing the relative emissions at a point in time compared to the recorded emissions over a period of time in the past. For example, a value of zero at a particular point in time might mean that the emissions rate is equivalent to the minimum rate of emissions over the past two weeks while a value of one-hundred might mean that the emissions rate is equivalent to the maximum rate of emissions over the past two weeks. In some embodiments, the current and forecast emissions data is represented as the MER (e.g., lbs-CO2/MWh). The forecast emissions data may include forecasted rates of emissions at regular intervals over a period of time into the future. For example, an emissions rate forecast may include the predicted emissions rate at five minute intervals over a 24 hour period of time. The forecast emissions rate, or MER, data may range in accuracy depending on the source and/or how the emissions rate is determined. For example, the forecast emissions rate may be generated using a model that accepts multiple inputs with varying degrees of correlation to the actual emissions rate, such as, weather data, publicly available grid demand and/or price data, and historical emissions rate data. Alternatively, other forecast emissions rates may be based directly on data obtained from utilities and/or grid operators.

The data received from emissions data system 120 can in turn be used by cloud-based power control server system 110 to generate and manage EDR events. Cloud-based power control server system 110 may also connect to mobile device 140 and personal computer 150 to send updates or notifications about upcoming EDR events. For example, after generating an EDR event, cloud-based power control server system 110 may send a notification to the user of mobile device 140 about an EDR event that has been scheduled for a smart thermostat 160 owned by the user of mobile device 140. Cloud-based power control server system 110 can also distribute the instructions or details of newly generated EDR events to smart thermostat 160, EV charging station 170, and/or smart appliance 180.

Emissions data system 120 can be a server system, such as a cloud based server system, connected through network 130 and may be capable of running one or more processes related to collecting and generating emissions rate data. Alternatively, emissions data system 120 can be a commercially available service such as WattTime™ or any other similar website or web service with a published Application Programming Interface ("API") that provides such emissions rate data and/or equivalents thereof and/or substitutes therefor, such as websites or web services that provide forward-looking estimates of "dirtiness" per kilowatt-hour or, more generally, some forward-looking estimate of "undesirability" or "less desirability" per kilowatt-hour. For example, emissions data system 120 may publish an API allowing external systems, such as cloud-based power control server system 110, to connect to it over network 130 in order to send requests for data and receive the requested data in response. Emissions data system 120 may also connect to external services to receive data from various sources. For example, emissions data system 120 may connect over network 130 to multiple utility companies in order to receive emissions data corresponding to the current and expected emissions generated by the power plants owned by the utility company providing power to a city or region. Emissions data system 120 can also connect to other data sources, such as a national weather service, in order to collect additional data relevant to generating an emissions rate forecast using a model or any other suitable calculation. Emissions data system 120 in turn can use all of the data it collects, along with historical emissions rate data, to generate detailed forecasts of the estimated MER for a period of time into the future.

Network 130 can include one or more wireless networks, wired networks, public networks, private networks, and/or mesh networks. A home wireless local area network (e.g., a Wi-Fi network) may be part of network 130. Network 130 can include the Internet. Network 130 can include a mesh network, which may include one or more other smart home devices, and may be used to enable smart thermostat 160, EV charging station 170, and smart appliance 180 to communicate with another network, such as a Wi-Fi network. Any of smart thermostat 160, EV charging station 170, and smart appliance 180 may function as an edge router that translates communications received from other devices on a relatively low power mesh network to another form of network, such as a relatively higher power network, such as a Wi-Fi network.

Mobile device 140 may be a smartphone, tablet computer, laptop computer, gaming device, or some other form of computerized device that can communicate with cloud-based power control server system 110 via network 130 or can communicate directly with any of thermostat 160, EV charging station 170, and smart appliance 180 (e.g., via Bluetooth® or some other device-to-device communication protocol). Similarly, personal computer 150 may be a laptop computer, desktop computer, or some other computerized device that can communicate with cloud-based power control server system 110 via network 130 or can communicate directly with any of smart thermostat 160, EV charging station 170, and smart appliance 180. A user can interact with an application executed on mobile device 140 or personal computer 150 to control or interact with smart thermostat 160, EV charging station 170, and smart appliance 180. For example, the user of mobile device 140, or personal computer 150, can connect via network 130 to smart thermostat 160 at the user's home to monitor the status of smart thermostat 160 or send heating and cooling instructions to smart thermostat 160 that will in turn cause an HVAC system to provide heating or cooling to the user's home. Mobile device 140 may also be connected over network 130 to cloud-based power control server system 110. For example, cloud-based power control server system 110 may send notifications to the user of mobile device 140 about opportunities to participate in EDR events or cloud-based power control server system 110 may send updates about the status of upcoming or ongoing EDR events. The notifications or updates may be in the form of a text message, an email, or a notification through an application.

Smart thermostat 160 can be a smart thermostat capable of connecting to network 130 and controlling an HVAC system 165. Smart thermostat 160 may include one or more processors that may execute special-purpose software stored in a memory of smart thermostat 160. Smart thermostat 160 can include one or more sensors, such as a temperature sensor or an ambient light sensor. Smart thermostat 160 can also include an electronic display. The electronic display may include a touch sensor that allows a user to interact with the electronic screen. Smart thermostat 160 may connect via network 130 to cloud-based power control server system 110. For example, smart thermostat 160 may receive instructions for an EDR event from cloud-based power control server system 110. Smart thermostat 160 may also receive emissions rate data from cloud-based power control server system 110 via network 130.

In some embodiments, smart thermostat 160 may connect via network 130 to mobile device 140 or personal computer 150. For example, smart thermostat 160 may receive heating or cooling instructions from a user's mobile device 140 or personal computer 160. In some embodiments, smart thermostat 160 will modify EDR events and/or opt out of future EDR events altogether. For example, smart thermostat 160 may receive an input, such as a setpoint temperature adjustment, at the thermostat that results in an ongoing EDR event being modified. As another example, smart thermostat 160 may receive one or more instructions from mobile device 140 resulting in smart thermostat 160 no longer participating and/or generating future EDR events. As another example, smart thermostat 160 may receive one or more Smart thermostat 160 may also be connected to an HVAC system 165 and may cause HVAC system 165 to provide heating or cooling until a setpoint temperature measured at smart thermostat 160 has been achieved. HVAC system 165 may be any type of HVAC system such as: an electric water heater connected to a hydronic baseboard, an electric baseboard, a fan unit of forced air system, etc.

EV charging station 170 may be a charging system capable of charging one or more electric vehicles 175. EV charging station 170 may also be connected via network 130 to cloud-based power control server system. For example, EV charging station 170 may receive instructions for an EDR event from cloud-based power control server system 110. EV charging station 170 may also receive emissions rate data from cloud-based power control server system 110 via network 130. In some embodiments, EV charging station 170 may connect via network 130 to mobile device 140 or personal computer 150. For example, EV charging station 170 may send notifications or updates to a user's mobile device 140 or personal computer 150 regarding the charging status of the user's electric vehicle 175. Similarly, smart appliance 180 may be any appliance capable of connecting to network 130 and modifying the consumption of electricity by either the smart appliance or a device connected to smart appliance 180.

FIG. 2 illustrates an embodiment of a system 200 for managing EDR events. System 200 can include: cloud-based power control server system 110; emissions data system 120; network 130; mobile device 140; smart thermostat 160; and HVAC system 165. Emissions data system 120 may function as detailed in relation to FIG. 1, supra. Smart thermostat 160 may function as detailed in relation to FIG. 1, supra. HVAC system 165 may function as detailed in relation to FIG. 1, supra. Network 130 may function as detailed in relation to FIG. 1, supra.

Cloud-based power control system 110 can include a plurality of services such as: API engine 211; communication interface 212; event scheduler 213; constraints engine 214; historical data engine 215; a user management module 216; and forecast engine 217. Cloud-based power control server system 110 can also include one or more databases such as emissions rate database 218. Cloud-based power control server system 110 can also include processing system 219 that can coordinate the execution of the various functionalities provided by the plurality of services and can communicate with the one or more databases such as emissions rate database 218.

API engine 211 may implement published interfaces from one or more external systems. The published interfaces may allow cloud-based power control server system 110 to interact with various external systems to request and exchange data. API engine 211 may also allow cloud-based power control server system 110 to communicate with various devices connected to network 130. For example, API engine 211 may implement an interface for sending text messages, emails, or application notifications to mobile device 140. API engine 211 may also allow cloud-based power control server system 110 to send instructions for performing EDR events to smart devices connected to network 130. For example, API engine 211 may implement an interface for smart thermostat 160.

Communication interface 212 may be used to communicate with one or more wired networks. In some embodiments, a wired network interface may be present, such as to allow communication with a local area network (LAN). Communication interface 212 may also be used to communicate with distributed services across multiple virtual machines through a virtual network. Communication interface 212 may be used by one or more of the other processes in order to communicate with the other process or with external devices and services such as mobile device 140, emissions data system 120, or smart thermostat 160.

Event scheduler 213 may implement the business logic for scheduling EDR events. For example, event scheduler 213 may request and receive data from constraints engine 214, historical data engine 215, and forecast engine 217 to determine when to schedule an EDR event in order to generate a reduction in carbon emissions. Event scheduler 213 may also receive an emissions rate forecast for a future time period from emissions data system 120. In some embodiments, event scheduler 213 may use the emissions rate forecasts to identify an emissions rate event. A future emissions rate event may be any period of time in the future when the emissions rate is expected to be at an increased or decreased level, as described further herein below. In some embodiments, event scheduler 213 uses the emissions rate forecasts to calculate one or more emissions differential values. An emissions differential value may be understood as the rate of change of carbon emissions at any given point in time. For example, using the emissions rate forecasts, the event scheduler 213 may calculate an emissions differential value for each of a plurality of points in time during the future time period covered by the forecast. In some embodiments, event scheduler 213 determines an event score for an EDR event ending at each of the plurality of points in time. Based on the emissions differential values and the event scores, event scheduler 213 may generate and schedule EDR events to be sent to smart thermostat 160 or any other smart appliance. Event scheduler 213 may also modify or cancel previously generated and scheduled EDR events based on updated emissions rate forecasts. In some embodiments, constraints produced by constraints engine 214 may restrict the generation of EDR events by event scheduler 213.

Constraints engine 214 may create and maintain one or more constraints intended to ensure that EDR events scheduled by event scheduler 213 produce the least amount of user discomfort and annoyance. For example, constraints engine 214 may limit the number of events scheduled for a day. In some embodiments, constraint engine 214 may also limit the number of a specific type of event per day. Constraints engine 214 may limit the generation of events during restricted times of day. For example, constraints engine 214 may limit the generation of an EDR event when a user may be asleep or at home. In some embodiments, constraints engine 214 defines a minimum score required for any EDR event scheduled by event scheduler 213. Constraints engine 214 may also define a minimum amount of time between scheduled EDR events. For example, constraints engine 214 may require a minimum amount of time between the end of one event and the beginning of the next event of the same or a different type. In some embodiments, constraints engine 214 requests user account-specific data from user management module 216 to define user account-specific constraints. For example, user management module 216 may indicate that a specific user account always cancels EDR events of a certain magnitude, in which case, constraints engine 214 may define a constraint for the specific user account restricting event scheduler 213 from scheduling events for that user account with a greater magnitude than the user account has indicated a willingness to tolerate.

Historical data engine 215 may include processes for analyzing historical data and metrics. For example, historical data engine 215 may periodically or occasionally analyze historical emissions rates to help predict when emissions rates will rise or fall again in the future. Historical data engine 215 may also analyze historical data collected from various user devices. For example, historical data engine 215 may record and store the effectiveness of an HVAC system associated with a user account. The effectiveness may in turn be used by event scheduler 213 to identify optimal EDR events for the user account based on the effectiveness of the HVAC system. In some embodiments, data analyzed by historical data engine 215 is stored in one or more databases of the cloud-based power control server system 110, such as emissions rate database.

User management module 216 may include one or more processes for managing user accounts. For example, user management module 216 may access, modify, and store account details for a specific user account such as information for one or more devices owned and operated by a user associated with the account, various settings for programs a user account may be participating in and to what extent, payment methods, setpoint temperature preferences, or user account habits. User management module 216 may provide user account-specific information to constraints engine 214 to generate user account-specific constraints and restrictions. User management module 216 may also provide user account-specific information to event scheduler 213 to help determine what events to schedule and when based on preferences associated with the user account. In some embodiments, user management module 216 may also send communications to a user associated with a user account, such as notifications or updates, or to an application on a mobile device 140 associated with the user account. For example, user management module 216 may send an email, text, or application invitation to a specific user account to participate in future EDR program events.

Forecast engine 217 may include one or more processes for analyzing, modifying, or generating emissions rate forecasts. Forecast engine 217 may receive emissions rate forecasts from emissions data system 120 or emissions rate database 218. In some embodiments, forecast engine 217 modifies the received emissions rate forecasts using data produced by historical data engine 215 or other historical data from one or more databases such as emissions rate database 218. For example, after receiving an emissions rate forecast from emissions data system 120, forecast engine 217 may modify the forecast based on a combination of weather forecasts and historical emissions rates for times with similar weather. Forecast engine 217 may also generate independent emissions rate forecasts using a combination of historical emissions rates. In some embodiments, forecast engine 217 analyzes emissions rate forecasts and determines emissions differential values that event scheduler 213 can use to generate EDR events.

One or more databases, such as emissions rate database 218, may store or otherwise make data accessible to cloud-based power control server system 110. Emissions rate database 218 may include data associated with historical and predicted emissions rates. The historical emissions rate data may include both the recorded emissions rates measured by utility companies or third-party services for a city or region and old forecasts covering the recorded period of time. For example, if emissions rate database 218 stores the recorded and old forecasts, historical data engine 215 may analyze these sets of data to determine the accuracy of future forecasts. The predicted emissions rates may be one or more emissions rate forecasts covering the same or overlapping periods of time. By retaining multiple emissions rate forecasts covering the same or overlapping periods of time, historical data engine 215 or any other analytical process may compare the forecasts and determine trends in the forecast as they approach real time. For example, a first forecast may predict a high rate of emissions at 24 hours into the forecast; a later forecast (e.g., 12 hours later) may revise the prediction indicating that the rate of emissions at the same point in time (e.g., now 12 hours into the forecast) will not be as high. If this trend is identified over enough emissions rate forecasts, forecast engine 217 may modify future forecasts to more accurately predict the future emissions rate. Cloud-based power control server system 110 may include other databases for various purposes. For example, there may be a user database storing information specific to individual user accounts such as account details, program participation settings, HVAC system characteristics, setpoint temperature preferences etc. The one or more databases, including emissions rate database 218, may be implemented by one or more suitable database structures such as a relational database (e.g., SQL) or a NoSQL database (e.g., MongoDB).

Processing system 219 can include one or more processors. Processing system 219 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD) of cloud-based power control server system 110.

Figure 3:
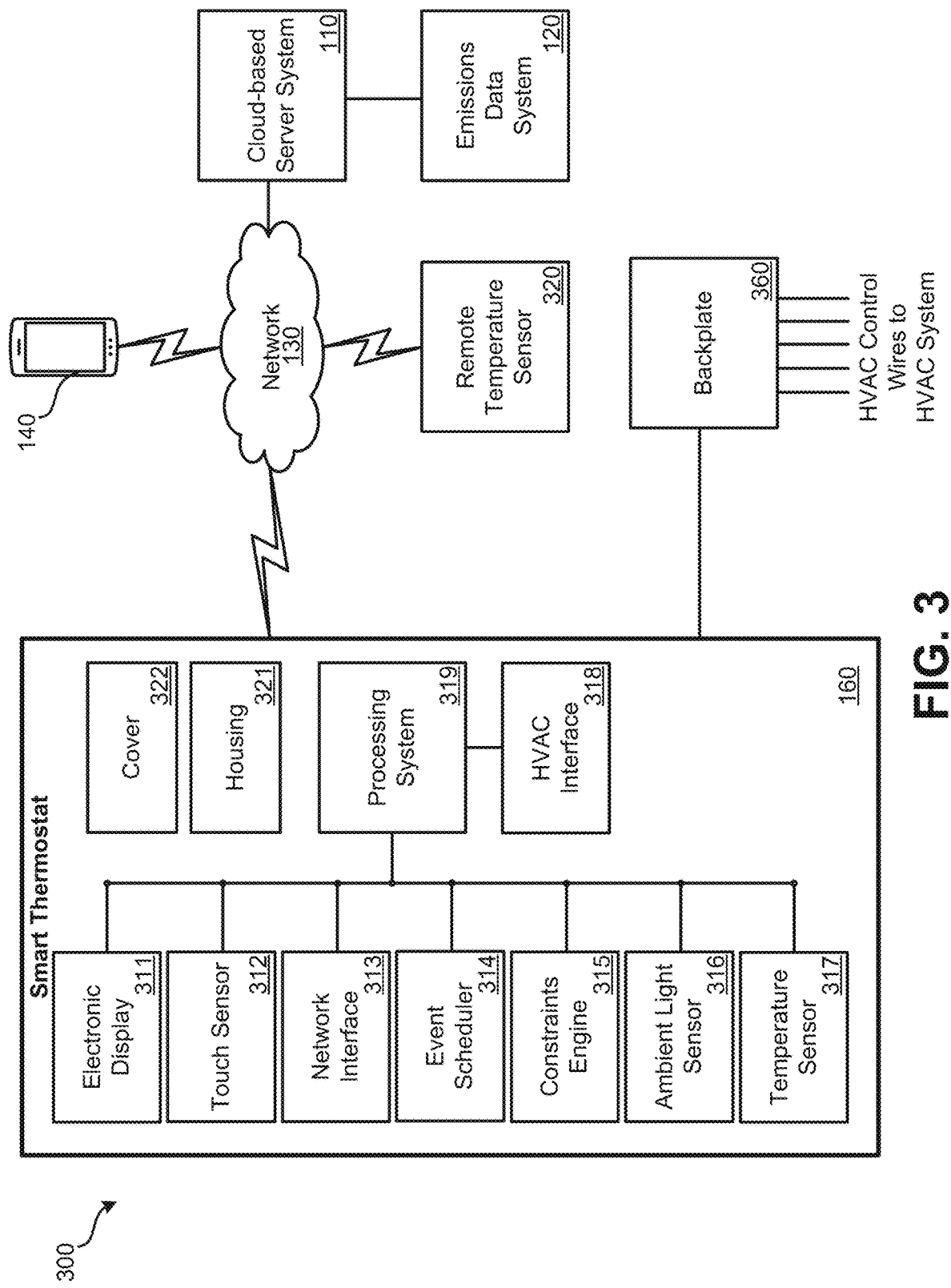
FIG. 3 illustrates an embodiment of a smart thermostat system for managing emissions demand response events.

FIG. 3 illustrates an embodiment of a smart thermostat system 300 for managing EDR events. Smart thermostat system 300 can include smart thermostat 160; network 130; cloud-based server system 110; and backplate 360. Cloud-based server system 110 may function as described in relation to FIGS. 1-2, supra. Network 130 may function as described in relation to FIG. 1, supra. Emissions data system 120 may be connected to cloud-based server system 110 and may function as described in relation to FIG. 1, supra. Smart thermostat 160 can include: electronic display 311; touch sensor 312; network interface 313; event scheduler 314; constraint engine 315; ambient light sensor 316; temperature sensor 317; HVAC interface 318; housing 321; and cover 322.

Electronic display 311 may be visible through cover 322. In some embodiments, electronic display 311 is only visible when electronic display 311 is illuminated. In some embodiments, electronic display 311 is not a touch screen. Touch sensor 312 may allow one or more gestures, including tap and swipe gestures, to be detected. Touch sensor 312 may be a capacitive sensor that includes multiple electrodes. In some embodiments, touch sensor 312 is a touch strip that includes five or more electrodes.

Network interface 313 may be used to communicate with one or more wired or wireless networks. Network interface 313 may communicate with a wireless local area network such as a WiFi network. Additional or alternative network interfaces may also be present. For example, smart thermostat 160 may be able to communicate with a user device directly, such as by using Bluetooth®. Smart thermostat 160 may be able to communicate via a mesh network with various other home automation devices. Mesh networks may use relatively less power compared to wireless local area network-based communication, such as WiFi. In some embodiments, smart thermostat 160 can serve as an edge router that translates communications between a mesh network and a wireless network, such as a WiFi network. In some embodiments, a wired network interface may be present, such as to allow communication with a local area network (LAN). One or more direct wireless communication interfaces may also be present, such as to enable direct communication with a remote temperature sensor installed in a different housing external and distinct from housing 321. The evolution of wireless communication to fifth generation (5G) and sixth generation (6G) standards and technologies provides greater throughput with lower latency which enhances mobile broadband services. 5G and 6G technologies also provide new classes of services, over control and data channels, for vehicular networking (V2X), fixed wireless broadband, and the Internet of Things (IoT). Smart thermostat 160 may include one or more wireless interfaces that can communicate using 5G and/or 6G networks.

Event scheduler 314 may implement the business logic for performing EDR events. For example, event scheduler 314 may receive information associated with an EDR event generated by cloud-based server system 110 for smart thermostat 160. Event scheduler 314 may then convert the information into instructions to be executed at the appropriate time for the EDR event. In some embodiments, event scheduler 314 generates and schedules EDR events from emissions rate forecast data. For example, event scheduler 314 may request and receive emissions rate forecasts from cloud-based server system 110 in order to determine when to schedule an EDR event in order to generate a reduction in carbon emissions. Using the emissions rate forecasts, the event scheduler 314 may identify a future emissions rate event. A future emissions rate event may be any period of time in the future when the emissions rate is expected to be at an increased or decreased level, as described further herein below. In some embodiments, event scheduler 213 uses the emissions rate forecasts to calculate an emissions differential value for each of a plurality of points in time during the future time period covered by the forecast. In some embodiments, event scheduler 314 determines an event score for an EDR event ending at each of the plurality of points in time. Based on the emissions differential values and the event scores, event scheduler 314 may generate and schedule EDR events to be run at a later time. Event scheduler 314 may also modify or cancel previously generated and scheduled EDR events based on updated emissions rate forecasts. In some embodiments, constraints produced by constraints engine 315 restrict the generation of EDR events by event scheduler 314.

Constraints engine 315 may create and maintain one or more constraints intended to ensure that EDR events scheduled by event scheduler 314 produce the least amount of user discomfort and annoyance. For example, constraints engine 315 may limit the number of events scheduled for a day. In some embodiments, constraints engine 315 also limits the number of a specific type of event per day. Constraints engine 315 may limit the generation of events during restricted times of day. For example, constraints engine 315 may limit the generation of an EDR event when users are typically asleep or at home. In some embodiments, constraints engine 315 defines a minimum score required for any EDR event scheduled by event scheduler 314. Constraints engine 315 may also define a minimum amount of time between scheduled EDR events or, more specifically, certain types of EDR events. For example, constraints engine 315 may require a minimum amount of time between the end of one event and the beginning of the next event of the same or a different type. In some embodiments, constraints engine 315 defines constraints specific to the user account of smart thermostat 160. For example, smart thermostat 160 may record every time a person overrides an EDR event and the details of the EDR event that was overridden. Constraints engine 315 may then use this information to define specific constraints restricting the generation of future EDR events matching the details of the previously overridden EDR events.

Ambient light sensor 316 may sense the amount of light present in the environment of smart thermostat 160. Measurements made by ambient light sensor 316 may be used to adjust the brightness of electronic display 311. In some embodiments, ambient light sensor 316 senses an amount of ambient light through cover 322. Therefore, compensation for the reflectivity of cover 322 may be made such that the ambient light levels are correctly determined via ambient light sensor 316. A light pipe may be present between ambient light sensor 316 and cover 322 such that in a particular region of cover 322, light that is transmitted through cover 322, is directed to ambient light sensor 316, which may be mounted to a printed circuit board (PCB), such as a PCB to which processing system 319 is attached.

One or more temperature sensors, such as temperature sensor 317, may be present within smart thermostat 160. Temperature sensor 317 may be used to measure the ambient temperature in the environment of smart thermostat 160. One or more additional temperature sensors that are remote from smart thermostat 160, such as remote temperature sensor 320, may additionally or alternatively be used to measure the temperature of the ambient environment. For example, one or more remote temperature sensors 320 placed throughout a home or building may be connected to smart thermostat 160 in order to provide a more accurate representation of the ambient temperature throughout the home or building.

Cover 322 may have a transmissivity sufficient to allow illuminated portions of electronic display 311 to be viewed through cover 322 from an exterior of smart thermostat 160 by a user. Cover 322 may have a reflectivity sufficient such that portions of cover 322 that are not illuminated from behind appear to have a mirrored effect to a user viewing a front of thermostat 310.

HVAC interface 318 can include one or more interfaces that control whether a circuit involving various HVAC control wires that are connected either directly with thermostat 310 or with backplate 360 is completed. A heating system (e.g., furnace, heat pump), cooling system (e.g., air conditioner), and/or fan may be controlled via HVAC wires by opening and closing circuits that include the HVAC control wires. HVAC interface 318 may also be some form of wireless interface that controls a separate electronic unit that communicates with the HVAC system via HVAC wires. In some embodiments, HVAC interface 318 implements one or more communication protocols. For example, HVAC interface 318 may use a proprietary serial communication protocol over wires as specified by a manufacturer of the HVAC system. As another example, HVAC interface 318 may communicate wirelessly to an HVAC system that supports Thread®, Zigbee®, CHIP/Matter®, or any other suitable wireless communication protocol.

Processing system 319 can include one or more processors. Processing system 319 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD) of smart thermostat 160.

Processing system 319 may output information for presentation to electronic display 311. Processing system 319 can receive information from touch sensor 312, ambient light sensor 316, and temperature sensor 317. Processing system 319 can perform bidirectional communication with network interface 313. Processing system 319 can control the HVAC system via HVAC interface 318. In some embodiments, process system 319 executes one or more software applications or services stored on or otherwise accessible by smart thermostat 160. For example, one or more components of smart thermostat 160, such as event scheduler 314 and constraints engine 315, may include one or more software applications or software services that may be executed by processing system 319.

Cloud-based server system 110 can maintain a user account mapped to smart thermostat 160. Smart thermostat 160 may periodically or intermittently communicate with cloud-based server system 110 to determine when an EDR event has been scheduled or when to adjust the setpoint in accordance with an EDR event. A person may interact with thermostat 310 via computerized device 350, which may be a mobile device, smartphone, tablet computer, laptop computer, desktop computer, or some other form of computerized device that can communicate with cloud-based server system 110 via network 130 or can communicate directly with thermostat 310 (e.g., via Bluetooth® or some other device-to-device communication protocol). A person can interact with an application executed on computerized device 350 to control or interact with thermostat 310.

Figure 4:
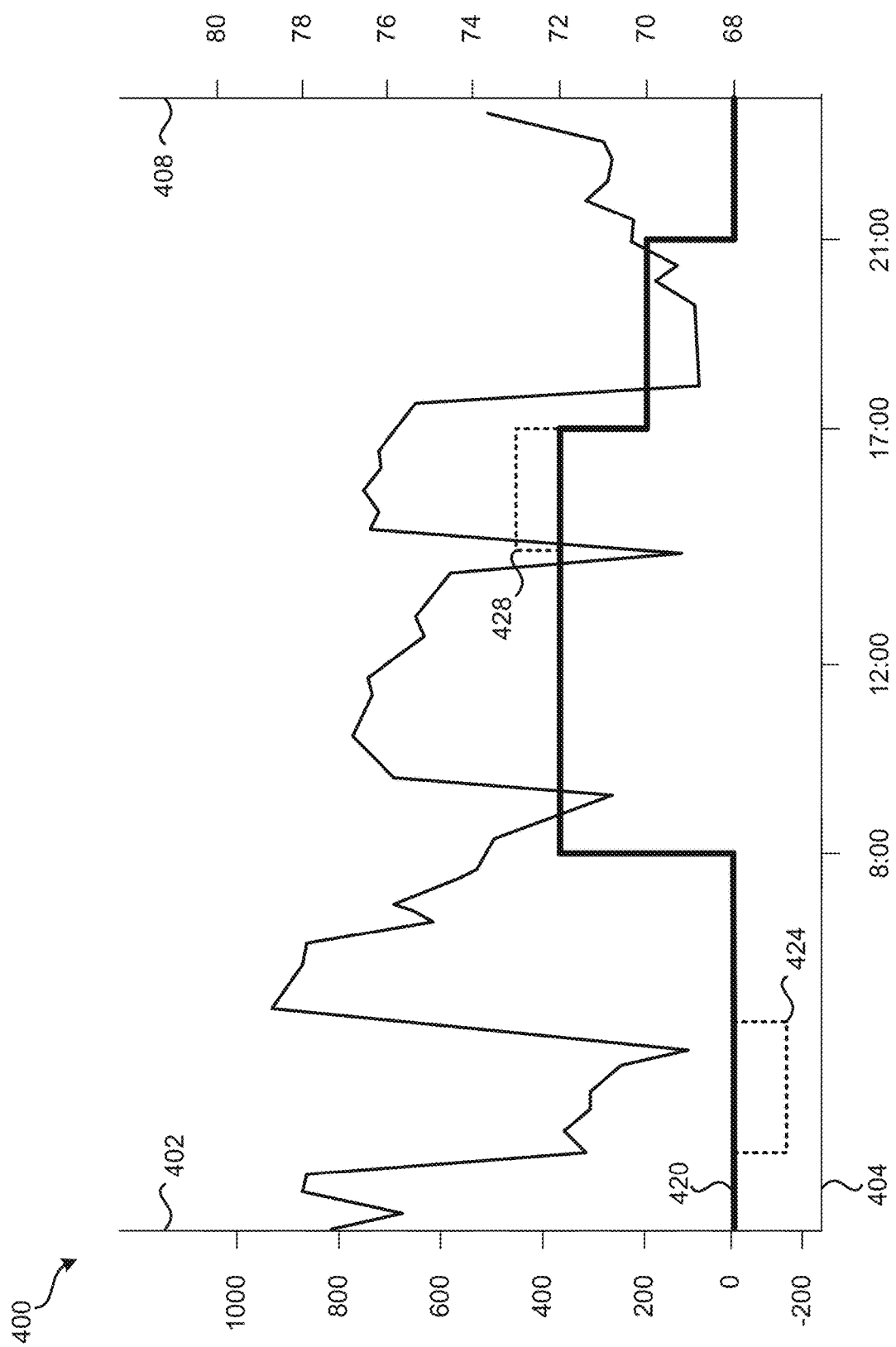
FIG. 4 illustrates a graph of forecast emissions data and thermostat setpoint temperatures over time.

FIG. 4 illustrates a graph 400 of forecast emissions data and thermostat setpoint temperatures over time. Graph 400 illustrates predicted emissions rate 416 as a function of time. Left vertical axis 402 indicates the emissions rate in lbs-CO2/MWh. However, any similar unit of measurement for emissions rate may be used. Horizontal axis 404 indicates the time in hours although any unit of time may be used to provide the desired level of granularity. Graph 400 also illustrates setpoint temperature 420 of a thermostat as a function of time. Right vertical axis 408 indicates the temperature as measured in degrees Fahrenheit although any similar unit of temperature measurement may be used. As illustrated in graph 400, predicted emissions rate 416 varies over time with some times of sustained low carbon emissions and other times of sustained high carbon emissions.

In some embodiments, normal operation of a thermostat includes adjusting the setpoint temperature at various points throughout the day according to a pre-programed and/or pre-defined schedule. For example, in reference to graph 400, a thermostat may include a defined schedule during the hotter times of the year where the setpoint temperature automatically adjusts to 68 degrees during the night when occupants may be sleeping and increase 72 degrees during the day when occupants may be away before gradually reducing the setpoint temperature again when occupants may be returning for the day. In some embodiments, EDR events represent a deviation from the pre-defined schedule and are executed as a load shifting event. Graph 400 illustrates potential load shifting events when a deviation to the setpoint temperature schedule for an interval of time may achieve a net reduction in overall carbon emissions.

These potential load shifting events are illustrated as deviations or adjustments to the setpoint temperature 420, for example, when an HVAC system is in a cooling mode (e.g., controlling an air conditioner). In another example, if an HVAC system was in a heating mode (e.g., controlling a heating unit), the deviations or adjustments to the setpoint temperature 420 may be in the opposite direction. There may be two types of load shifting or EDR events: preemptive events and deferred events. Each type of event may reduce the overall carbon emissions by shifting at least some electricity usage from times when electricity consumption will produce relatively high levels of carbon emissions to times when carbon emission will be relatively less. A preemptive event may reduce carbon emissions by increasing the electricity load during times of low carbon emissions, thereby reducing the electricity load during times when electricity consumption will produce high levels of carbon emissions. A deferred event may achieve a reduction in carbon emissions by decreasing the electrical load during times of high carbon emissions until the carbon emissions will be significantly less.

During times when an HVAC system is in a cooling mode (e.g., controlling an air conditioner), the load shifting events may be described as preemptive cooling events and deferred cooling events. During preemptive cooling events, the temperature setpoint may be decreased, making it more likely for air conditioning to run during the event rather than after the end of the event. If the emissions rate is expected to rise, a preemptive cooling event can be scheduled for a period of time before the rise in order to shift the electrical load to a time of lower emissions and away from the time of elevated emissions. For example, as illustrated in graph 400, the predicted emissions rate 416 is expected to be relatively low for a period of time before 9:00 before rising relatively high at 9:00. Therefore, preemptive cooling event 424 may be scheduled during the period of time before 9:00 and may be set to end as the predicted emissions rate 416 rises at 9:00. By reducing the setpoint temperature during preemptive cooling event 424, the HVAC system may cause the ambient temperature in the controlled environment to decrease below the original setpoint temperature 420. After preemptive cooling event 424 ends, the HVAC system may not require as much electricity as the temperature inside the controlled environment slowly rises to match the setpoint temperature 420. In this way, the HVAC system can consume more cleaner electricity during times of lower carbon emissions and less dirty electricity during times of higher carbon emissions.

During deferred cooling events, on the other hand, the temperature setpoint is increased, making it more likely for air conditioning to run after the end of the event rather than before the end of the event. If the emissions rate is expected to drop, a deferred cooling event may be scheduled for a period of time before the emissions rate drops in order to shift the electrical load away from a time of elevated emissions and towards a time of lower emissions. For example, as illustrated in graph 400, the predicted emissions rate 416 is expected to be relatively high for a period starting at 11:00 before dropping for a period of time before 12:00. Thus, deferred cooling event 428 may be scheduled during the period of time starting at 11:00 and may be set to end as the predicted emissions rate 416 drops closer to 12:00. By increasing the setpoint temperature during deferred cooling event 428, the HVAC system may use less electricity as the temperature inside the controlled environment slowly rises to match the adjusted setpoint temperature. After deferred cooling event 428 ends, the HVAC system may then use additional electricity to restore the ambient temperature in the controlled environment to the original setpoint temperature 420. In this way, the HVAC system can consume less electricity during times of higher carbon emissions and more electricity during times of lower carbon emissions.

Similarly, during times when an HVAC system is in a heating mode (e.g., controlling a heating unit), the load shifting events may be described as preemptive heating events and deferred heating events. As would be readily appreciated by the skilled artisan, the present teachings regarding preemptive heating events and deferred heating events as applied in the context of emissions demand response are applicable for structures in which the underlying power source for heat is electrical (e.g., resistive heating, heat pumps, electrical radiative heating, etc.) rather than non-electrical (e.g., natural gas, oil, etc.) Preemptive heating events may raise the setpoint temperature 420, making it more likely for heaters to run before the end of the event rather than after the end of the event. If the emissions rate is expected to rise, a preemptive heating event may be scheduled for a period of time before the emissions rate rises in order to shift the electrical load away from a time of elevated emissions and towards a time of lower emissions. For example, with reference to graph 400, instead of decreasing the setpoint temperature 420 for a preemptive cooling event 424, the setpoint temperature would be increased for a preemptive heating event. Likewise, deferred heating events may decrease the setpoint temperature 420, making it more likely for heaters to run after the end of the event rather than before the end of the event. If the emissions rate is expected to drop, a deferred heating event may be scheduled for a period of time before the emissions rate drops in order to shift the electrical load away from a time of elevated emissions and towards a time of lower emissions. For example, with reference to graph 400, instead of increasing the setpoint temperature 420 for a deferred cooling event 428, the setpoint temperature would be decreased for a deferred heating event.

In some embodiments, load shifting events are preceded by a period of pre-conditioning. A pre-conditioning period may be a period of time prior to the beginning of a load shifting event when the setpoint temperature is adjusted in the opposite direction relative to the setpoint schedule as the upcoming load shifting event. For example, in the case of a preemptive cooling event where the setpoint temperature will be reduced relative to the setpoint schedule, a pre-conditioning period may increase the setpoint temperature relative to the setpoint schedule for a period of time before the start of the preemptive cooling event. In some embodiments, the pre-conditioning period is caused to occur immediately before the load shifting event. In other embodiments, there is a gap between the pre-conditioning period and the load shifting events, such as 5 minutes, 10 minutes, 15 minutes, or a similarly suitable amount of time. By increasing the setpoint temperature relative to the setpoint schedule prior to reducing the setpoint temperature relative to the setpoint schedule, the HVAC system may be less likely to run before the event, thereby shifting additional electrical load from before the event towards the period of time during the preemptive cooling event.

In some embodiments, load shifting events are followed by a period of post-conditioning. A post-conditioning period may be a period of time after the end of a load shifting event when the setpoint temperature is adjusted in the opposite direction relative to the setpoint schedule as the load shifting event that just ended. For example, in the case of a preemptive heating event where the setpoint temperature will be increased relative to the setpoint schedule, a post-conditioning period may reduce the setpoint temperature relative to the setpoint schedule for a period of time after the end of the preemptive heating event. In some embodiments, the post-conditioning period is caused to occur immediately after the load shifting event. In other embodiments, there is a gap between the load shifting events and the post-conditioning period, such as 5 minutes, 10 minutes, 15 minutes, or a similarly suitable amount of time. By reducing the setpoint temperature after increasing the setpoint temperature, the HVAC system may be less likely to run after the event, thereby shifting additional electrical load from after the event towards the period of time during the preemptive heating event. In some embodiments, load shifting events are preceded by a pre-conditioning period in addition to being followed by a post-conditioning period.

In some embodiments, the pre-conditioning and/or post-conditioning periods are performed by scheduling a preemptive event and a deferred event in close proximity. For example, by scheduling a preemptive cooling event to end at the same time as a deferred cooling event will begin, the preemptive cooling event may perform the function of pre-conditioning the preemptive cooling event. As another example, by scheduling a preemptive heating event to end at the same time as a deferred heating event will begin, the deferred heating event may perform the function of a post-conditioning event.

As illustrated in graph 400, predicted emissions rate 416 may rise and fall sharply at multiple points over time. To optimize the scheduling and generation of load shifting events, various metrics may be used to quantify the emissions savings potential at any given time. In some embodiments, an emissions differential value may be used to quantify the emissions savings potential. An emissions differential value may be understood as the rate of change of carbon emissions at any given point in time. The greater (e.g., more positive) the emissions differential value is at a point in time, the more emissions may be avoided by shifting load from after the point in time to before the point in time. This may be accomplished, for example, by scheduling a preemptive heating or cooling event ending at the point in time. Similarly, the lesser (e.g., more negative) the emissions differential value is at a point in time, the more emissions may be avoided by shifting load from before the point in time to after the point in time. This may be accomplished, for example, by scheduling a deferred heating or cooling event ending at the point in time.

One way of calculating the emissions differential value at a given point in time may be by evaluating the predicted emissions rate 416 over the course of an emissions differential window surrounding the point in time. For example, to calculate the emissions differential value at a point in time t, the emissions rate over a one hour emissions window, including thirty minutes before and after the point in time t, may be analyzed. The emissions differential at time t may be calculated by subtracting the average emissions rate over the thirty minutes ending at time t from the average emissions rate over the thirty minutes starting at time t. While an emissions differential window of one hour is used as an example, it should be understood that any amount of time before and after time t may be analyzed to determine the emissions differential value at time t. Calculating the emissions differential value and its application in generating EDR events will be described in further detail in relation to FIGS. 5-9.

Figure 5:
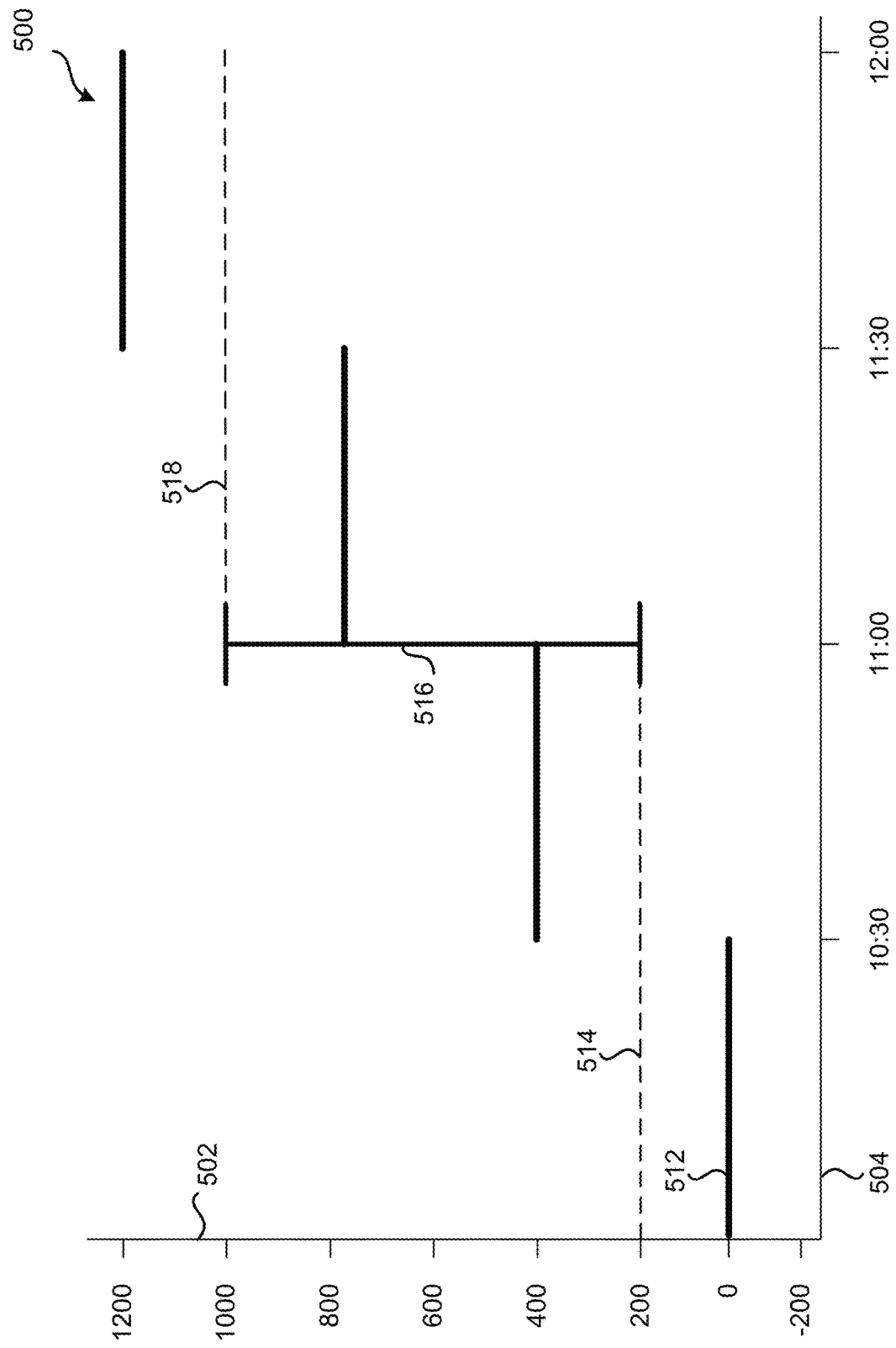
FIG. 5 illustrates a graph indicative of a positive emissions differential value.

FIG. 5 illustrates a graph 500 indicative of a positive emissions differential value. Graph 500 illustrates predicted emissions rate 512 as a function of time. Graph 500 represents the same x-axis 504 and y-axis 502 as graph 400 described in relation to FIG. 4, supra. The emissions differential value at a point in time t may be calculated by subtracting the average emissions rate over a period of time ending at time t from the average emissions rate over a period of time starting at time t. Graph 500 indicates a positive emissions differential value 516 at 11:00. Emissions differential value 516 may be calculated by evaluating the emissions rate over an emissions differential window. In this example, the emissions differential window spans across two hours, starting at 10:00 and ending at 12:00. Average beginning emissions rate 514 from 10:00 to 11:00 in this example is 200 because predicted emissions rate 512 from 10:00 to 10:30 is 0 and predicted emissions rate 512 from 10:30 to 11:00 is 400. Average ending emissions rate 518 from 11:00 to 12:00 in this example is 1000 because predicted emissions rate 512 from 11:00 to 11:30 is 800 and predicted emissions rate 512 from 11:30 to 12:00 is 1200. Thus, in this example, emissions differential value 516 may be calculated by subtracting average beginning emissions rate 514 from average ending emissions rate 518 to arrive at a positive emissions differential value 516 of 800.

Figure 6:
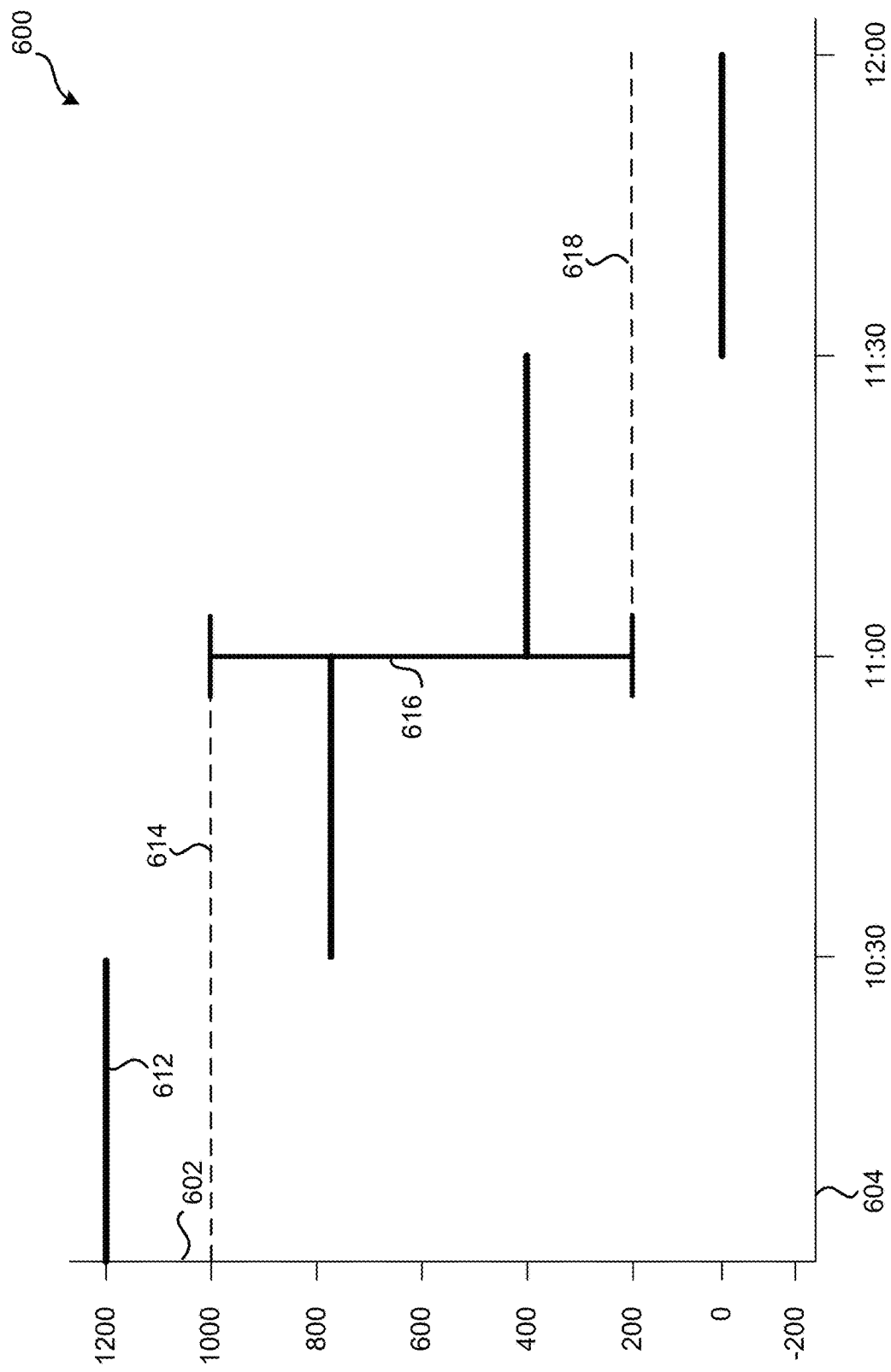
FIG. 6 illustrates a graph indicative of a negative emissions differential value.

FIG. 6 illustrates a graph 600 indicative of a negative emissions differential value. Graph 600 illustrates predicted emissions rate 612 as a function of time. Graph 600 represents the same x-axis 604 and y-axis 602 as graph 400 described in relation to FIG. 4, supra. Graph 600 indicates a negative emissions differential value 616 at 11:00. A similar calculation, as described in relation to FIG. 5, supra, may be conducted to determine emissions differential value 616. In this example, the emissions differential window is two hours, starting at 10:00 and ending at 12:00. Average beginning emissions rate 614 from 10:00 to 11:00 in this example is 1000 because predicted emissions rate 612 from 10:00 to 10:30 is 1200 and predicted emissions rate 612 from 10:30 to 11:00 is 800. Average ending emissions rate 618 from 11:00 to 12:00 in this example is 200 because predicted emissions rate 612 from 11:00 to 11:30 is 400 and predicted emissions rate 612 from 11:30 to 12:00 is 0. Therefore, in this example, emissions differential value 616 may be calculated by subtracting average beginning emissions rate 614 from average ending emissions rate 618 to arrive at a negative emissions differential value 616 of −800.

Figure 7:
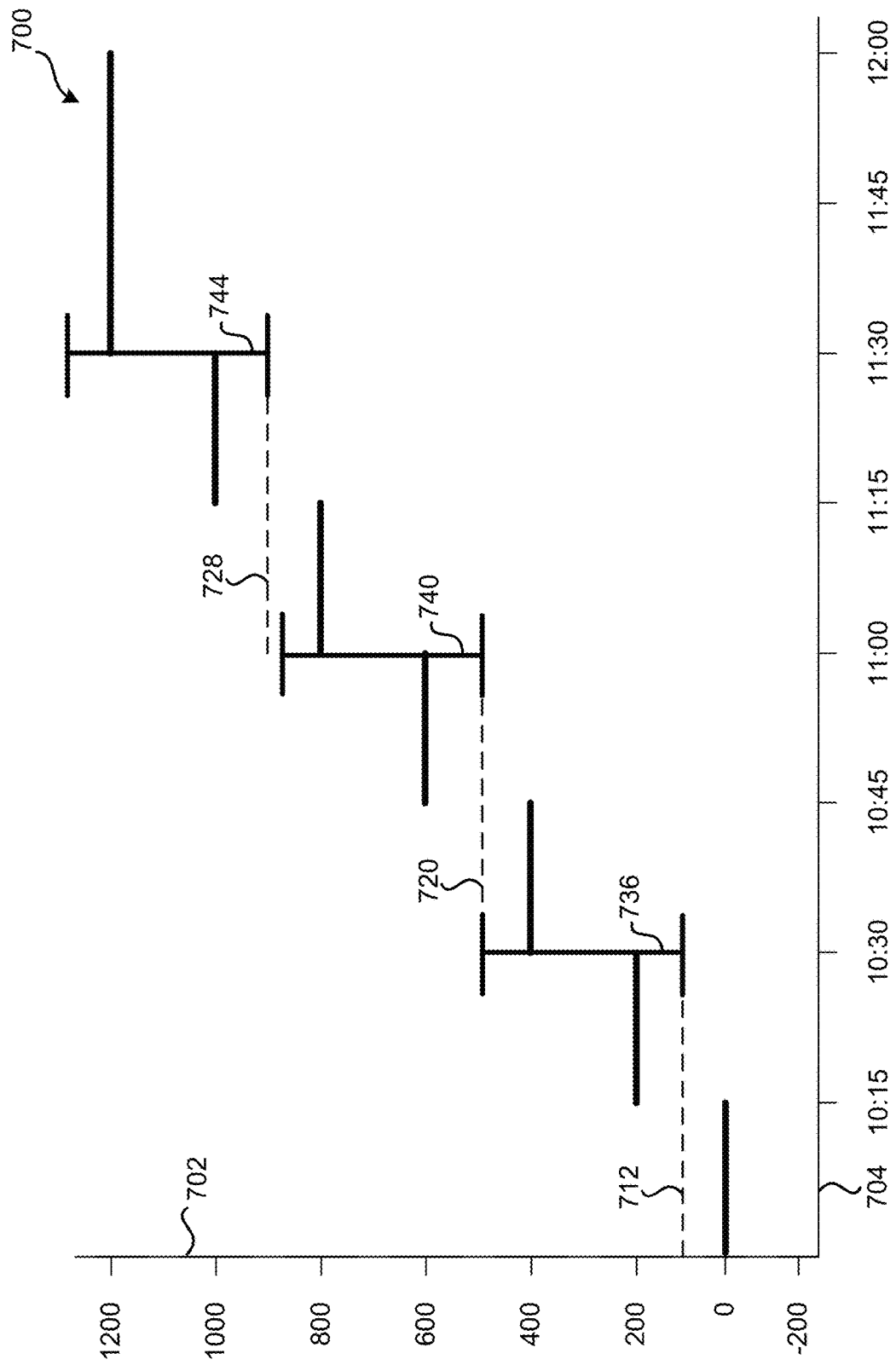
FIG. 7 illustrates a graph indicative of multiple emissions differential values.

FIG. 7 illustrates a graph 700 of multiple emissions differential values. Graph 700 represents the same x-axis 704 and y-axis 702 as graph 400 described in relation to FIG. 4, supra. Graph 700 illustrates that multiple emissions differential values 736, 740, and 744 may be calculated using shorter emissions differential windows. For example, emissions differential value 736 may be calculated using a one hour window by subtracting average beginning emissions rate 712 from average ending emissions rate 720 over the emissions differential window spanning from 10:00 to 11:00.

While various lengths of time are used for the emissions differential window herein, it should be understood that any appropriate amount of time may be used to evaluate the emissions differential value at a given point in time. For example, by using increasingly shorter emissions differential windows, the emissions differential value may more precisely reflect the predicted rate of change in carbon emissions at a given point of time. On the other hand, by using increasingly longer emissions differential windows, the emissions differential value may more accurately reflect the rate of change in carbon emissions over a longer period of time.

Generally speaking, as increasingly shorter differential windows are used, the emissions differential value becomes more immediately responsive to changes in the emissions rate, but also can become more susceptible to noise in the emissions rate and can lead to over-sensitivity, over-control, and/or overly high numbers of EDR events. As increasingly longer differential windows are used, the emissions differential value becomes less responsive to changes in the emissions rate, and although becoming less susceptible to noise in the emissions rate, can lead to under-sensitivity, under-control, and/or insufficiently low numbers of EDR events.

In some embodiments, the length of the emissions differential window may be based on the ideal length of proposed EDR events. For example, if EDR events are typically scheduled to last for thirty minutes, the emissions differential window may be an hour. This correlation may allow the system to better evaluate the expected average emissions rate during the entire EDR event. In some embodiments, multiple emissions differential windows of varying lengths may be used to evaluate the emissions differential value for the same point in time, thereby creating a plurality of emissions differential values for that point in time. This in turn may be used to determine the optimal length of an EDR event ending at the point in time. For example, if the forecast predicts a decrease in the emissions rate lasting for only thirty minutes and ending at a time t, an emissions differential window one hour long will identify those thirty minutes of low emissions as an optimal time for an EDR event while an emissions differential window two hours long may not.

Figure 8:
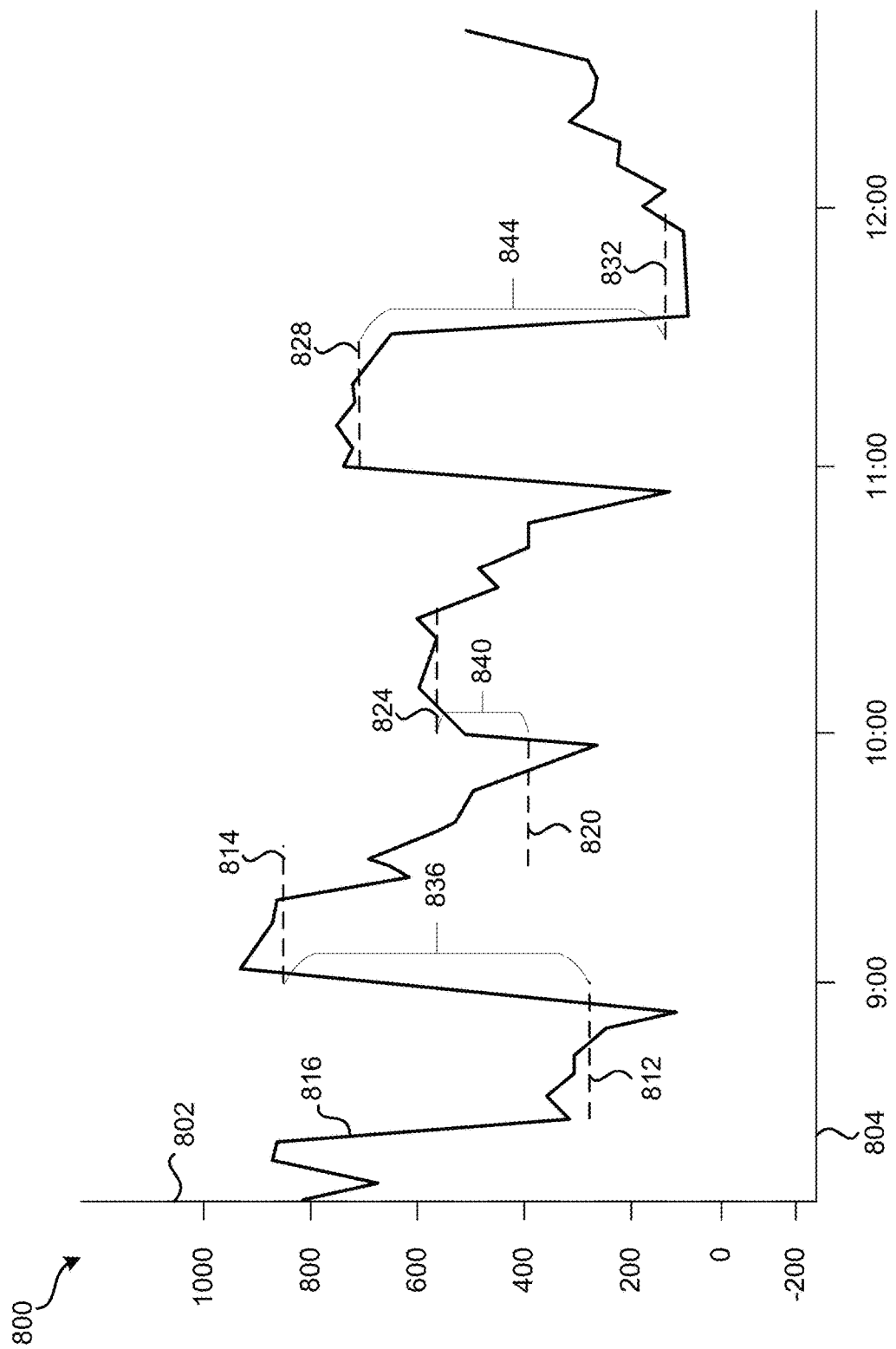
FIG. 8 illustrates another graph of forecast emissions data with emissions differential values.

FIG. 8 illustrates another graph 800 of forecast emissions data with emissions differential values. Graph 800 represents the same x-axis 804 and y-axis 802 as graph 400 described in relation to FIG. 4, supra. Graph 800 illustrates predicted emissions rate 816 over a period of time. Graph 800 also illustrates the calculation of emissions differential values 836, 840, and 844 at various points in time. For example, emissions differential value 836 is determined by subtracting average beginning emissions rate 812 from average ending emissions rate 814. Graph 800 illustrates that at various points in time the emissions differential value may be positive or negative. For example, emissions differential value 836 is positive while emissions differential value 844 is negative because average beginning emissions rate 828 is greater than average ending emissions rate 832. Graph 800 also illustrates that emissions differential values may be greater or smaller than other emissions differential values during a period of time. For example, emissions differential value 836 is greater than emissions differential value 840 because the difference between average emissions rates 812 and 814 is greater than the difference between average emissions rates 820 and 824.

As illustrated by way of example in FIGS. 5-8, emissions differential values may be calculated for any point in time using any length of emissions differential windows. This may result in a large set of emissions differential values for a similarly large number of times during a forecasted period of emissions data. In turn, this may result in many possibilities for scheduling EDR events. For example, a preemptive or deferred event could be scheduled to end at each time when an emissions differential value has been calculated.

In some embodiments, the system may assign an event score to each potential preemptive and deferred event based on the emissions differential value at the end of the event. The event scores may then be used to rank each of the potential events and select the best event to produce the greatest amount of carbon emissions savings. For preemptive events, the event score may be equal to the emissions differential value at the end of the event. Similarly, for deferred events, the event score may be equal to the negative of the emissions differential value at the end of the event. Assigning and determining event scores will be discussed further herein in relation to FIG. 9.

Figure 9:
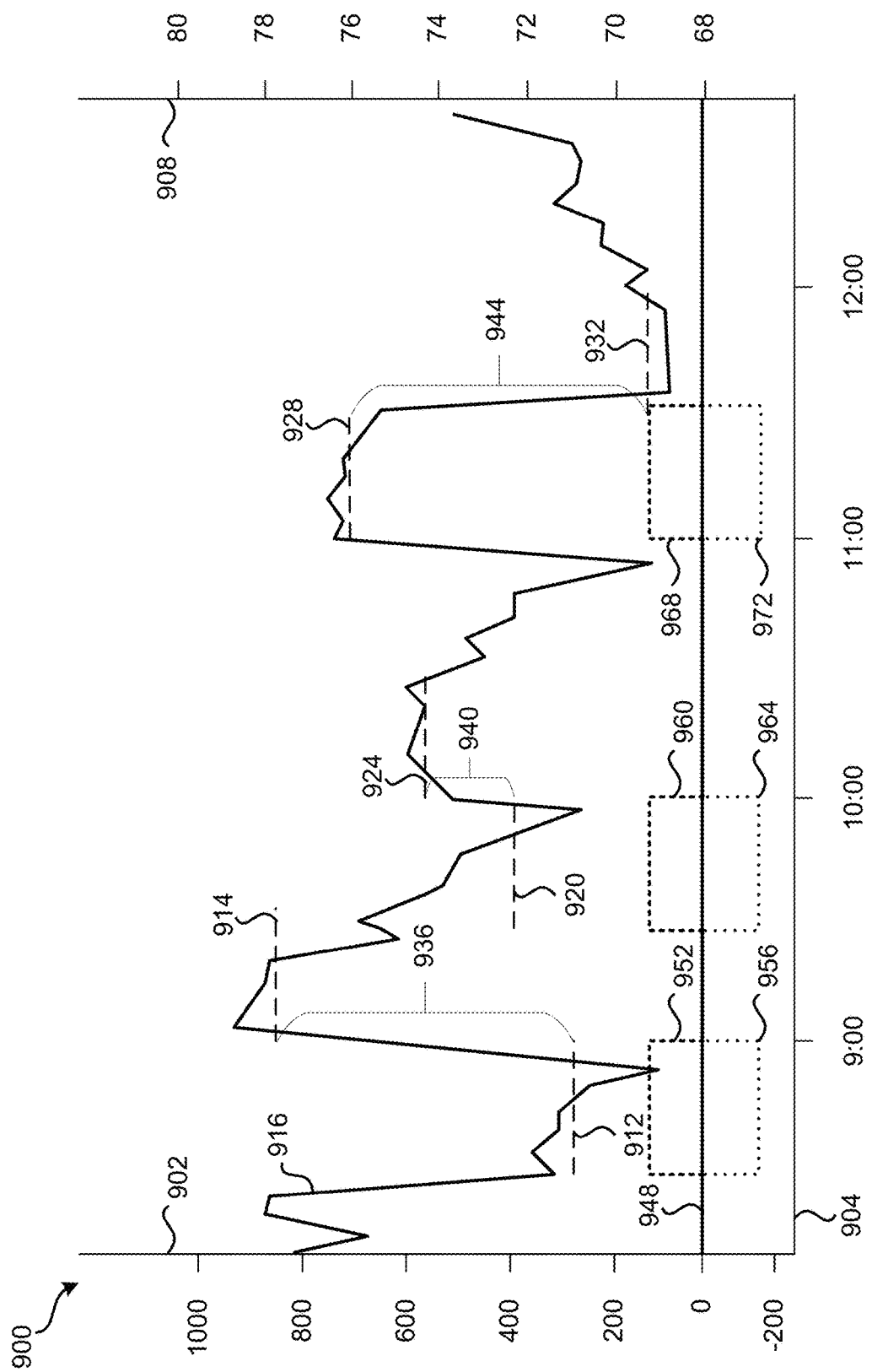
FIG. 9 illustrates another graph of forecast emissions data with potential emissions demand response events.

FIG. 9 illustrates another graph 900 of forecast emissions data with potential EDR events. Graph 900 represents the same predicted emissions rate 916, average emissions rates 912, 914, 920, 924, 928, and 932, as well as the same emissions differential values 936, 940, and 944 as described in relation to FIG. 8, supra. Graph 900 also illustrates a setpoint temperature 948 of a thermostat in a cooling mode with potential load shifting events 952, 956, 960, 964, 968, and 972 indicated by deviations to the setpoint temperature 948. In this example, the system may identify three potential times for load shifting events at approximately 9:00, 10:00, and 11:30.

After identifying potential load shifting events, the system may use the emissions differential values 936, 940, and 944 to calculate a score for each potential event. For example, using beginning average emissions rate 912 and ending average emissions rate 914, the system may determine that emissions differential value 936 at 9:00 is approximately 600. Emissions differential value 936 may then be used to assign an event score to preemptive event 956 and deferred event 952. For example, the event score for preemptive event 956 may be equal to emissions differential value 936 (e.g., 600), and the event score for deferred event 952 may be equal to the negative of emissions differential value 936 (e.g., −600). This result is consistent with the notion that a preemptive event will achieve a higher reduction in carbon emissions during times when emissions rate 916 is lower.

Emissions differential value 944 may be used in a similar fashion to assign event scores to preemptive event 972 and deferred event 968. For example, if the system determines that emissions differential value 944 is −600, the event score for preemptive event 972 is equal to the emissions differential value 944 (e.g., −600), and the event score for deferred event 968 is equal to the negative of emissions differential value 944 (e.g., 600). This result is consistent with the notion that a deferred event will achieve a higher reduction in carbon emissions when scheduled during times when the emissions rate 916 is higher. Similarly, emissions differential value 940 may be used to assign scores to preemptive event 964 and deferred event 960. In this example, the event score for preemptive event 964 may be equal to 200 while the event score for deferred event 960 may be equal to −200.

In some embodiments, after assigning an event score to each potential load shifting event, the system will select the optimal event for reducing carbon emissions based on the event having the best score. Determining the event with the best score may be done in any number of ways without departing from the scope of the present teachings, such as by ranking each of the potential load shifting events, or by using another suitable algorithm or method. For example, the system may determine that preemptive events 956, 964 and deferred event 968 represent the best potential load shifting events during the period of time being evaluated because their associated scores are each higher than the associated scores for deferred events 952, 960 and preemptive event 972. The system may also be restricted from generating load shifting events with scores lower than a minimum score.

In addition to restrictions based on a minimum score, there may be one or more other constraints placed on the generation of events. Constraints may be used in addition to emissions differential values in order to reduce overall carbon emissions while minimizing user discomfort and annoyance. The system may use any number or type of constraint to minimize user discomfort and annoyance. Some of the various types of constraints and how they can affect the generation of EDR events will be discussed further in relation to FIGS. 10 and 11.

Figure 10:
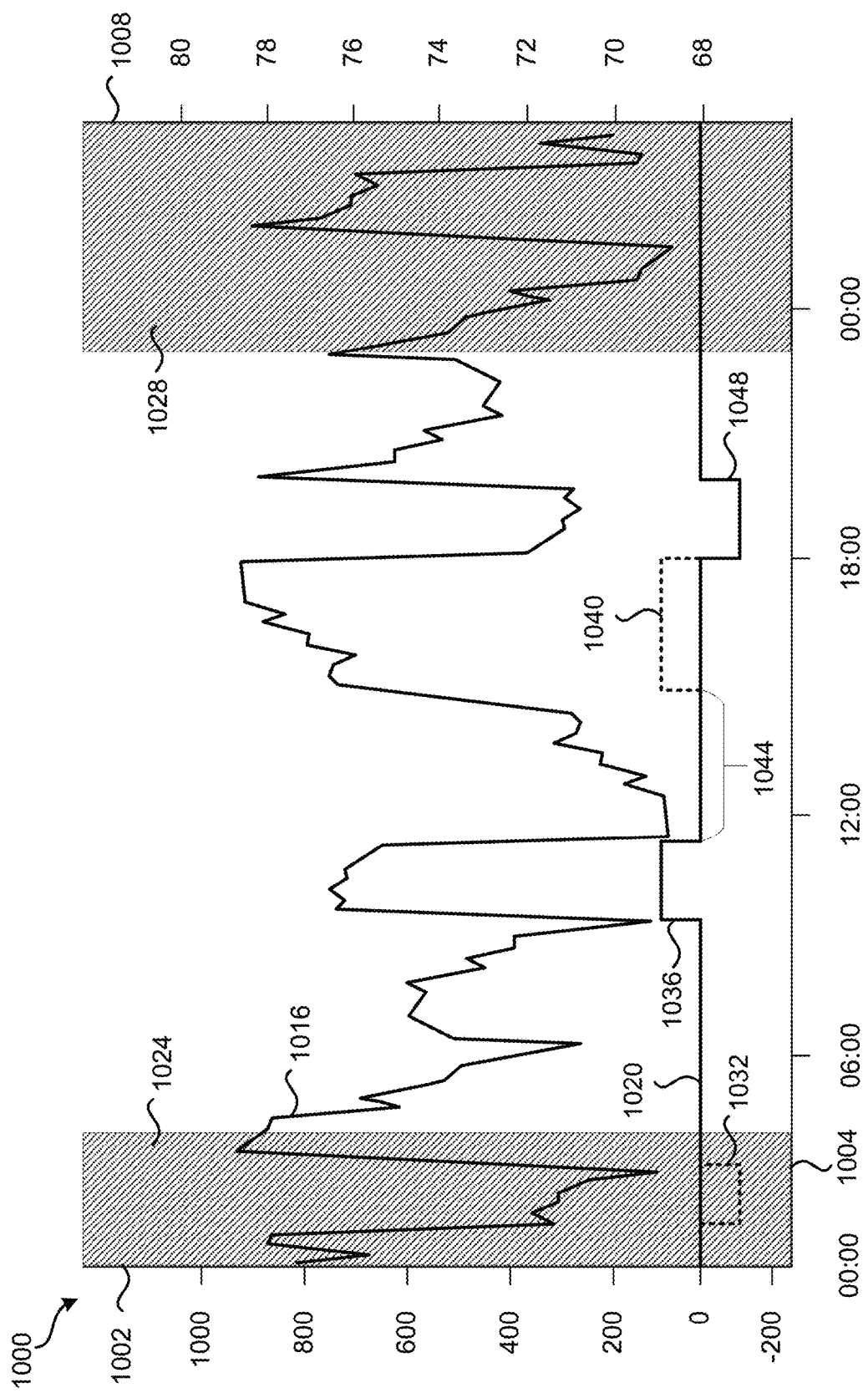
FIG. 10 illustrates another graph of forecast emissions data with time constraints.

FIG. 10 illustrates another graph 1000 of forecast emissions data with various time constraints. Graph 1000 represents the same x-axis 1004 and y-axes 1002 and 1008 as graph 400 described in relation to FIG. 4, supra. Graph 1000 illustrates predicted emissions rate 1016 over a period of time. Graph 1000 also illustrates setpoint temperature 1020 of a thermostat. As indicated in graph 1000 by the deviations to setpoint temperature 1020, the system may have already generated deferred cooling event 1036 and preemptive cooling event 1048, and may have considered generating potential preemptive cooling event 1032 and potential deferred cooling event 1040.

In some embodiments, the generation of load shifting events during certain times of day is restricted. For example, the system may be restricted from generating load shifting events at night or in the early morning. These times may correspond with when a user is asleep, more sensitive to changes in the ambient temperature, and therefore more likely to experience discomfort or annoyance caused by a change in the setpoint temperature. This type of restriction is illustrated in graph 1000 as first restricted time 1024 and second restricted time 1028. For example, after identifying potential preemptive cooling event 1032, the system may determine that it will coincide with first restricted time 1024 and cancel potential preemptive cooling event 1032. In some embodiments, the system may first determine that there is a restricted time when load shifting events may not be scheduled and not evaluate predicted emissions rate 1016 for potential events during the restricted time at all.

To avoid additional user discomfort and annoyance, the system may restrict the generation of load shifting events within a minimum amount of time of other load shifting events. For example, the system may be restricted from generating any event within an hour of the beginning or end of another event. The system may be restricted from generating two preemptive events or two deferred events within a close proximity of time. The system may enforce a minimum amount of time between the end of a preemptive event and the beginning of a deferred event. Potential deferred cooling event 1040 illustrates a possible conflict with various of these restrictions. In some embodiments, after generating deferred cooling event 1036 and preemptive cooling event 1048, the system may evaluate generating potential deferred cooling event 1040. The system may determine that there is enough time 1044 between deferred cooling event 1036 and potential deferred cooling event 1040. However, the system may then determine that the end of potential deferred cooling event 1040 is too close in proximity to the beginning of preemptive cooling event 1048.

Figure 11:
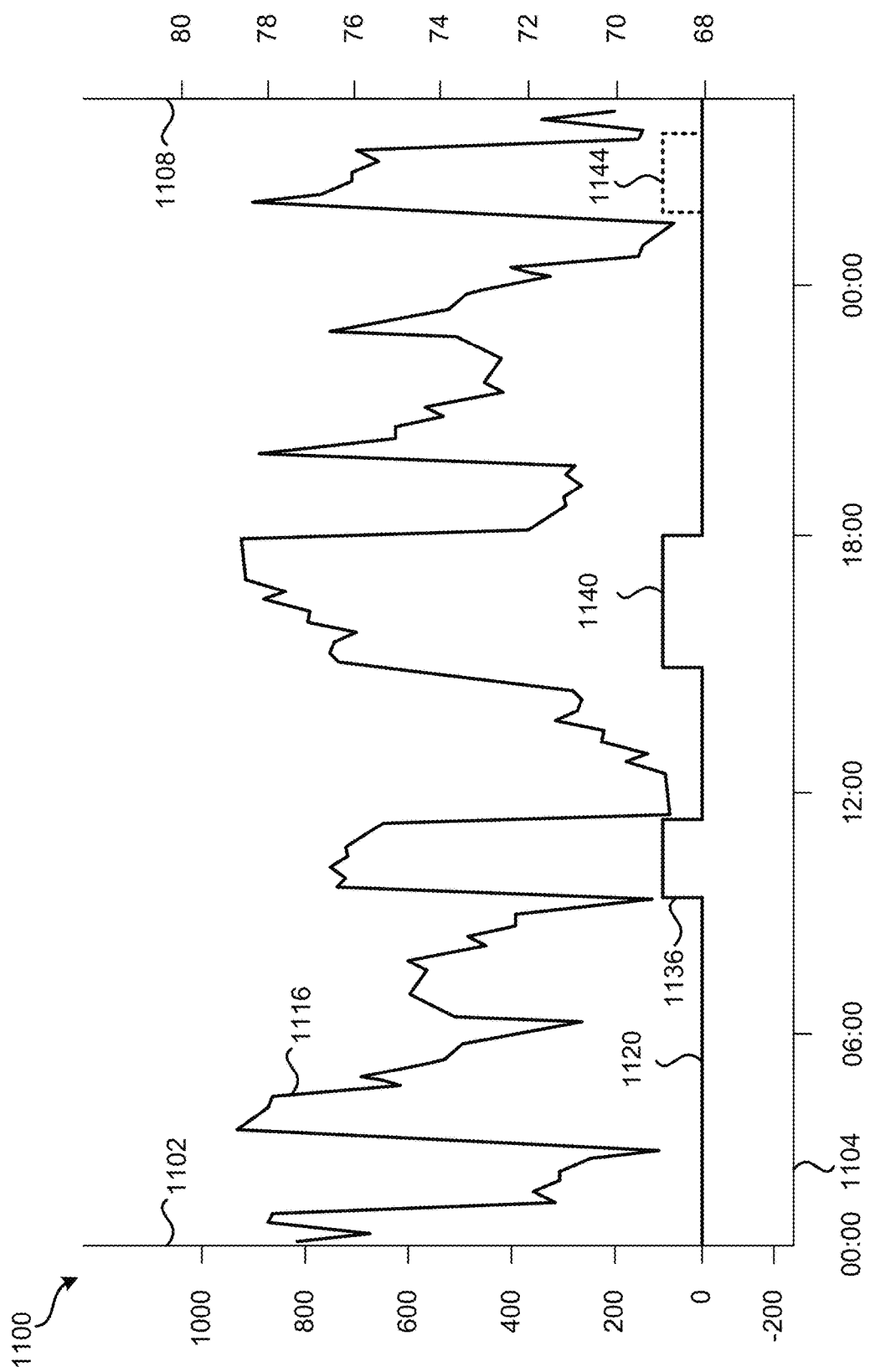
FIG. 11 illustrates another graph of forecast emissions data with previously generated emissions demand response events.

FIG. 11 illustrates another graph 1100 of forecast emissions data with previously generated EDR events. Graph 1100 represents the same x-axis 1104 and y-axes 1102 and 1108 as graph 400 described in relation to FIG. 4, supra. Graph 1100 illustrates predicted emissions rate 1116 over a period of time. Graph 1100 also illustrates setpoint temperature 1120 of a thermostat. As indicated in graph 1100 by the deviations to setpoint temperature 1120, the system may have already generated deferred cooling event 1136 and deferred cooling event 1140, and may have considered generating potential deferred cooling event 1144.

To avoid additional user discomfort and annoyance, the system may be restricted from generating more than a certain number of events during a predefined time period. For example, the system may be restricted from generating more than three load shifting events during any single day. In some embodiments, the system may be restricted to a maximum number of any single type of load shifting events. For example, the system may be restricted from generating more than two deferred events during a single day. This type of restriction is illustrated in graph 1100 as indicated by potential deferred cooling event 1144. While the system may not have reached the maximum number of total events in a day with deferred cooling events 1136 and 1140, it has already reached the maximum number of deferred events in a day. The system may therefore be restricted from generating potential deferred cooling event 1144.

Figure 12:
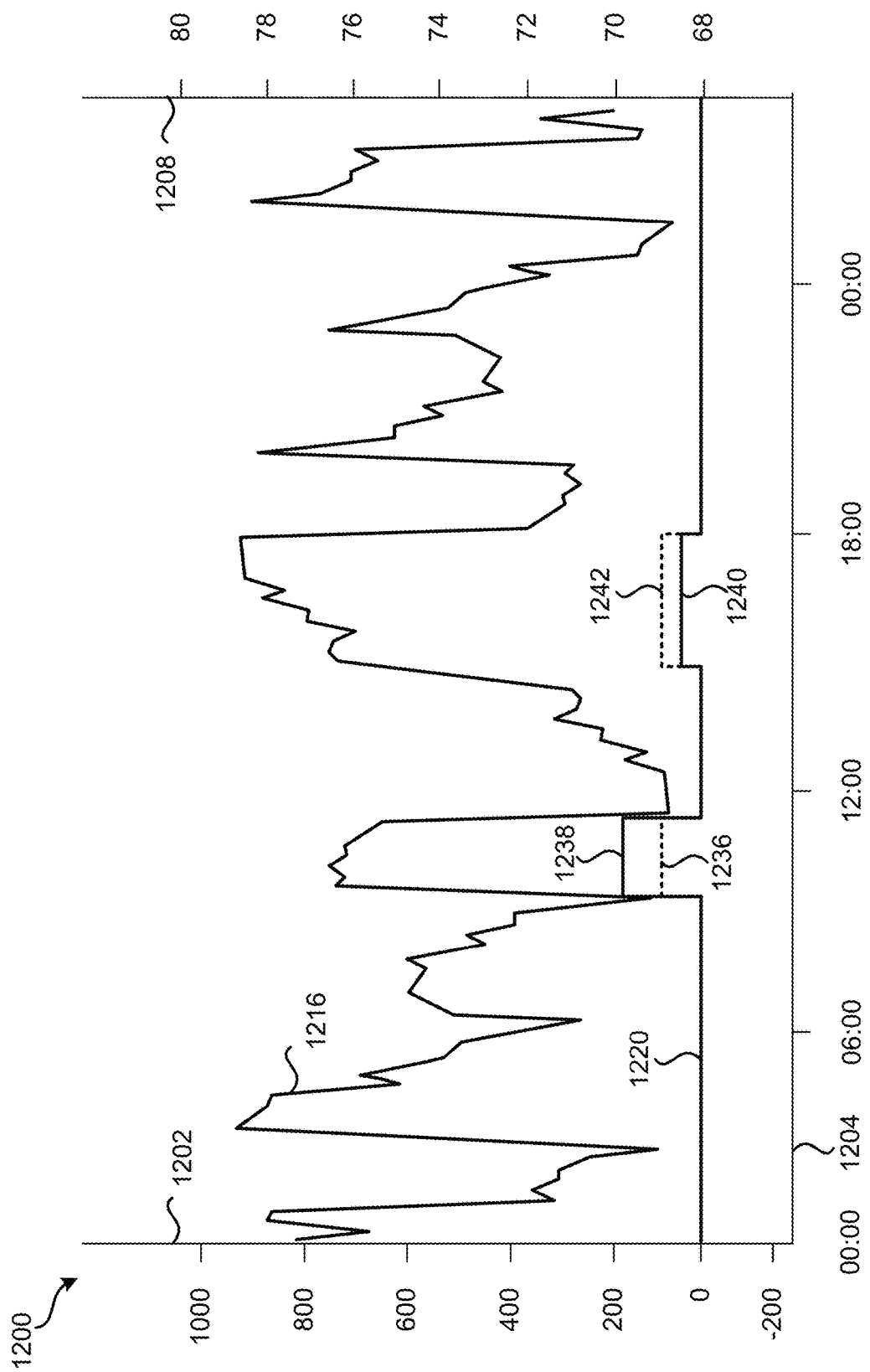
FIG. 12 illustrates a graph of emissions demand response events of varying magnitude and length.

FIG. 12 illustrates a graph 1200 of EDR events of varying magnitude and time. Graph 1200 represents the same x-axis 1204 and y-axes 1202 and 1208 as graph 400 described in relation to FIG. 4, supra. Graph 1200 illustrates predicted emissions rate 1216 over a period of time. Graph 1200 also illustrates setpoint temperature 1220 of a thermostat. As indicated in graph 1200 by the deviations to setpoint temperature 1220, the system may have already generated deferred cooling event 1238 and deferred cooling event 1240.

In addition to the constraints discussed above in relation to FIGS. 10-11, supra, the system may use other factors to reduce the amount of discomfort or annoyance experienced by a user when generating EDR events, and/or to increase the carbon reduction impact of the generated EDR events. In some embodiments, the system varies the magnitude of adjustments to the setpoint temperature relative to the setpoint schedule. For example, based on patterns of user behavior, the system may determine that deferred cooling events that adjust the setpoint temperature by two or more degrees relative to the setpoint schedule, such as deferred cooling event 1238, are commonly overridden by the user via real-time adjustment of the setpoint temperature of the thermostat. Based on this input, the system may determine that a 2 degree deviation is too uncomfortable for users associated with the thermostat and instead only generate deferred cooling events that adjust the setpoint temperature by 1 degree, as indicated by deferred cooling event 1236. In some embodiments, varying the magnitude of the adjustment to the setpoint temperature is accompanied by a variance in the duration of EDR events. For example, while EDR events may be generated with a smaller adjustment, the duration may be prolonged, as indicated by deferred cooling event 1242. In some embodiments, the magnitude of adjustments varies based on any number of factors, such as whether the thermostat is in a cooling or heating mode and/or whether the EDR event is a preemptive EDR event or a deferred EDR event. For example, while some people may not be willing to tolerate a 2 degree adjustment during deferred cooling events (e.g., making the ambient temperature hotter), they may still be willing to tolerate a 2 degree adjustment during preemptive cooling events (e.g., making the ambient temperature cooler).

In some embodiments, the system varies the length of EDR events in order to reduce user discomfort and annoyance. For example, the system may determine that deferred cooling events that last for more than two hours, such as deferred cooling event 1240, are commonly overridden by the user via real-time adjustment of the setpoint temperature of a thermostat at or around two hours into the event. Based on this input, the system may determine that events lasting longer than two hours cause an unacceptable amount of discomfort, and instead only generate deferred cooling events that last less than two hours, as indicated by deferred cooling event 1238. In some embodiments, the acceptable duration may vary based on any number of factors, such as whether the thermostat is in a cooling or heating mode and/or whether the EDR event is a preemptive EDR event or a deferred EDR event.

In some embodiments, the system varies both the duration and magnitude of adjustments to the setpoint temperature in order to reduce user discomfort while still reducing carbon emissions. For example, the system may determine that while one or more users will not tolerate a two degree adjustment for longer than two hours they may tolerate a one degree adjustment for up to three hours. As another example, the system may determine that while one or more users will not tolerate a three hour event with an adjustment greater than two degrees, they may tolerate a one hour event with up to a four degree adjustment.

In some embodiments, multiple EDR events with varying characteristics are distributed throughout a community for the same emissions rate event based on the various preferences of the people within the community. For example, in a community of 100 homes, if 50 of the homes are participating in an EDR program, 25 homes may receive an EDR event with a longer duration at a smaller adjustment while the other 25 homes receive an EDR event with a shorter duration at a larger adjustment. In this way, the system may cater to the preferences of each particular participant while still achieving a net reduction in carbon emissions.

Figure 13:
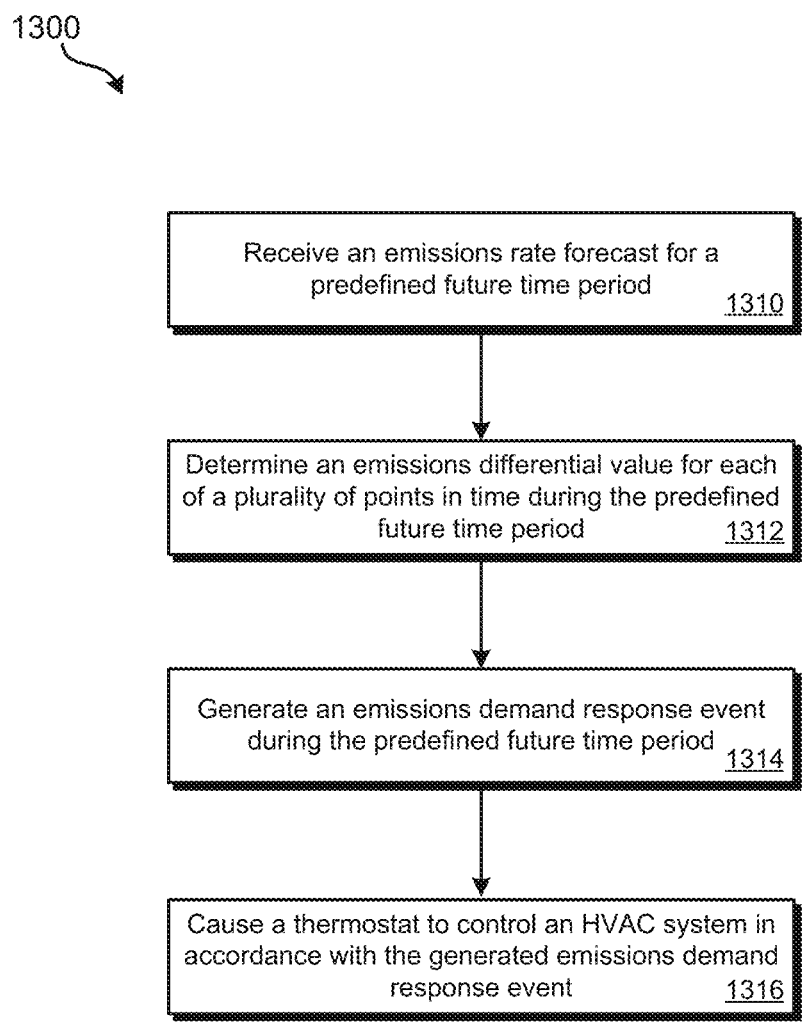
FIG. 13 illustrates an embodiment of a method for managing emissions demand response events.

Various methods may be performed using the systems detailed in FIGS. 1-3, supra, to implement EDR events as detailed in relation to FIGS. 4-12, supra. FIG. 13 illustrates an embodiment of method 1300 for performing an EDR event. In some embodiments, method 1300 may be performed by a cloud-based power control server system, such as cloud-based power control server system 110 as described in relation to FIG. 2, supra. For example, processing system 219 of cloud-based power control server system 110 may execute software from one or more modules such as event scheduler 213, constraints engine 214, and/or forecast engine 217. In some embodiments, method 1300 is performed by a smart device, such as smart thermostat 160 as described in relation to FIG. 3, supra. For example, processing system 319 of smart thermostat 160 may execute software from one or modules such as event scheduler 314 and constraints engine 315. In some embodiments, some steps of method 1300 are performed by a cloud-based power control server system, such as cloud-based power control server system 110 while other steps are performed by a smart device, such as smart thermostat 160.

Method 1300 may include, at block 1310, receiving an emissions rate forecast for a predefined future time period. The emissions rate forecast may include the predicted rate of carbon emissions over a period of time into the future. The rate of carbon emissions may be measured in lbs-CO2/MWh or any similar unit of measurement. The period of time into the future may be any number of hours including 24 hours into the future. The emissions rate forecast may be received from a commercial service that collects and analyzes emissions rate data from various sources such as utility companies that provide electricity to cities or regions. In some embodiments, the emissions rate forecast is received by a cloud-based power control server system such as cloud-based power control server system 110 as described in relation to FIG. 2, supra. The emissions rate forecast may also be received by a smart thermostat. In some embodiments, a smart thermostat, such as smart thermostat 160 as described in relation to FIG. 3, supra, may receive the emissions rate forecast from cloud-based power control server system 110.

At block 1312, an emissions differential value may be determined for each of a plurality of points in time during the predefined future time period. The emissions differential value may represent a rate of change in the predicted emissions rate at the respective point in time. The emissions differential value may be determined using the received emissions rate forecast. For example, the emissions differential value may be determined from a difference between a first average emissions rate ending at the point in time and a second average emissions rate starting at the point in time. Each average emissions rate may be the average emissions rate for various lengths of time. For example, the first average emissions rate may be the average emissions rate over thirty minutes leading up to the point in time while the second average emissions rate may be the average emissions rate starting at the point in time for thirty minutes after the point in time. The combination of time leading up to the point in time and after the point in time may be defined as an emissions differential window. In some embodiments, the emissions differential value is determined by a cloud-based power control server system such as cloud-based power control server system 110 as described in relation to FIG. 2, supra. In some embodiments, the emissions differential value is determined by a smart thermostat, such as smart thermostat 160 as described in relation to FIG. 3, supra.

At block 1314, an EDR event may be generated during the predefined future time period. The EDR event may be generated based on the determined plurality of emissions differential values. For example, the EDR event may be generated with an end time corresponding with the time of the emissions differential value of the plurality of emissions differential values representing the greatest rate of change in the predicted emissions rate. The type of EDR event may also be based on the emissions differential value at the end of the EDR event. For example, when the emissions differential value is negative, the EDR event may be a deferred event, and when the emissions differential value is positive, the EDR event may be a preemptive event. The EDR event may be generated by a cloud-based power control server system, such as cloud-based power control server system 110 as described in relation to FIG. 2, supra. In some embodiments, the EDR event may be generated by a smart thermostat, such as smart thermostat 160 as described in relation to FIG. 3, supra.

In some embodiments, the EDR event is also generated based on a predefined maximum number of EDR events. For example, when the predefined maximum number of EDR events is three, the generation of additional EDR events may be restricted after a third EDR event is generated. In some embodiments, the predefined maximum number of EDR events is set by the system based on how many EDR events an average user is willing to tolerate. In some embodiments, the predefined maximum number of EDR events is set or modified by user inputs. For example, a user may set the predefined maximum number through various settings available to the user. As another example, the system may determine, based on historical data for an account associated with the user, that the user will not tolerate more than a certain number of EDR events per day. In some embodiments, the system considers the predefined maximum number of EDR events when generating events. For example, the system may only consider generating up to the maximum number of events. In some embodiments, the system will generate more events than the maximum number and later apply the constraint to reduce the number. For example, the system may generate a number of events and then apply a constraints algorithm to arrive at a reduced number of events set for execution.

The generation of the EDR event may also be restricted to certain times of day. For example, the generation of events at night may be restricted. The generation of the EDR event may also be restricted by the times associated with previously generated EDR events. For example, the time between the end of a previously generated EDR event may restrict the generation of an EDR event having a start time too close in proximity to the previously generated EDR event.

At block 1316, a thermostat may be caused to control an HVAC system in accordance with the generated EDR event. The generated EDR event may be a preemptive event or a deferred event. A preemptive EDR event may cause a thermostat to adjust a setpoint temperature in order to increase the usage of the HVAC system for a period of time prior to the end of the preemptive EDR event. During times when the HVAC system is in a cooling mode, a preemptive EDR event may cause the thermostat to decrease the setpoint temperature. During times when the HVAC system is in a heating mode, a preemptive EDR event may cause the thermostat to increase the setpoint temperature. A deferred EDR event may cause a thermostat to adjust a setpoint temperature in order to decrease the usage of the HVAC system for a period of time prior to the end of the deferred EDR event. During times when the HVAC system is in a cooling mode, a deferred EDR event may cause the thermostat to increase the setpoint temperature. During times when the HVAC system is in a heating mode, a deferred EDR event may cause the thermostat to decrease the setpoint temperature. In some embodiments, a cloud-based power control server system, such as cloud-based power control server system 110 as described in relation to FIG. 2, supra, causes a smart thermostat, such as smart thermostat 160 as described in relation to FIG. 3, supra, to control the HVAC system.

Figure 14:
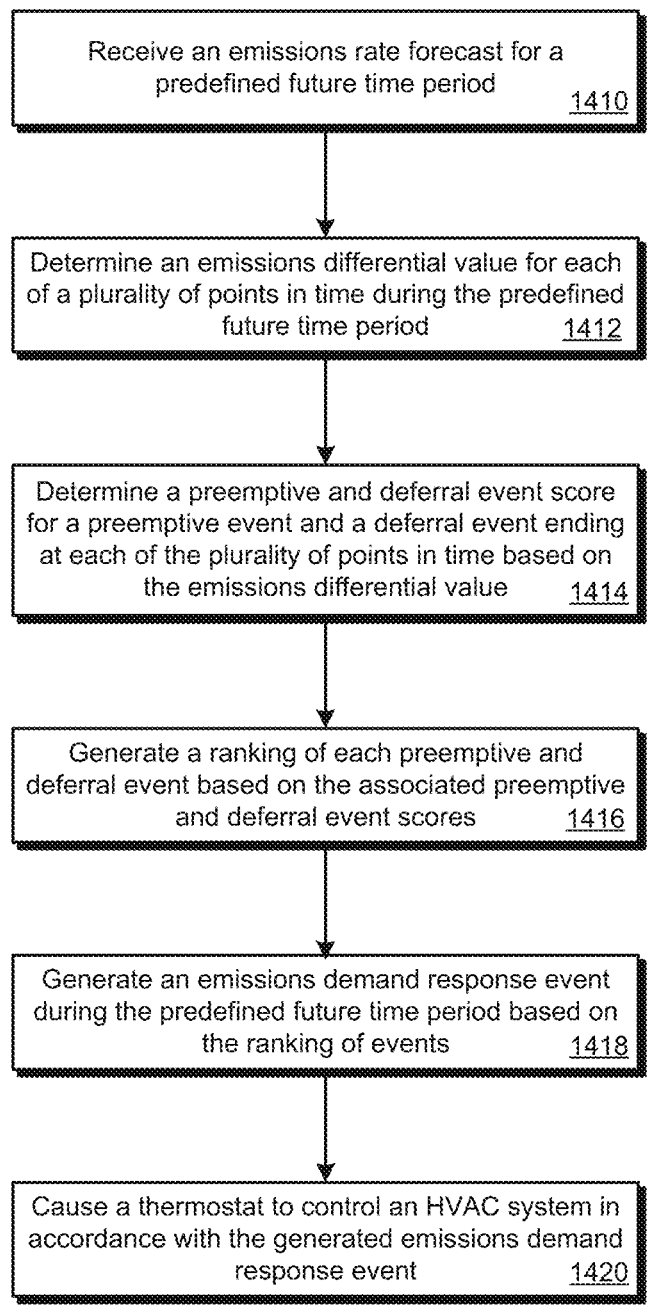
FIG. 14 illustrates an embodiment of a method for managing emissions demand response events based on a ranking of event scores.

FIG. 14 illustrates an embodiment of a method 1400 for performing an EDR event based on a ranking of event scores. In some embodiments, method 1400 is performed by any or all of the same components as described in relation to method 1300 described in relation to FIG. 13, supra. Method 1400 may include, at block 1410, receiving an emissions rate forecast for a predefined future time period. In some embodiments, the system generates the emissions rate forecast internally. For example, the system may collect and analyze emissions rate data from utility companies in order to generate the emissions rate forecast. The emissions rate forecast may include the predicted rate of carbon emissions over a period of time into the future. The rate of carbon emissions may be measured in lbs-CO2/MWh or any similar unit of measurement. The period of time into the future may be any number of hours including 24 hours into the future. The emissions rate forecast may be received from a commercial service that collects and analyzes emissions rate data from various sources such as utility companies that provide electricity to cities or regions.

In some embodiments, the emissions rate forecast is received by a cloud-based power control server system such as cloud-based power control server system 110 as described in relation to FIG. 2, supra. The emissions rate forecast may also be received by a smart thermostat, such as smart thermostat 160 as described in relation to FIG. 3, supra, from cloud-based power control server system 110. In some embodiments, the emissions rate forecast is generated by a cloud-based power control server system. For example, the emissions rate forecast may be generated by a forecast engine, such as forecast engine 217 as described in relation to FIG. 2, supra, using emissions data collected from utility companies. In some embodiments, the generation of the emissions rate forecast is based on historical emissions data, current emissions data, and/or weather data.

At block 1412, an emissions differential value may be determined for each of a plurality of points in time during the predefined future time period. The emissions differential value may represent a rate of change in the predicted emissions rate at the respective point in time. The emissions differential value may be determined using the emissions rate forecast. For example, the emissions differential value may be determined from a difference between a first average emissions rate ending at the point in time and a second average emissions rate starting at the point in time. Each average emissions rate may be the average emissions rate for various lengths of time. For example, the first average emissions rate may be the average emissions rate over thirty minutes leading up to the point in time while the second average emissions rate may be the average emissions rate starting at the point in time for thirty minutes after the point in time. The combination of time leading up to the point in time and after the point in time may be defined as an emissions differential window. In some embodiments, the emissions differential value is determined by a cloud-based power control server system such as cloud-based power control server system 110 as described in relation to FIG. 2, supra. In some embodiments, the emissions differential value is determined by a smart thermostat, such as smart thermostat 160 as described in relation to FIG. 3, supra.

At block 1414, a preemptive and deferred event score may be determined for a preemptive event and a deferred event ending at each of the plurality of points in time based on the emissions differential value. The preemptive event score for a preemptive event ending at the time associated with the emissions differential value may be equal to the emissions differential value. A higher preemptive event score may correspond with a faster increase in the rate of emissions at the point of time while a lower preemptive event score may correspond with a slower increase in the rate of emissions at the point in time. The deferred event score for a deferred event ending at the time associated with the emissions differential value may be equal to the negative of the emissions differential value. A higher deferred event score may correspond with a faster decrease in the rate of emissions at the point in time while a lower deferred event score may correspond with a slower decrease in the rate of emissions at the point in time. In some embodiments, the preemptive and deferred event scores are determined by a cloud-based power control server system such as cloud-based power control server system 110 as described in relation to FIG. 2, supra. In some embodiments, the preemptive and deferred event scores are determined by a smart thermostat, such as smart thermostat 160 as described in relation to FIG. 3, supra. At block 1416, a ranking of each preemptive and deferred event may be generated based on the associated preemptive and deferred event scores. In some embodiments, after assigning an event score to each potential load shifting event, the system will select the optimal event for reducing carbon emissions based on the event having the best score. Determining the event with the best score may be done in any number of ways, such as by ranking each of the potential load shifting events, or by using any other suitable algorithm or method.

At block 1418, an EDR event may be generated during the predefined future time period based on the ranking of events. For example, the EDR event may be generated based on the highest ranking event with the highest event score. In some embodiments, the EDR event may also be based on a predefined maximum number of EDR events. For example, when the predefined maximum number of EDR events is three, the generation of additional EDR events may be restricted after a third EDR event is generated. The EDR event may be generated by a cloud-based power control server system, such as cloud-based power control server system 110 as described in relation to FIG. 2, supra. In some embodiments, the EDR event is generated by a smart thermostat, such as smart thermostat 160 as described in relation to FIG. 3, supra.

At block 1420, a thermostat may be caused to control an HVAC system in accordance with the generated EDR event. The generated EDR event may be a preemptive event or a deferred event. A preemptive EDR event may cause a thermostat to adjust a setpoint temperature in order to increase the usage of the HVAC system for a period of time prior to the end of the preemptive EDR event. During times when the HVAC system is in a cooling mode, a preemptive EDR event may cause the thermostat to decrease the setpoint temperature. During times when the HVAC system is in a heating mode, a preemptive EDR event may cause the thermostat to increase the setpoint temperature. A deferred EDR event may cause a thermostat to adjust a setpoint temperature in order to decrease the usage of the HVAC system for a period of time prior to the end of the deferred EDR event. During times when the HVAC system is in a cooling mode, a deferred EDR event may cause the thermostat to increase the setpoint temperature. During times when the HVAC system is in a heating mode, a deferred EDR event may cause the thermostat to decrease the setpoint temperature. In some embodiments, a cloud-based power control server system, such as cloud-based power control server system 110 as described in relation to FIG. 2, supra, causes a smart thermostat, such as smart thermostat 160 as described in relation to FIG. 3, supra, to control the HVAC system.

Figure 15:
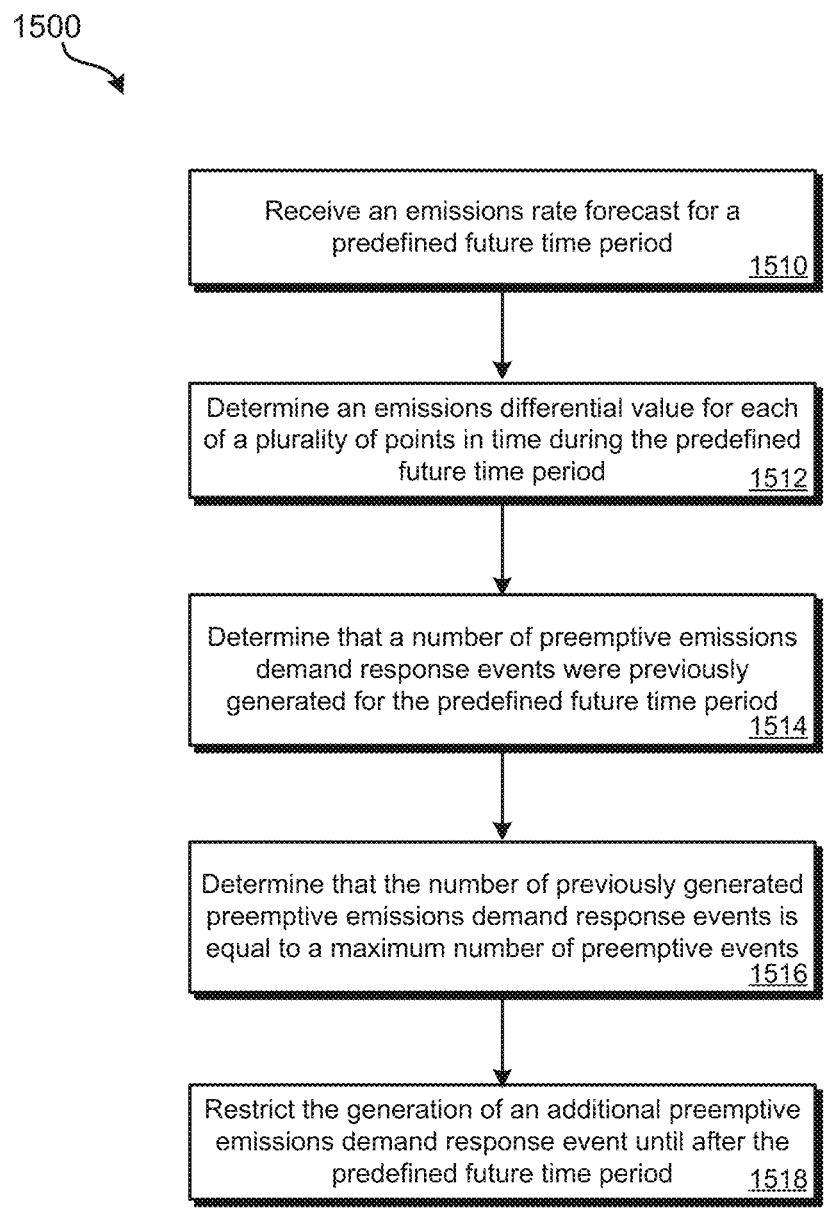
FIG. 15 illustrates an embodiment of a method for managing emissions demand response events based on a limited number of allowed events.

FIG. 15 illustrates an embodiment of a method 1500 for performing an EDR event based on a limited number of allowed events. In some embodiments, method 1500 is performed by any or all of the same components as described in relation to method 1300 described in relation to FIG. 13, supra. Method 1500 may include, at block 1510, receiving an emissions rate forecast for a predefined future time period. The emissions rate forecast may include the predicted rate of carbon emissions over a period of time into the future. The rate of carbon emissions may be measured in lbs-CO2/MWh or any similar unit of measurement. The period of time into the future may be any number of hours including 24 hours into the future. The emissions rate forecast may be received from a commercial service that collects and analyzes emissions rate data from various sources such as utility companies that provide electricity to cities or regions. In some embodiments, the emissions rate forecast is received by a cloud-based power control server system such as cloud-based power control server system 110 as described in relation to FIG. 2, supra. The emissions rate forecast may also be received by a smart thermostat. In some embodiments, a smart thermostat, such as smart thermostat 160 as described in relation to FIG. 3, supra, receives the emissions rate forecast from cloud-based power control server system 110.

At block 1512, an emissions differential value may be determined for each of a plurality of points in time during the predefined future time period. The emissions differential value may represent a rate of change in the predicted emissions rate at the respective point in time. The emissions differential value may be determined using the emissions rate forecast. For example, the emissions differential value may be determined from a difference between a first average emissions rate ending at the point in time and a second average emissions rate starting at the point in time. Each average emissions rate may be the average emissions rate for various lengths of time. For example, the first average emissions rate may be the average emissions rate over thirty minutes leading up to the point in time while the second average emissions rate may be the average emissions rate starting at the point in time for thirty minutes after the point in time. The combination of time leading up to the point in time and after the point in time may be defined as an emissions differential window. In some embodiments, the emissions differential value is determined by a cloud-based power control server system such as cloud-based power control server system 110 as described in relation to FIG. 2, supra. In some embodiments, the emissions differential value is determined by a smart thermostat, such as smart thermostat 160 as described in relation to FIG. 3, supra.

At block 1514, a number of preemptive EDR events that were previously generated for the predefined future time period may be determined. Determining the number of preemptive EDR events may include accessing a memory or database of previously generated EDR events. For example, a cloud-based power control server system, such as cloud-based power control server system 110 as described in relation to FIG. 2, supra, may access a local or remote database including some or all of the EDR events previously generated by the cloud-based power control server system. In some embodiments, a smart thermostat, such as smart thermostat 160 as described in relation to FIG. 3, supra, accesses a memory including the previously generated EDR events for the predefined future time period.

At block 1516, the number of previously generated preemptive EDR events may be determined to be equal to a maximum number of preemptive events. The maximum number of preemptive events may be any number that reduces discomfort or annoyance experienced by a user. For example, the maximum number may be three preemptive EDR events per day. However, it should be noted that any appropriate number may be used to limit the amount of discomfort or annoyance experienced by a user. In some embodiments, there may also be a maximum number of deferred events. Determining that the number of previously generated preemptive EDR events is equal to a maximum number of preemptive events may be performed by a simple comparison of the numbers of each. At block 1518, the generation of an additional preemptive EDR event may be restricted until after the predefined future time period. Restricting the generation of an additional preemptive EDR event may include generating deferred EDR events during the predefined future time period instead. In some embodiments, the restriction includes not evaluating emissions differential values with a negative value.

As illustrated by way of example in FIGS. 4-15, EDR events may be generated based on an emissions rate forecast covering one or more hours into the future. However, as conditions change, the expected emissions rate may change. For example, changes in weather or electricity production may affect the generation of carbon emissions. Because emissions rates are not constant, the accuracy of a forecast may diminish as the forecast covers times farther into the future. Similarly, an EDR event scheduled sufficiently far into the future may not be as effective at reducing carbon emissions if the actual emissions rate does not end up matching the forecasted emissions rate on which the EDR event was based.

In some embodiments, the system may receive or generate updated forecasts at periodic intervals of time. For example, the system may receive a stream of forecasts every 5 minutes, 10 minutes, 15 minutes or some other time interval with a new forecast for a new period of time into the future. With every forecast received, the system may evaluate the forecast emissions rate using the same or similar methods as described in relation to FIGS. 4-15, supra. In some embodiments, the optimal schedule of EDR events may be periodically or occasionally recalculated using the latest available forecast. In some embodiments, existing EDR events that were based on a previous forecast may be updated by the system based on each new forecast. For example, a modified EDR event with a modified end time may be generated based on a subsequent forecast and transmitted to a thermostat after the thermostat has started controlling an HVAC system in accordance with the initial event but before the initial end time and/or the modified end time. By periodically or occasionally recalculating and/or updating existing EDR events, the system may improve the accuracy and effectiveness of each EDR event to reduce carbon emissions.

In some embodiments, EDR events are transmitted to thermostats after they are generated and modified EDR events, based on subsequent updated forecasts, are transmitted before and/or after thermostats have started to control an HVAC system in accordance with the initial EDR event. In this way, an advantageous combination of practicality and immediacy may be provided. The practicality may arise from the EDR event start and end times being prospectively communicated and stored locally at the thermostat to provide a predictable forward EDR event that can be carried out from beginning to end. The immediacy may arise from the modified EDR event being communicated and carried out in a just-in-time manner if feasible. However, the practicality of the initial EDR event may remain even if the better (i.e., modified) EDR event is not communicated in time because the next-best option (i.e., the initial EDR event) will still be carried out. Determining when and/or how to update existing EDR events will be discussed further herein in relation to FIGS. 16-25.

Figure 16A:
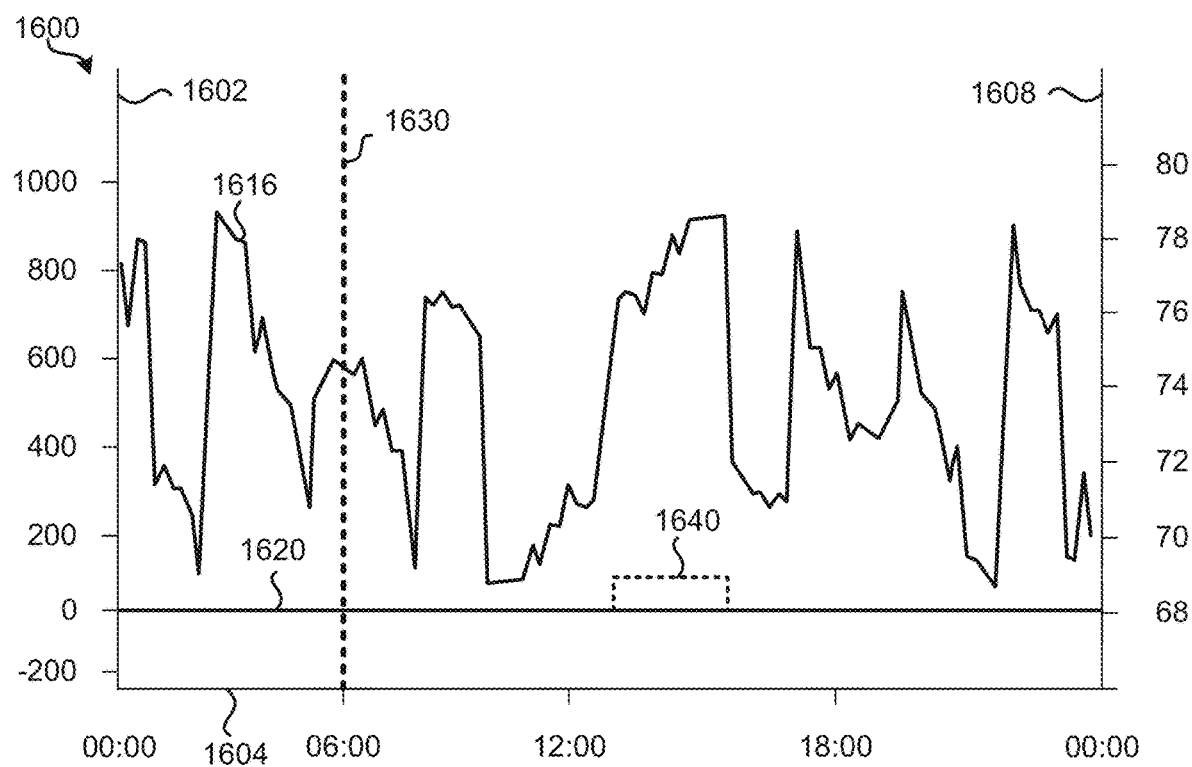
FIGS. 16A and 16B illustrate graphs of updated emissions forecasts with an emissions demand response event dispatched based on the updated emissions forecast.
Figure 16B:
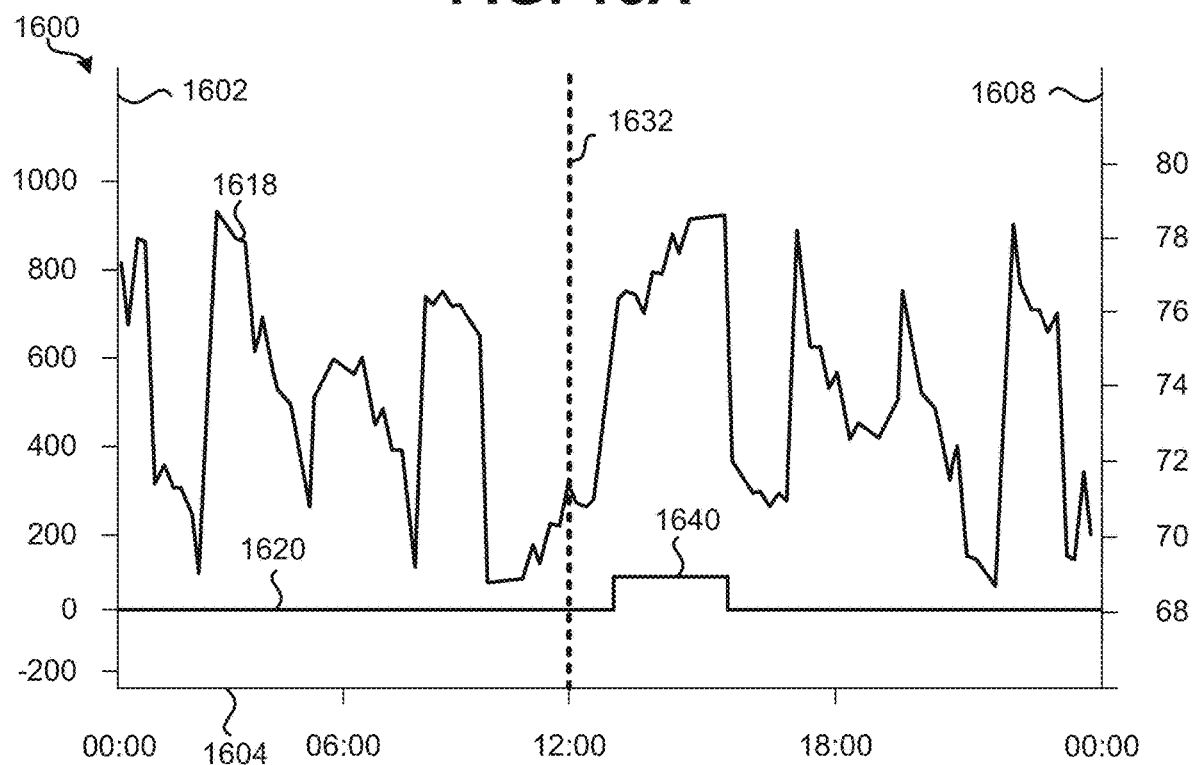

FIGS. 16A and 16B illustrate graphs 1600 of updated emissions forecasts with an EDR event dispatched based on the updated emissions forecast. Graphs 1600 represent the same x-axis 1604 and y axes 1602 and 1608 as graph 400 described in relation to FIG. 4, supra. Graphs 1600 also illustrate setpoint temperature 1620 of a thermostat as a function of time. Graphs 1600 also illustrate time 1630 (e.g., 6:00) when a forecast including predicted emissions rate 1616 is received and time 1632 (e.g., 12:00) when an updated forecast including predicted emissions rate 1618 is received. Graphs 1600 also include EDR event 1640.

In some embodiments, EDR events are not executed until just before their start times. For example, with reference to FIG. 16A, the system may generate EDR event 1640 after receiving predicted emissions rate 1616 at time 1630. However, as indicated by the dashed lines in FIG. 16A, EDR event 1640 has not yet been executed or dispatched to a thermostat for execution. By waiting to execute an EDR event, the system may improve the chances that each EDR event is based on the best available forecast and can take potential changes in the forecast into account before executing the event. In some embodiments, the system only executes an EDR event if it would be too late to execute the event after waiting for the next available forecast. For example, as illustrated by FIG. 16B, the system may determine that a new forecast including predicted emissions rate 1618 will be received at time 1632 before the scheduled start time of event 1640. In some embodiments, the system determines when the next forecast will be available based on the time since the last forecast was received or generated, and the interval at which forecasts are received or generated.

In some embodiments, after receiving the updated forecast, the system may determine that there was not a change or a sufficient enough change in the predicted emissions rate between the most recent forecast and the previous forecast to warrant a change in an EDR event. For example, as illustrated by FIGS. 16A and 16B, the predicted emissions rate did not change between time 1630 and time 1632. In some embodiments, if the amount of change in an updated forecast is less than a threshold amount, the previously generated EDR event will be maintained. After determining that the predicted emissions rate did not change, or that the change did not rise above a threshold, the system may determine that the updated forecast will be the last available forecast before the scheduled start time of the EDR event and proceed to execute the EDR event. For example, the system may determine that the next available forecast will be at 18:00, which is later than the scheduled start time of EDR event 1640. As indicated by the solid lines in FIG. 16B, the system may execute EDR event 1640 and/or dispatch EDR event 1640 to a thermostat for execution at the appropriate time.

Figure 17A:
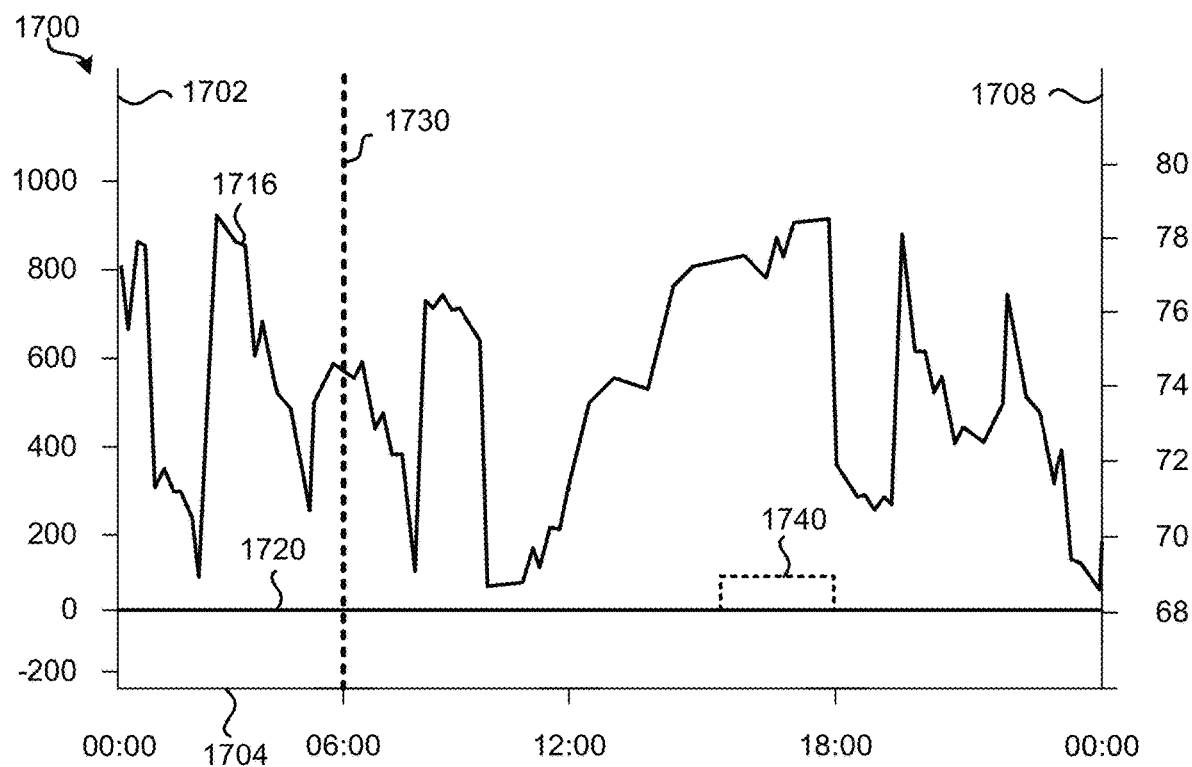
FIGS. 17A and 17B illustrate graphs of updated emissions forecasts with an emissions demand response event dispatched early based on a change in the updated emissions forecast.
Figure 17B:
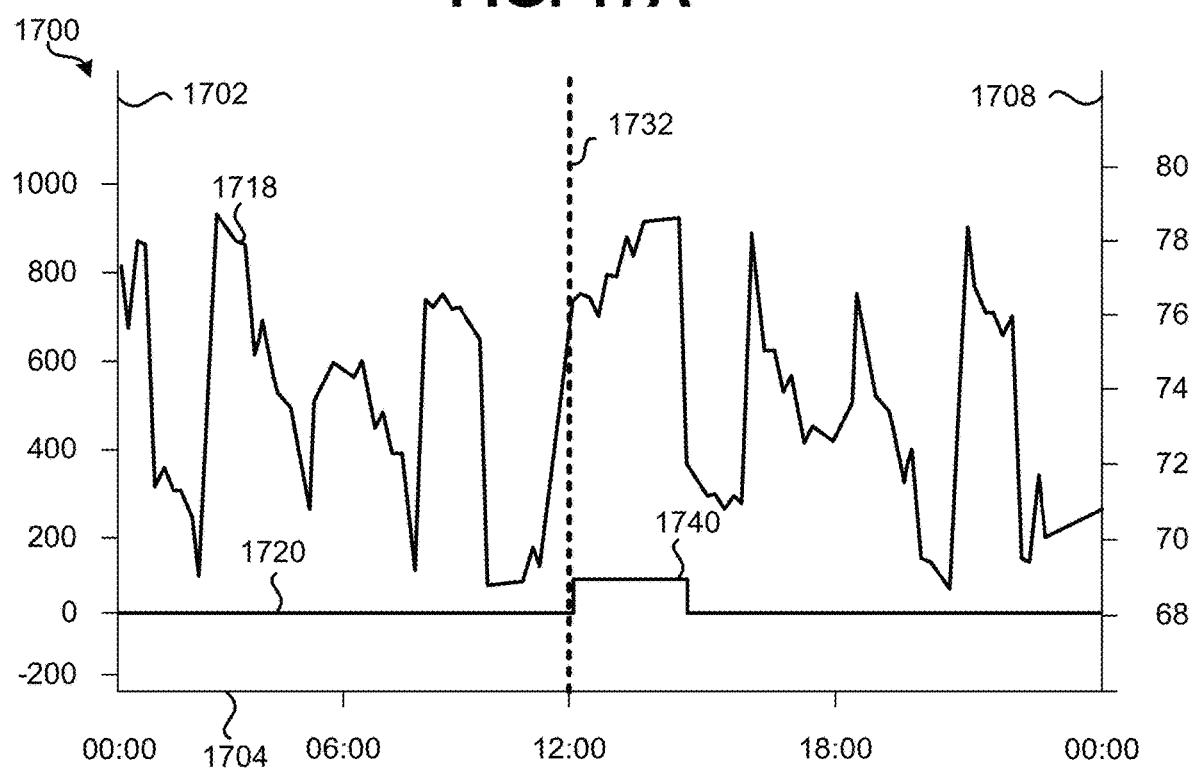

FIGS. 17A and 17B illustrate graphs 1700 of updated emissions forecasts with an EDR event dispatched early based on a change in the updated emissions forecast. Graphs 1700 represent the same x-axis 1704 and y axes 1702 and 1708 as graph 400 described in relation to FIG. 4, supra. Graphs 1700 also illustrate setpoint temperature 1720 of a thermostat as a function of time. Graphs 1700 also illustrate time 1730 (e.g., 6:00) when a forecast including predicted emissions rate 1716 is received and time 1732 (e.g., 12:00) when an updated forecast including predicted emissions rate 1718 is received. Graphs 1700 also include EDR event 1740.

As illustrated in FIG. 17A, the system may generate EDR event 1740 after receiving predicted emissions rate 1716 at time 1730. EDR event 1740 may be scheduled to end at approximately 18:00 because the forecast received at time 1730 predicted a decrease in the emissions rate at 18:00. In some embodiments, after receiving an updated forecast, the system will proceed to determine if the updated forecast predicts that the particular emissions rate change will occur earlier in time than what was predicted in the previous forecast. For example, as illustrated in FIG. 17A, predicted emissions rate 1716 received at time 1730 indicated a decrease in the emissions rate at approximately 18:00. However, as illustrated in FIG. 17B, predicted emissions rate 1718 received at time 1732 indicates that the decrease in the emissions rate will now occur at approximately 15:00.

In some embodiments, after determining that the emissions rate change will occur earlier in time, the system will update the EDR event to coincide with the updated time for the emissions rate change. For example, as illustrated in FIG. 17B, EDR event 1740 is now scheduled to end at approximately 15:00 to coincide with the predicted decrease in the emissions rate. After updating the EDR event, the system may determine that the updated forecast will be the last available forecast before the scheduled start time of the EDR event and proceed to execute the EDR event. For example, the system may determine that the next available forecast will be at 18:00, which is later than the scheduled start time of EDR event 1740. As indicated by the solid lines in FIG. 17B, the system may execute EDR event 1740 and/or dispatch EDR event 1740 to a thermostat for execution at the appropriate time.

In some embodiments, the system will only update the EDR event if the change between forecasts is greater than a threshold amount. For example, if a subsequent emissions rate forecast indicates that a predicted emissions rate increase or decrease is expected to occur more than 5 minutes before the originally predicted time, then the EDR event will be updated based on the subsequent emissions rate forecast. In other embodiments, the threshold may be 10 minutes, 15 minutes, 30 minutes or some other suitable amount of time. Additional thresholds may be used to limit the amount of updates to an EDR event, such as a threshold change in duration and/or a threshold change in the amount of emissions.

Figure 18A:
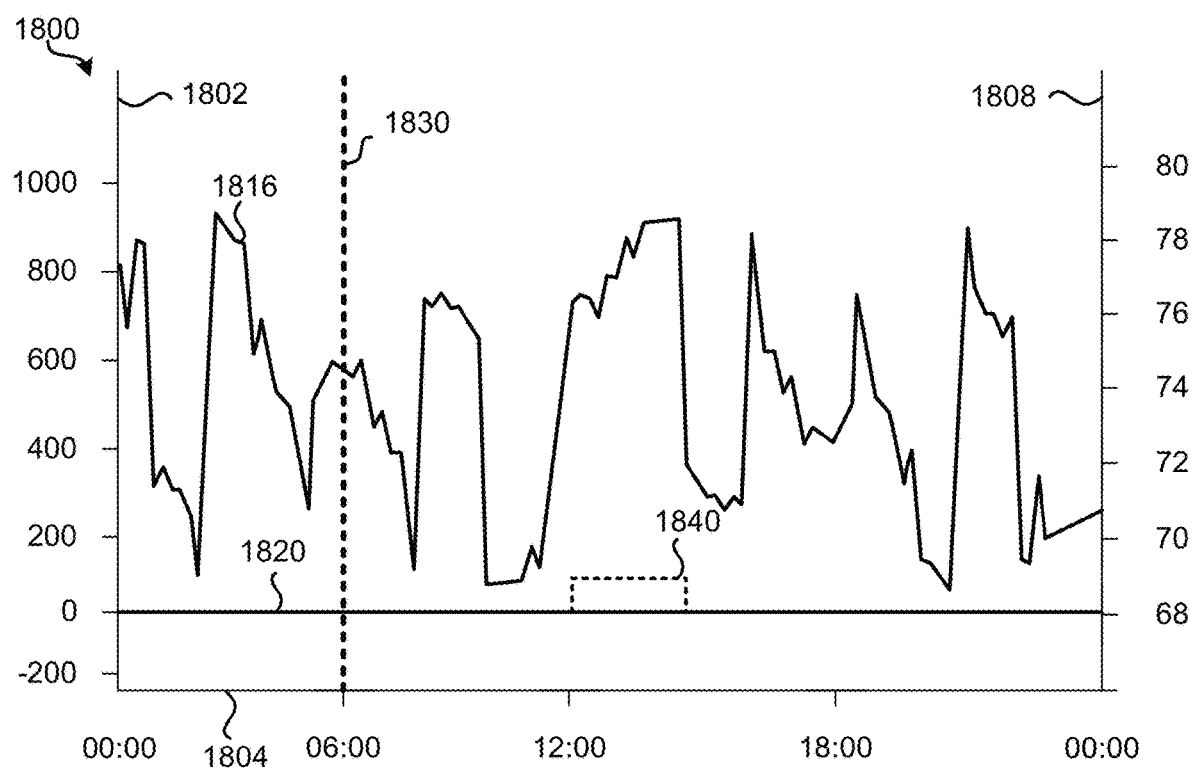
FIGS. 18A and 18B illustrate graphs of updated emissions forecasts with a delayed emissions demand response event based on a change in the updated emissions.
Figure 18B:
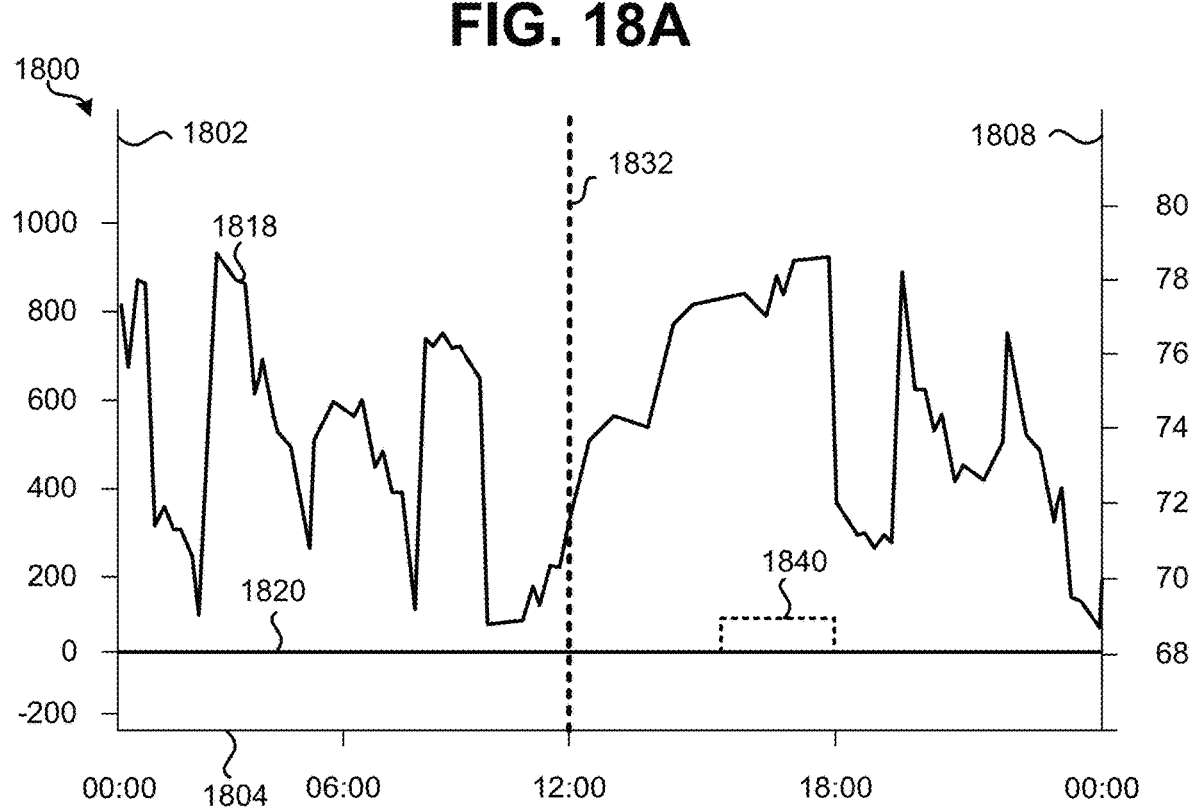

FIGS. 18A and 18B illustrate graphs 1800 of updated emissions forecasts with a delayed EDR event based on a change in the updated emissions. Graphs 1800 represent the same x-axis 1804 and y axes 1802 and 1808 as graph 400 described in relation to FIG. 4, supra. Graphs 1800 also illustrate setpoint temperature 1820 of a thermostat as a function of time. Graphs 1800 also illustrate time 1830 (e.g., 6:00) when a forecast including predicted emissions rate 1816 is received and time 1832 (e.g., 12:00) when an updated forecast including predicted emissions rate 1818 is received. Graphs 1800 also include EDR event 1840.

As illustrated in FIG. 18A, the system may generate EDR event 1840 after receiving predicted emissions rate 1816 at time 1830. EDR event 1840 may be scheduled to end at approximately 15:00 because the forecast received at time 1830 predicted a decrease in the emissions rate at 15:00. In some embodiments, after receiving an updated forecast, the system will proceed to determine if the updated forecast predicts that the particular emissions rate change will occur later in time than what was predicted in the previous forecast. For example, as illustrated in FIG. 18A, predicted emissions rate 1816 received at time 1830 indicated a decrease in the emissions rate at approximately 15:00. However, as illustrated in FIG. 18B, predicted emissions rate 1818 received at time 1832 indicates that the decrease in the emissions rate will now occur at approximately 18:00.

In some embodiments, after determining that the emissions rate change will occur later in time, the system may delay the EDR event to coincide with the updated time for the emissions rate change. For example, as illustrated in FIG. 18B, EDR event 1840 is now scheduled to end at approximately 18:00 to coincide with the predicted decrease in the emissions rate. After updating the EDR event, the system may determine that the updated forecast will not be the last available forecast before the scheduled start time of the EDR event and may wait until the next available forecast is received before executing the EDR event. For example, the system may determine that the next available forecast will be at 14:00, which is earlier than the scheduled start time of EDR event 1840. As indicated by the dashed lines in FIG. 18B, the system may wait to execute EDR event 1840 and/or dispatch EDR event 1840 to a thermostat for execution at the appropriate time until after approximately 14:00. In some embodiments, the system may determine that the updated forecast will be the last available forecast before the scheduled start time of the EDR event and proceed to execute the EDR event.

In some embodiments, the system will only delay the EDR event if the change between forecasts is greater than a threshold amount. For example, if a subsequent emissions rate forecast indicates that a predicted emissions rate increase or decrease is expected to occur more than 5 minutes after the originally predicted time, then the EDR event will be updated based on the subsequent emissions rate forecast. In other embodiments, the threshold may be 10 minutes, 15 minutes, 30 minutes or some other suitable amount of time. Additional thresholds may be used to limit the amount of updates to an EDR event, such as a threshold change in duration and/or a threshold change in the amount of emissions.

Figure 19A:
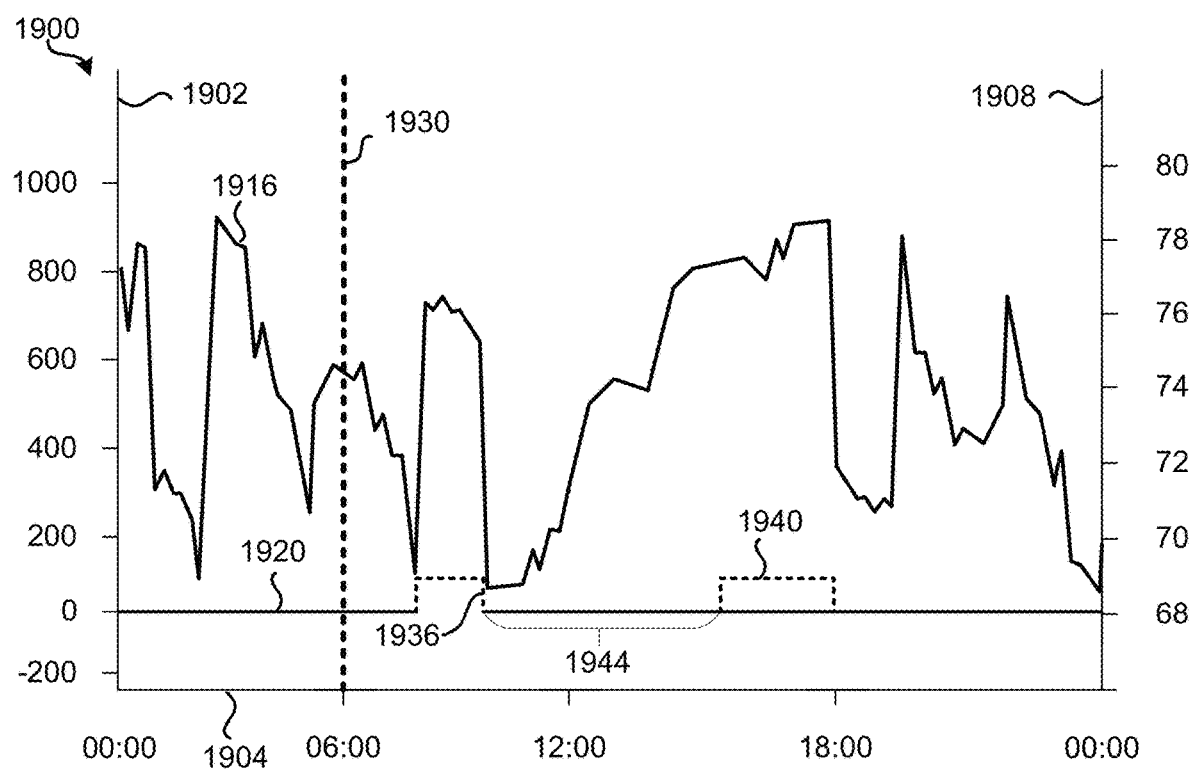
FIGS. 19A and 19B illustrate graphs of updated emissions forecasts with a restriction on dispatching an emissions demand response event early based on a previously dispatched emissions demand response event.
Figure 19B:
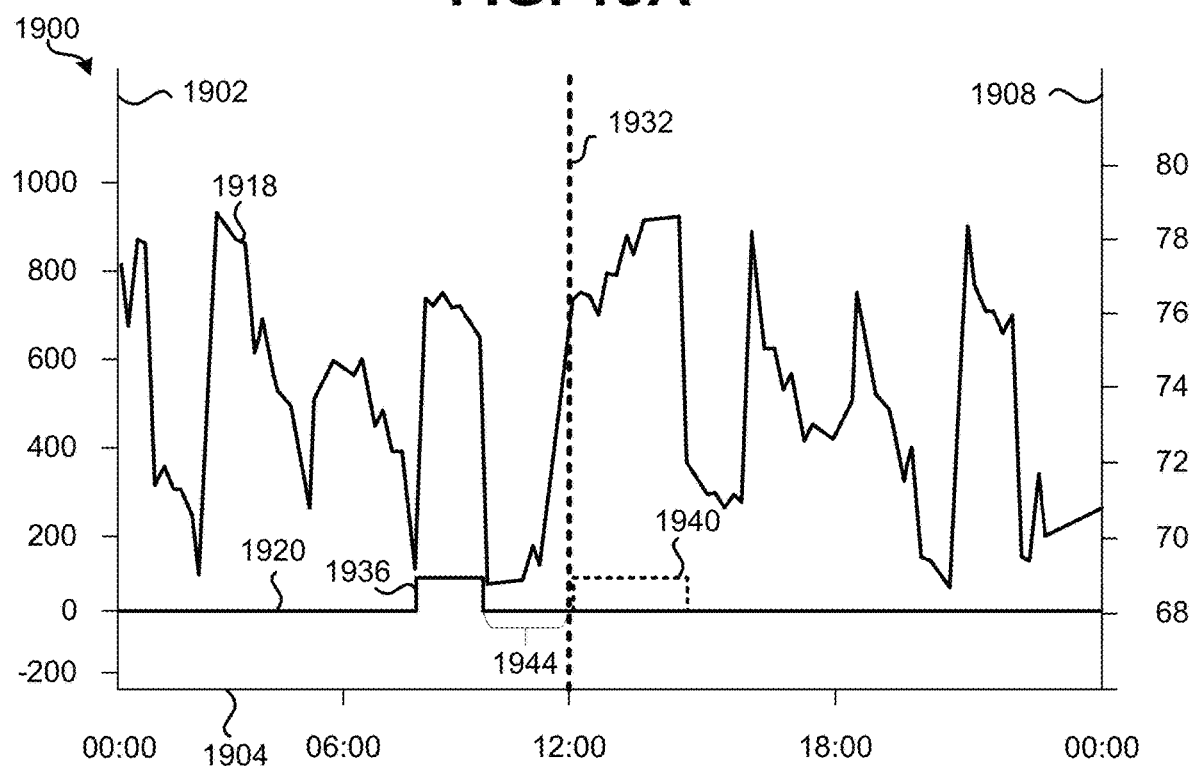

FIGS. 19A and 19B illustrate graphs 1900 of updated emissions forecasts with a restriction on dispatching an EDR event early based on a previously dispatched EDR event. Graphs 1900 represent the same x-axis 1904 and y axes 1902 and 1908 as graph 400 described in relation to FIG. 4, supra. Graphs 1900 also illustrate setpoint temperature 1920 of a thermostat as a function of time. Graphs 1900 also illustrate time 1930 (e.g., 6:00) when a forecast including predicted emissions rate 1916 is received and time 1932 (e.g., 12:00) when an updated forecast including predicted emissions rate 1918 is received. Graphs 1900 also include EDR events 1936 and 1940.

As illustrated in FIG. 19A, the system may generate EDR events 1936 and 1940 after receiving a forecast including predicted emissions rate 1916 at time 1930. As indicated by the solid lines in FIG. 19B, EDR event 1936 may have already been executed by the system prior to time 1932 when an updated forecast is received. In some embodiments, after receiving an updated forecast, the system will determine that the updated forecast predicts that the particular emissions rate change will occur earlier in time than what was predicted in the previous forecast. For example, as illustrated in FIG. 19A, predicted emissions rate 1916 received at time 1930 indicated a decrease in the emissions rate at approximately 18:00. However, as illustrated in FIG. 19B, predicted emissions rate 1918 received at time 1932 indicates that the decrease in the emissions rate will now occur at approximately 15:00.

In some embodiments, after determining that the emissions rate change will occur earlier in time, the system will determine if there are any constraints that would restrict the system from updating the EDR event based on the updated forecast. In some embodiments, the system is restricted from scheduling EDR events within a minimum amount of time of other EDR events. For example, as illustrated by FIG. 19B, the system may be restricted from updating EDR event 1940 to coincide with the updated time for the emissions rate change because timespan 1944 between EDR event 1936 and EDR event 1940 is less than a predefined minimum amount of time between EDR events. Additional constraints are described further hereinabove in relation to FIGS. 10-11. In some embodiments, after determining that a constraint restricts the modification of an event, the system will cancel the EDR event and generate a new EDR event at a later time coinciding with a different emissions rate change. In some embodiments, after determining that a constraint restricts a certain modification, the system will identify alternative modifications, such as reducing the event duration.

Figure 20A:
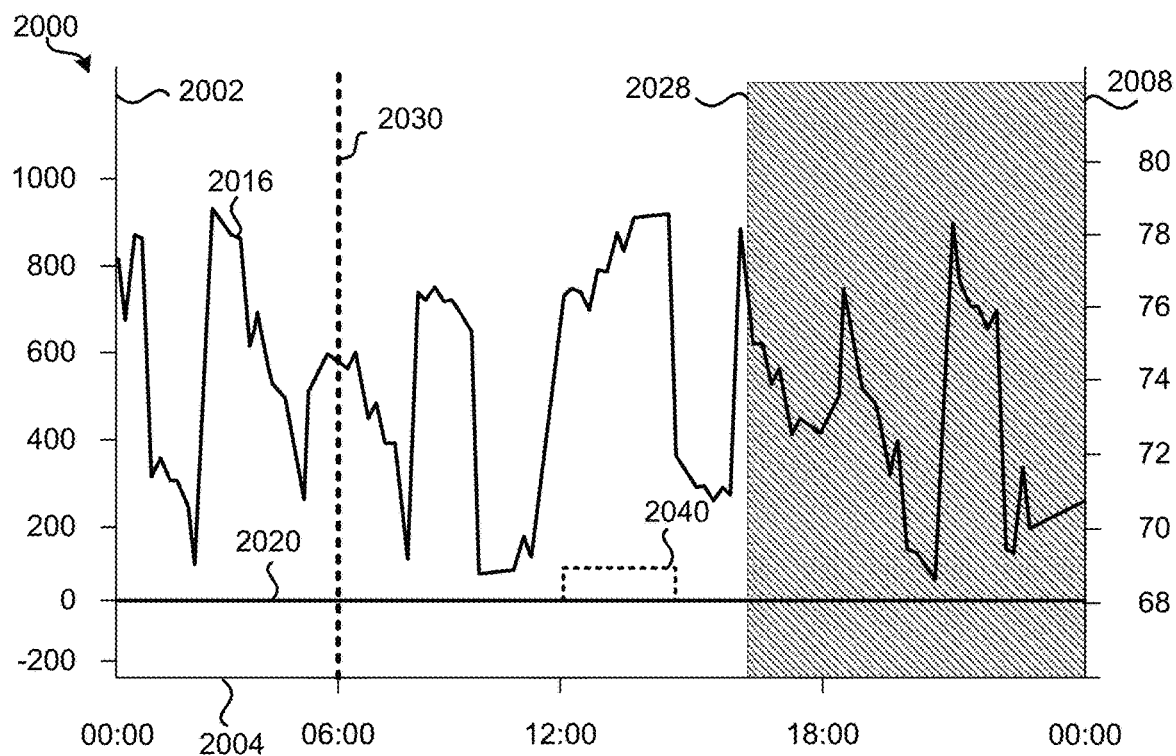
FIGS. 20A and 20B illustrate graphs of updated emissions forecasts with a restriction on delaying an emissions demand response event based on a restricted time of day.
Figure 20B:
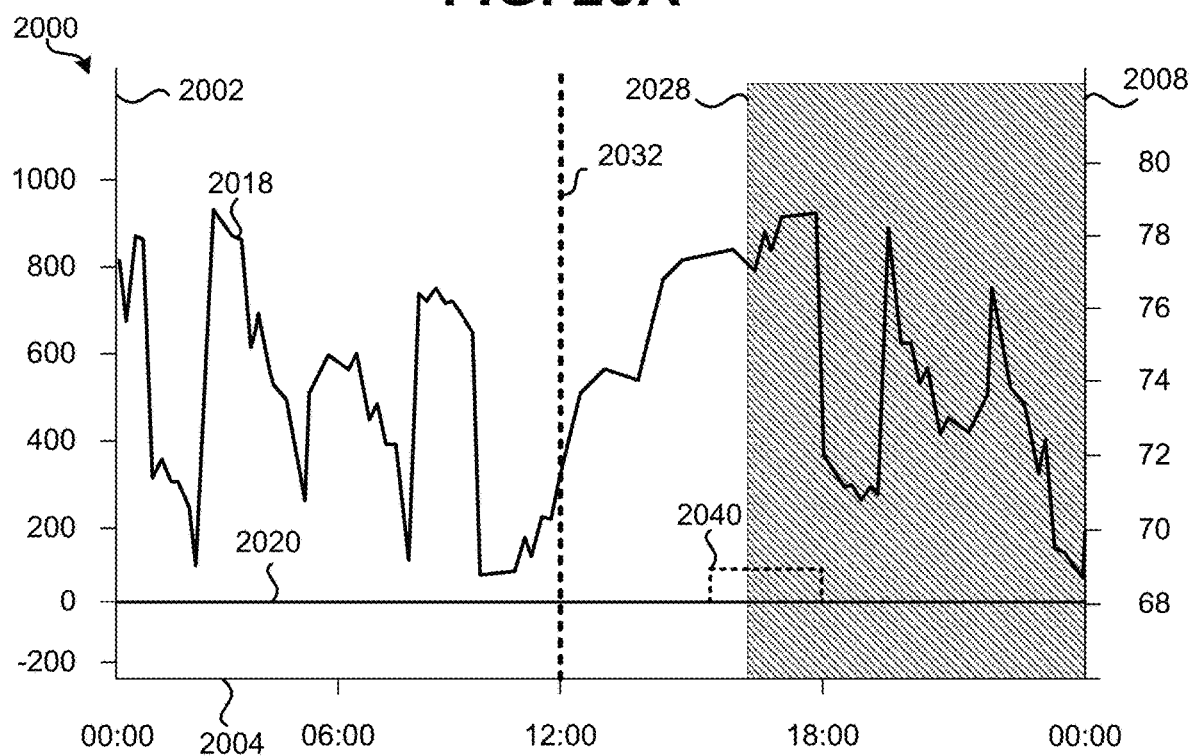

FIGS. 20A and 20B illustrate graphs 2000 of updated emissions forecasts with a restriction on delaying an EDR event based on a restricted time of day. Graphs 2000 represent the same x-axis 2004 and y axes 2002 and 2008 as graph 400 described in relation to FIG. 4, supra. Graphs 2000 also illustrate setpoint temperature 2020 of a thermostat as a function of time. Graphs 2000 also illustrate time 2030 (e.g., 6:00) when a forecast including predicted emissions rate 2016 is received and time 2032 (e.g., 12:00) when an updated forecast including predicted emissions rate 2018 is received. Graphs 2000 also include EDR event 2040.

As illustrated in FIG. 20A, the system may generate EDR event 2040 after receiving predicted emissions rate 2016 at time 2030. EDR event 2040 may be scheduled to end at approximately 15:00 because the forecast received at time 2030 predicted a decrease in the emissions rate at 15:00. In some embodiments, after receiving an updated forecast, the system will proceed to determine if the updated forecast predicts that the particular emissions rate change will occur later in time than what was predicted in the previous forecast. For example, as illustrated in FIG. 20A, predicted emissions rate 2016 received at time 2030 indicated a decrease in the emissions rate at approximately 15:00. However, as illustrated in FIG. 20B, predicted emissions rate 2018 received at time 2032 indicates that the decrease in the emissions rate will now occur at approximately 18:00.

In some embodiments, after determining that the emissions rate change will occur later in time, the system will determine if there are any constraints that would restrict the system from updating the EDR event based on the updated forecast. In some embodiments, the system is restricted from scheduling EDR events during certain times of day. For example, as illustrated by FIG. 20B, the system may be restricted from updating EDR event 2040 to coincide with the updated time for the emissions rate change because EDR event 2040 would end after restricted time 2028 has begun. As another example, the system may also be restricted from updating an EDR event to be earlier when it would conflict with a restricted time of day. Additional constraints are described further hereinabove in relation to FIGS. 10-11. In some embodiments, after determining that a constraint restricts the modification of an event, the system will cancel the EDR event and generate a new EDR event at a later time coinciding with a different emissions rate change.

Figure 21A:
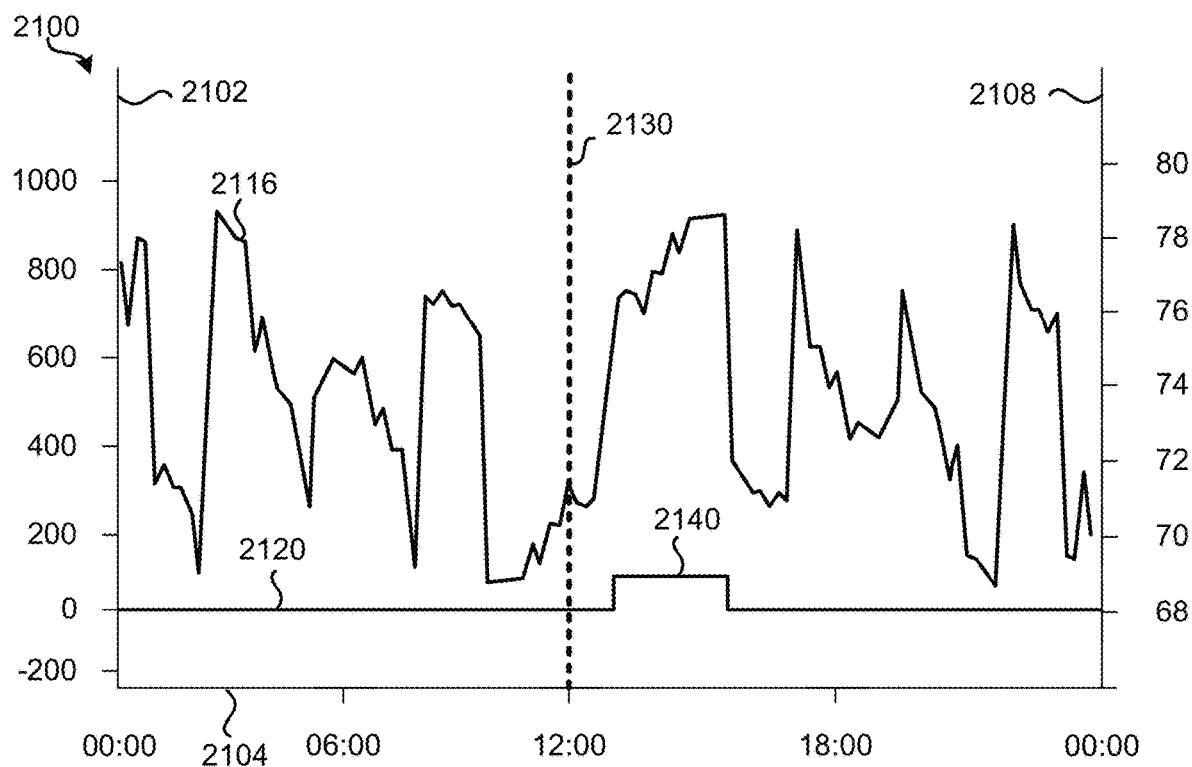
FIGS. 21A and 21B illustrate graphs of updated emissions forecasts with an extended end time of a dispatched emissions demand response event based on a change in the updated emissions forecast.
Figure 21B:
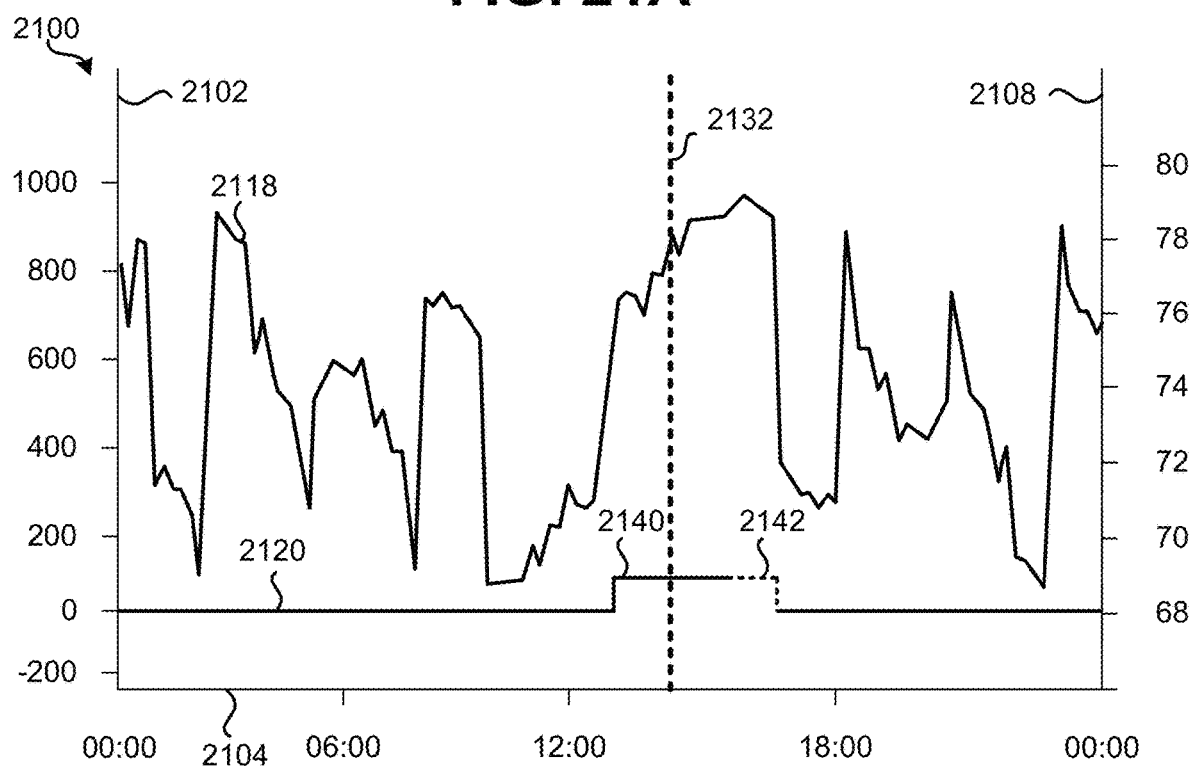

FIGS. 21A and 21B illustrate graphs 2100 of updated emissions forecasts with an extended end time of a dispatched EDR event based on a change in the updated emissions forecast. Graphs 2100 represent the same x-axis 2104 and y axes 2102 and 2108 as graph 400 described in relation to FIG. 4, supra. Graphs 2100 also illustrate setpoint temperature 2120 of a thermostat as a function of time. Graphs 2100 also illustrate time 2130 (e.g., 6:00) when a forecast including predicted emissions rate 2116 is received and time 2132 (e.g., 12:00) when an updated forecast including predicted emissions rate 2118 is received. Graphs 2100 also include EDR event 2140.

As illustrated in FIG. 21A, the system may generate EDR event 2140 after receiving a forecast at time 2130 (e.g., 12:00) including predicted emissions rate 2116. In some embodiments, after receiving a forecast, the system will proceed to determine if the forecast will be the last available forecast before the scheduled start time of an EDR event and proceed to execute the EDR event or cause a thermostat to execute the EDR event at the appropriate time. For example, as illustrated in FIGS. 21A and 21B, the system may determine that the next available forecast will be at time 2132 (e.g., 14:00), which is later than the scheduled start time of EDR event 2140 (e.g., 13:00). In some embodiments, the system determines when the next forecast will be available based on the time since the last forecast was available and the interval between forecasts.

In some embodiments, while an EDR event is currently executing, the system will receive an updated forecast and determine that the updated forecast predicts that a particular emissions rate change will occur later in time than what was predicted in the previous forecast. For example, as illustrated in FIG. 21A, predicted emissions rate 2116 received at time 2130 indicated a decrease in the emissions rate at approximately 15:00. However, as illustrated in FIG. 21B, predicted emissions rate 2118 received at time 2132 indicates that the decrease in the emissions rate will now occur at approximately 17:00.

In some embodiments, after determining that the emissions rate change will occur later in time, the system may extend the event based on the updated forecast. For example, as illustrated by FIG. 21B, the system may extend the end of EDR event 2140 to coincide with the forecasted decrease in predicted emissions rate 2118 at approximately 17:00. In some embodiments, adjusting the end time includes generating and transmitting a modified EDR event with a modified end time compared, in this case being later than the end time of the initial EDR event. In some embodiments, when an EDR event is in progress, the system may periodically or occasionally adjust the end time based on the latest available forecast and only cause the EDR event to end if the next available forecast would be received later than the currently scheduled end time for the EDR event. For example, as illustrated in FIG. 21B, the system may determine that the next available forecast will be at 15:00, which is earlier than the scheduled end time 2142 of EDR event 2140. As indicated by the dashed lines in FIG. 21B, the system may wait to end EDR event 2140 and/or cause a thermostat to end EDR event 2140 until after it has received the next available updated forecast.

In some embodiments, the system is restricted from extending an EDR event beyond a certain length of time. For example, to minimize user discomfort and annoyance caused by longer EDR events, the system may include a constraint defining a maximum allowed event duration, and the system may be restricted from extending an EDR event once the event duration has reached the maximum allowed duration. In some embodiments, the system is restricted from extending an EDR event beyond a certain time due to other constraints. For example, as described in relation to FIGS. 10-11, supra, the system may be restricted by certain times of day or by previously scheduled additional EDR events.

In some embodiments, the system will only extend the EDR event if the change between forecasts is greater than a threshold amount. For example, if a subsequent emissions rate forecast indicates that a predicted emissions rate increase or decrease is expected to occur more than 5 minutes after the originally predicted time, then the EDR event will be updated based on the subsequent emissions rate forecast. In other embodiments, the threshold may be 10 minutes, 15 minutes, 30 minutes or some other suitable amount of time. Additional thresholds may be used to limit the amount of updates to an EDR event, such as a threshold change in duration and/or a threshold change in the amount of emissions.

Figure 22A:
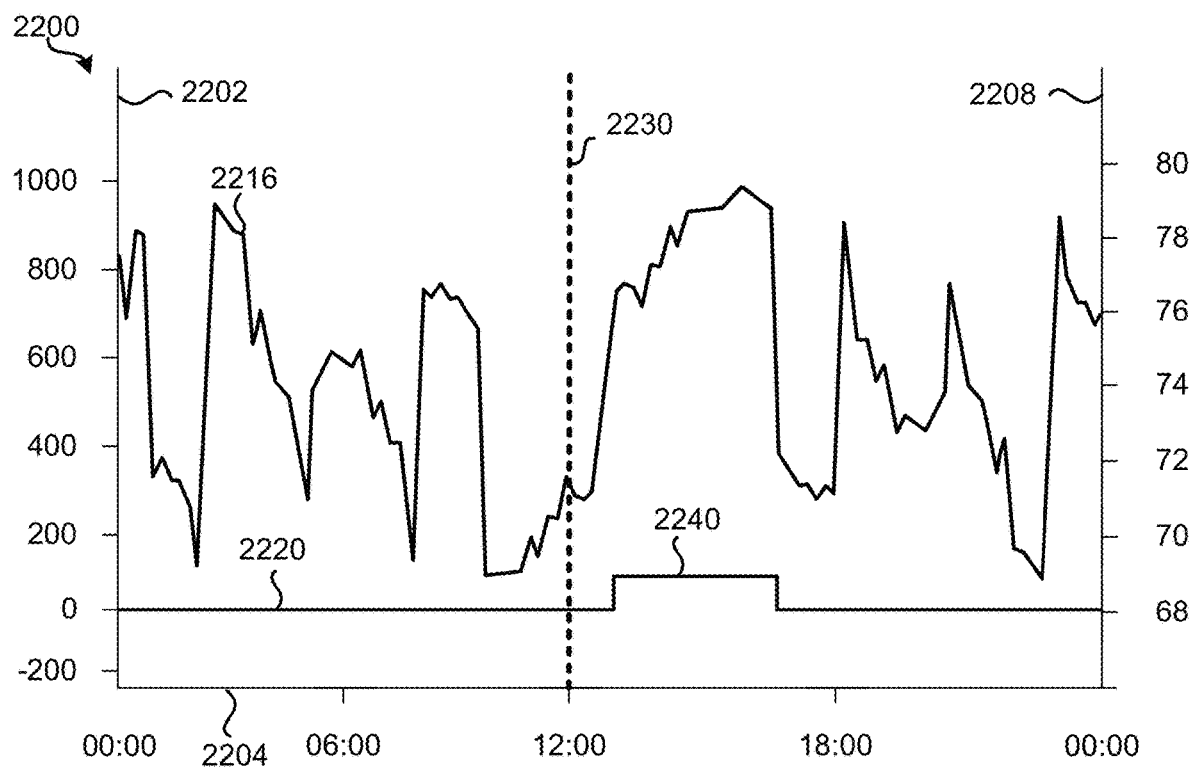
FIGS. 22A and 22B illustrate graphs of updated emissions forecasts with an emissions demand response event ending early based on a change in the updated emissions forecast.
Figure 22B:
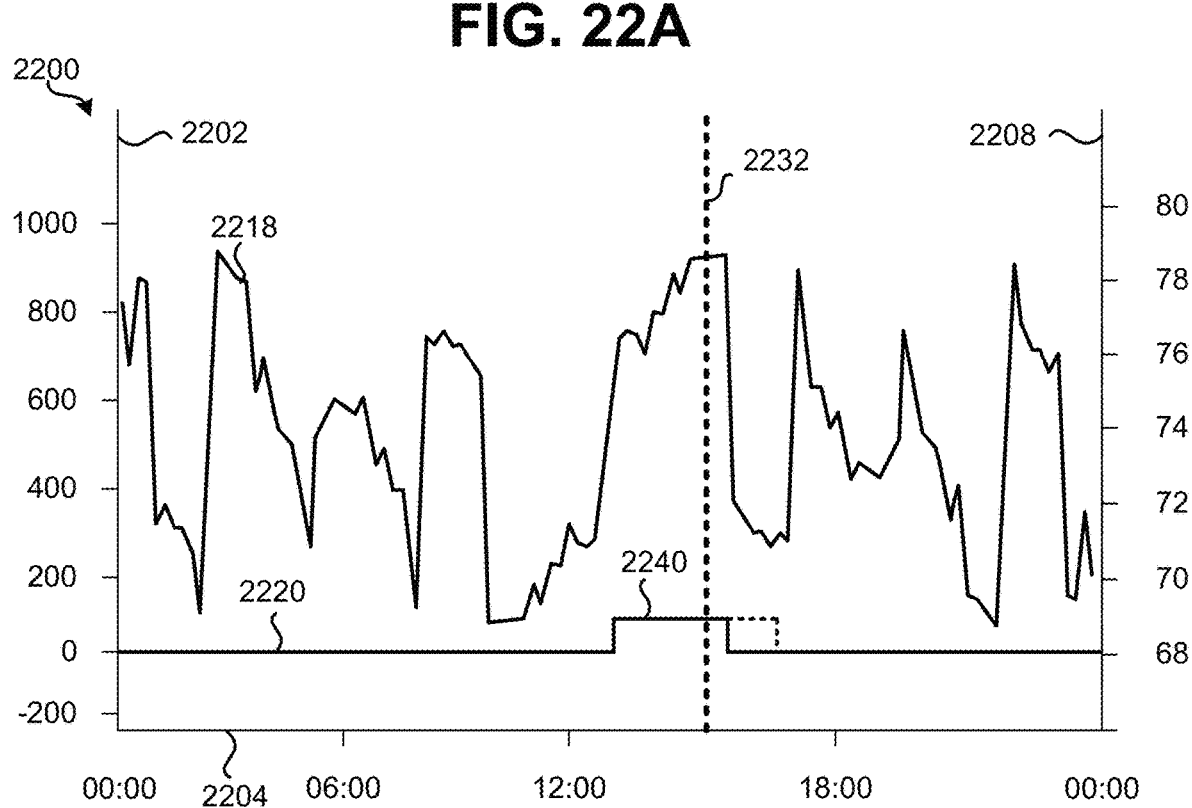

FIGS. 22A and 22B illustrate graphs 2200 of updated emissions forecasts with an EDR event ending early based on a change in the updated emissions forecast. Graphs 2200 represent the same x-axis 2204 and y axes 2202 and 2208 as graph 400 described in relation to FIG. 4, supra. Graphs 2200 also illustrate setpoint temperature 2220 of a thermostat as a function of time. Graphs 2200 also illustrate time 2230 (e.g., 6:00) when a forecast including predicted emissions rate 2216 is received and time 2232 (e.g., 12:00) when an updated forecast including predicted emissions rate 2218 is received. Graphs 2200 also include EDR event 2240.

As illustrated in FIG. 22A, the system may generate EDR event 2140 after receiving a forecast at time 2230 (e.g., 12:00) including predicted emissions rate 2216. In some embodiments, after receiving a forecast, the system will determine if the forecast will be the last available forecast before the scheduled start time of an EDR event and proceed to execute the EDR event or cause a thermostat to execute the EDR event at the appropriate time. For example, as illustrated in FIGS. 22A and 22B, the system may determine that the next available forecast will be at time 2232 (e.g., 14:00), which is later than the scheduled start time of EDR event 2240 (e.g., 13:00).

In some embodiments, while an EDR event is currently executing, the system will receive an updated forecast and determine that the updated forecast predicts that a particular emissions rate change will occur earlier in time than what was predicted in the previous forecast. For example, as illustrated in FIG. 22A, predicted emissions rate 2216 received at time 2230 indicated a decrease in the emissions rate at approximately 17:00. However, as illustrated in FIG. 22B, predicted emissions rate 2218 received at time 2232 indicates that the decrease in the emissions rate will now occur at approximately 15:00.

In some embodiments, after determining that the emissions rate change will occur earlier in time, the system will shorten the event based on the updated forecast. For example, as illustrated by FIG. 22B, the system may update the end of EDR event 2240 to coincide with the forecasted decrease in predicted emissions rate 2218 at approximately 15:00. After updating the EDR event, the system may determine that the updated forecast will be the last available forecast before the scheduled end time of the EDR event and proceed to end the EDR event or cause a thermostat to end the EDR event at the appropriate time. For example, the system may determine that the next available forecast will be at 18:00, which is later than the scheduled end time of EDR event 2240. In some embodiments, adjusting the end time includes generating and transmitting a modified EDR event with a modified end time compared, in this case being earlier than the end time of the initial EDR event. In some embodiments, the EDR event is only shortened when the change between forecasts is greater than a threshold amount, such as 5 minutes, 10 minutes, 15 minutes or any other suitable unit of time earlier than the originally predicted end time.

Figure 23:
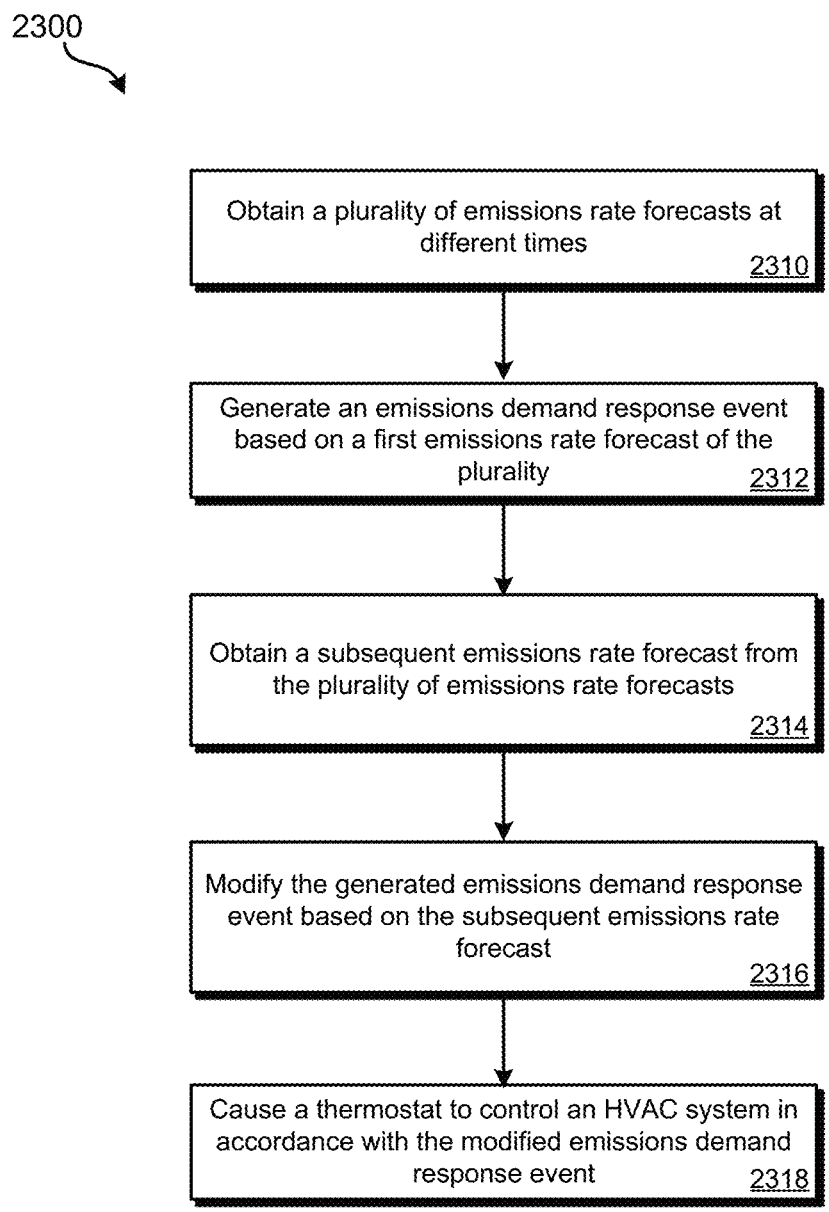
FIG. 23 illustrates an embodiment of a method for managing emissions demand response events based on updated emissions forecasts.

Various methods may be performed using the systems detailed in FIGS. 1-3, supra, to implement EDR events as detailed in relation to FIGS. 16A-22B, supra. FIG. 23 illustrates an embodiment of method 2300 for managing EDR events based on updated emissions. In some embodiments, method 2300 is performed by a cloud-based power control server system, such as cloud-based power control server system 110 as described in relation to FIG. 2, supra. For example, processing system 219 of cloud-based power control server system 110 may execute software from one or more modules such as event scheduler 213, constraints engine 214, and/or forecast engine 217. In some embodiments, method 2300 is performed by a smart device, such as smart thermostat 160 as described in relation to FIG. 3, supra. For example, processing system 319 of smart thermostat 160 may execute software from one or more modules such as event scheduler 314 and constraints engine 315. In some embodiments, some steps of method 2300 are performed by a cloud-based power control server system, such as cloud-based power control server system 110 while other steps are performed by a smart device, such as smart thermostat 160.

Method 2300 may include, at block 2310, obtaining a plurality of emissions rate forecasts at different times. The plurality of emissions rate forecasts may be received from a commercial service that collects and analyzes emissions rate data from various sources such as utility companies that provide electricity to cities or regions. In some embodiments, the plurality of emissions rate forecasts are generated by a cloud-based power control server system using data collected from one or more sources such as utility companies and weather services. The plurality of emissions rate forecasts may be obtained at regular intervals such as every 5 minutes, 15 minutes, or 30 minutes. For example, a cloud-based power control server system may send a request at regular intervals to an external service and receive a new emissions rate forecast in response. In some embodiments, the plurality of emissions rate forecasts are received by a cloud-based power control server system such as cloud-based power control server system 110 as described in relation to FIG. 2, supra. The plurality of emissions rate forecasts may also be received by a smart thermostat. In some embodiments, a smart thermostat, such as smart thermostat 160 as described in relation to FIG. 3, supra, receives the plurality of emissions rate forecasts from cloud-based power control server system 110. Each emissions rate forecast of the plurality may include the predicted rate of carbon emissions over a period of time into the future as described in relation to FIG. 4, supra.

At block 2312, an EDR event may be generated based on a first emissions rate forecast of the plurality of emissions rate forecasts. The EDR event may be generated in accordance with any of the methods as described in relation to FIGS. 13-15, supra. For example, the EDR event may be generated with an end time corresponding with the time of an emissions differential value calculated from the first emissions rate forecast. The first emissions rate forecast may be any emissions rate forecast received at any time. In some embodiments, the EDR event is generated by event scheduler 213 of cloud-based power control server system 110 as described in relation to FIG. 2, supra. In some embodiments, after the EDR event is generated, it will be transmitted to a thermostat and stored by the thermostat until the start the start time of the EDR event, when the thermostat may begin to control an HVAC system according to the EDR event. In some embodiments, the EDR event is generated by event scheduler 314 of smart thermostat 160 as described in relation to FIG. 3, supra. The EDR event may be a preemptive EDR event or a deferred EDR event.

At block 2314, a subsequent emissions rate forecast may be obtained from the plurality of emissions rate forecasts. In some embodiments, the subsequent forecast is obtained after the EDR event has been generated. The subsequent emissions rate forecast may be the next available emissions rate forecast received after the first emissions rate forecast. In some embodiments, the subsequent emissions rate forecast may be any subsequent forecast after the EDR event has been generated indicating a change in the predicted emissions rates during a particular time of interest. For example, the first forecast may predict an increase in the emissions rate ten hours from the time when the first forecast was received. After five hours and multiple similar forecasts, a new forecast may predict that the same increase will now occur in four hours instead of five hours, as originally predicted by the first emissions rate forecast.

At block 2316, the generated EDR event may be modified based on the subsequent emissions rate forecast. In some embodiments, the generated EDR event will be modified based on the differences in the predicted emissions rates between the first emissions rate forecast and the subsequent emissions rate forecast. For example, if an EDR event was generated based on the emissions rate increase predicted by the first forecast, the EDR event may be updated to occur earlier based on the subsequent forecast predicting that the increase will occur earlier than originally predicted. In some embodiments, the generated EDR event will be modified based on multiple subsequent emissions rate forecasts. For example, if an EDR event was generated based on the emissions rate increase predicted by the first emissions rate forecast, the EDR event may be delayed if a second forecast indicates the increase at a later time. Further, the EDR event may be delayed again after a third forecast indicates the increase at yet an even later time than the second prediction. In some embodiments, the EDR event will be modified using any of the same methods used to initially generate the event as described in relation to FIGS. 13-15, supra.

In some embodiments, the same constraints as described in relation to FIGS. 10-11, supra, apply to modifying the EDR event. For example, there may be a constraint on delaying an event when it would overlap with a restricted time of day. As another example, there may be a constraint on modifying an event to be earlier if it would be too close in proximity to an event that has already been executed. In some embodiments, the EDR event will only be modified if the difference in the subsequent emissions rate forecast is greater than a threshold amount of change. For example, if an emissions rate decrease is expected to occur less than 5 minutes later than originally predicted, the EDR event may not be modified. In other embodiments, the threshold may be 10 minutes, 15 minutes, 30 minutes or some other suitable amount of time.

At block 2318, a thermostat may be caused to control an HVAC system in accordance with the modified EDR event. The thermostat may be caused to control the HVAC system in accordance with any of the methods as described in relation to FIGS. 13-15, supra. For example, at the start time of the EDR event, the EDR event may cause the thermostat to increase or decrease a setpoint temperature of the thermostat in order to increase or decrease the usage of the HVAC system depending on whether the HVAC system is in a heating mode or a cooling mode. In some embodiments, a cloud-based power control server system, such as cloud-based power control server system 110 as described in relation to FIG. 2, supra, causes a smart thermostat, such as smart thermostat 160 as described in relation to FIG. 3, supra, to control the HVAC system.

Figure 24:
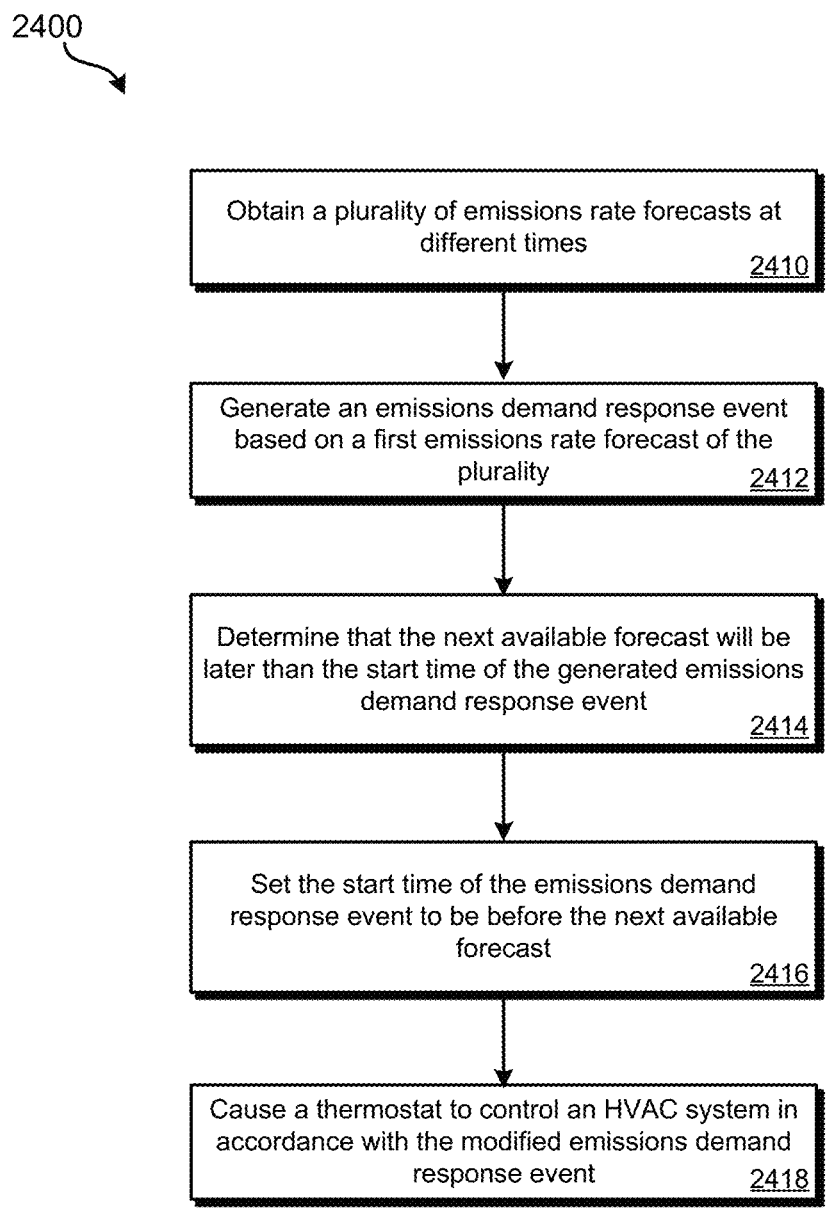
FIG. 24 illustrates an embodiment of a method for dispatching emissions demand response events at the last minute based on updated emissions forecasts.

FIG. 24 illustrates an embodiment of a method 2400 for dispatching EDR events at the last minute based on updated emissions forecasts. In some embodiments, method 2400 is performed by any or all of the same components as described in relation to method 2300 described in relation to FIG. 23, supra. Method 2400 may include, at block 2410, obtaining a plurality of emissions rate forecasts at different times. The plurality of emissions rate forecasts may be received from a commercial service that collects and analyzes emissions rate data from various sources such as utility companies that provide electricity to cities or regions. In some embodiments, the plurality of emissions rate forecasts may be generated by a cloud-based power control server system using data collected from one or more sources such as utility companies and weather services. The plurality of emissions rate forecasts may be obtained at regular intervals such as every 5 minutes, 15 minutes, or 30 minutes. For example, a cloud-based power control server system may send a request at regular intervals to an external service and receive a new emissions rate forecast in response. In some embodiments, the plurality of emissions rate forecasts are received by a cloud-based power control server system such as cloud-based power control server system 110 as described in relation to FIG. 2, supra. The plurality of emissions rate forecasts may also be received by a smart thermostat. In some embodiments, a smart thermostat, such as smart thermostat 160 as described in relation to FIG. 3, supra, receives the plurality of emissions rate forecasts from cloud-based power control server system 110. Each emissions rate forecast of the plurality may include the predicted rate of carbon emissions over a period of time into the future as described in relation to FIG. 4, supra.

At block 2412, an EDR event may be generated based on a first emissions rate forecast of the plurality of emissions rate forecasts. The EDR event may be generated in accordance with any of the methods as described in relation to FIGS. 13-15, supra. For example, the EDR event may be generated with an end time corresponding with the time of an emissions differential value calculated from the first emissions rate forecast. The first emissions rate forecast may be any emissions rate forecast received at any time. In some embodiments, the EDR event is generated by event scheduler 213 of cloud-based power control server system 110 as described in relation to FIG. 2, supra. In some embodiments, the EDR event is generated by event scheduler 314 of smart thermostat 160 as described in relation to FIG. 3, supra. The EDR event may be a preemptive EDR event or a deferred EDR event.

At block 2414, the next available emissions rate forecast may be determined to be later than the scheduled start time of the generated emissions demand response event. For example, if the generated emissions demand response event is scheduled to start in fifteen minutes, the next available emissions rate forecast may not be available for another thirty minutes. At block 2416, after determining that the next available forecast will be received after the scheduled start time, the start time may be set to begin at the scheduled start time, which is before the next available forecast is received. In some embodiments, generating the EDR event may only create a prospective EDR event that may be subject to modification by methods such as method 2300 described in relation to FIG. 23, supra. For example, as subsequent emissions rate forecasts are received, the start and end time may be modified based on new predictions for the emissions rate. In some embodiments, once the last available emissions rate forecast before the prospective start time of the EDR event is received, the final start time of the EDR event is set and the EDR event will then be executed by a thermostat.

At block 2418, a thermostat may be caused to control an HVAC system in accordance with the modified EDR event. The thermostat may be caused to control the HVAC system in accordance with any of the methods as described in relation to FIGS. 13-15, supra. For example, at the start time of the EDR event, the EDR event may cause the thermostat to increase or decrease a setpoint temperature of the thermostat in order to increase or decrease the usage of the HVAC system depending on whether the HVAC system is in a heating mode or a cooling mode. In some embodiments, a cloud-based power control server system, such as cloud-based power control server system 110 as described in relation to FIG. 2, supra, causes a smart thermostat, such as smart thermostat 160 as described in relation to FIG. 3, supra, to control the HVAC system.

Figure 25:
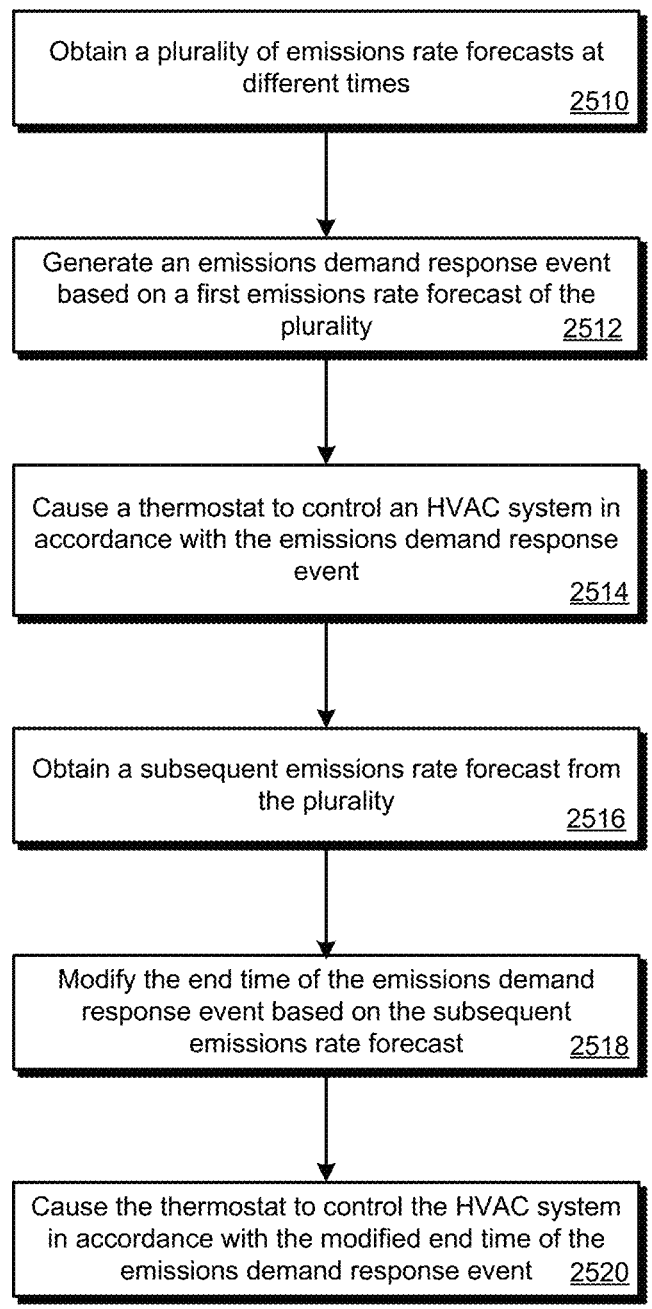
FIG. 25 illustrates an embodiment of a method for modifying emissions demand response events based on updated emissions forecasts.

FIG. 25 illustrates an embodiment of a method 2500 for modifying EDR events based on updated emissions forecasts. In some embodiments, method 2500 is performed by any or all of the same components as described in relation to method 2300 described in relation to FIG. 23, supra. Method 2500 may include, at block 2510, obtaining a plurality of emissions rate forecasts at different times. The plurality of emissions rate forecasts may be received from a commercial service that collects and analyzes emissions rate data from various sources such as utility companies that provide electricity to cities or regions. In some embodiments, the plurality of emissions rate forecasts are generated by a cloud-based power control server system using data collected from one or more sources such as utility companies and weather services. The plurality of emissions rate forecasts may be obtained at regular intervals such as every 5 minutes, 15 minutes, or 30 minutes. For example, a cloud-based power control server system may send a request at regular intervals to an external service and receive a new emissions rate forecast in response. In some embodiments, the plurality of emissions rate forecasts are received by a cloud-based power control server system such as cloud-based power control server system 110 as described in relation to FIG. 2, supra. The plurality of emissions rate forecasts may also be received by a smart thermostat. In some embodiments, a smart thermostat, such as smart thermostat 160 as described in relation to FIG. 3, supra, receives the plurality of emissions rate forecasts from cloud-based power control server system 110. Each emissions rate forecast of the plurality may include the predicted rate of carbon emissions over a period of time into the future as described in relation to FIG. 4, supra.

At block 2512, an EDR event may be generated based on a first emissions rate forecast of the plurality of emissions rate forecasts. The EDR event may be generated in accordance with any of the methods as described in relation to FIGS. 13-15, supra. For example, the EDR event may be generated with an end time corresponding with the time of an emissions differential value calculated from the first emissions rate forecast. The first emissions rate forecast may be any emissions rate forecast received at any time. In some embodiments, the EDR event is generated by event scheduler 213 of cloud-based power control server system 110 as described in relation to FIG. 2, supra. In some embodiments, the EDR event is generated by event scheduler 314 of smart thermostat 160 as described in relation to FIG. 3, supra. The EDR event may be a preemptive EDR event or a deferred EDR event.

At block 2514, a thermostat may be caused to control an HVAC system in accordance with the generated EDR event. The thermostat may be caused to control the HVAC system in accordance with any of the methods as described in relation to FIGS. 13-15, supra. For example, at the start time of the EDR event, the EDR event may cause the thermostat to increase or decrease a setpoint temperature of the thermostat in order to increase or decrease the usage of the HVAC system depending on whether the HVAC system is in a heating mode or a cooling mode. In some embodiments, a cloud-based power control server system, such as cloud-based power control server system 110 as described in relation to FIG. 2, supra, causes a smart thermostat, such as smart thermostat 160 as described in relation to FIG. 3, supra, to control the HVAC system.

At block 2516, a subsequent emissions rate forecast may be obtained from the plurality of emissions rate forecasts. In some embodiments, the subsequent forecast is obtained after the thermostat is caused to control the HVAC system in accordance with the generated EDR event. In some embodiments, additional emissions rate forecasts are received after causing the thermostat to control the HVAC system in accordance with the start of the generated EDR event. In some embodiments, the subsequent forecast may include a new prediction for the emissions rate over the time when the EDR event is scheduled to be executing. For example, a previous forecast received before the EDR event began may have predicted that there would be an increase in the emissions rate at the same time as the EDR event was scheduled to end. However, a subsequent forecast may predict that the increase will now occur sooner or later than the previously expected time.

At block 2518, the end time of the EDR event may be modified based on the subsequent emissions rate forecast. In some embodiments, a modified EDR event will be generated and transmitted to a thermostat and the thermostat may begin controlling an HVAC system according to the modified end time of the modified EDR event. In some embodiments, the end time of an ongoing EDR event will be set to an earlier time based on a subsequent forecast. For example, if the subsequent forecast predicts that the emissions rate will increase sooner than previously predicted, the end time of the EDR event may be set to coincide with the newly predicted time of the emissions rate increase. In some embodiments, an ongoing EDR event may not be ended until a forecast indicates that it will be too late to end the EDR event after waiting until the next available emissions rate forecast. For example, if the most recent forecast predicts that the emissions rate will increase in five minutes, and the next available forecast will be received in thirty minutes, the system may cause the EDR event to end coinciding with the predicted time of the emissions rate increase. As another example, if the most recent forecast predicts that the emissions rate will increase in thirty minutes, and the next available forecast will be received in fifteen minutes, the system may wait to cause the EDR event to end until after receiving the next available forecast. In some embodiments, an ongoing EDR event will continue to be extended until a maximum event duration is reached. For example, if each subsequent forecast predicts a later time for an emissions rate increase, the system may continue to extend the duration of the event until a maximum event duration limit is reached, at which point the system may cause the EDR event to end when it reaches the maximum duration limit.

At block 2520, a thermostat may be caused to control an HVAC system in accordance with the modified EDR event. The thermostat may be caused to control the HVAC system in accordance with any of the methods as described in relation to FIGS. 13-15, supra. For example, at the start time of the EDR event, the EDR event may cause the thermostat to increase or decrease a setpoint temperature of the thermostat in order to increase or decrease the usage of the HVAC system depending on whether the HVAC system is in a heating mode or a cooling mode. In some embodiments, a cloud-based power control server system, such as cloud-based power control server system 110 as described in relation to FIG. 2, supra, causes a smart thermostat, such as smart thermostat 160 as described in relation to FIG. 3, supra, to control the HVAC system.

As illustrated by way of example in FIGS. 4-25, supra, EDR events may be generated and modified based on an emissions rate forecast covering one or more hours into the future. Additional constraints may be used during generation and modification to help minimize the amount of user discomfort or annoyance experienced by users. However, some users may express more or less willingness to tolerate variations in temperature control caused by their participation in EDR events compared with other users. For example, some users may be enthusiastic about reducing their carbon footprint as much as possible by participating in every possible EDR event to the greatest extent possible. Alternatively, other users may only be willing to sacrifice a bit of comfort in order to reduce carbon emissions.

In some embodiments, these differences between users may be taken into account by providing user account participation levels. For example, users associated with a user account may choose between different levels of participation where lower levels of participation correspond with fewer and/or shorter duration EDR events while a higher level of participation may correspond with more and/or longer duration EDR events. In some embodiments, the level of participation may be set indefinitely until a user associated with a user account modifies it or only for shorter periods of time. For example, the system may identify a span of time, such as a few days or a week, and present users with the opportunity to increase the level of participation of the user account for that span of time after which the participation level will return to its previous level. In some embodiments, the level of participation may be determined through other actions taken by users associated with a user account. For example, when adjustments to the setpoint temperature of a thermostat mapped to a user account are made during multiple EDR events, the system may identify a trend between each of the adjustments and modify the user account level of participation for future events. Determining the level of participation and generating events based on the level of participation will be discussed further herein in relation to FIGS. 26-30.

Figure 26:
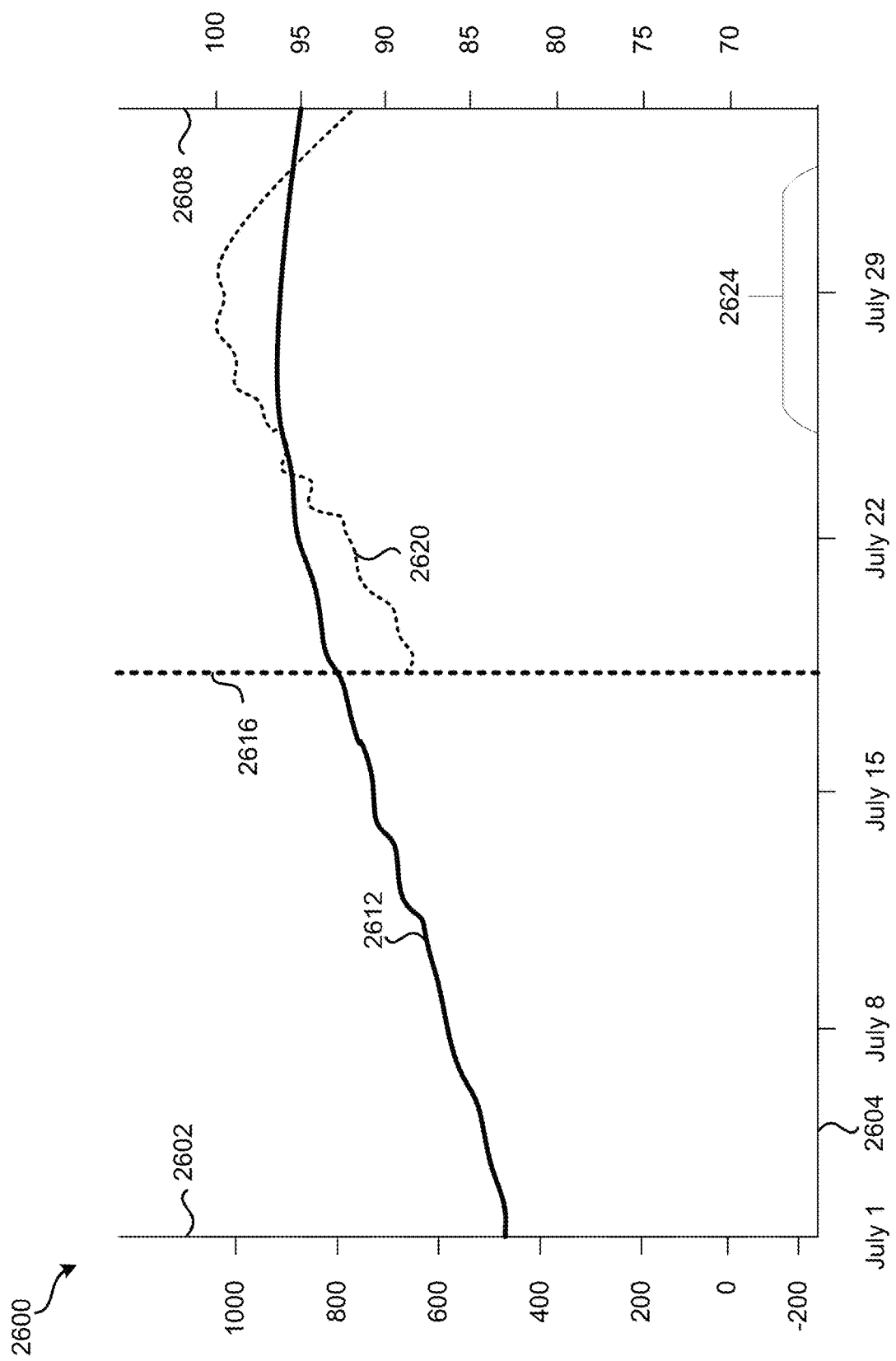
FIG. 26 illustrates a graph of the weather forecast against historical emissions rates for the same time of year.

FIG. 26 illustrates a graph 2600 of the weather forecast against historical emissions rates for the same time of year. Graph 2600 represents the same x-axis 2604 and y-axis 2602 as graph 400 described in relation to FIG. 4, supra. Right vertical axis 2608 indicates the forecasted average temperatures in Fahrenheit. Graph 2600 illustrates historical emissions rate 2612 over a period of time. Graph 2600 also illustrates current date 2616 and average temperature forecast 2620.

In some embodiments, the system obtains the actual emissions rates for one or more cities or regions. For example, historical data engine 215 of cloud-based power control server system 110 may collect actual emissions rates from utility companies or third-party databases. In some embodiments, the system may collect and store the actual emissions rates for each day of the calendar year for any number of years in the past. In some embodiments, the actual emissions rates are analyzed to determine trends and average emission rates over time. For example, the system may determine a historical emissions rate for each calendar day of the year based on the average emissions rate on each of those days in past years. In some embodiments, the historical emissions rate for a day is also obtained from various sources that collect and store actual emissions rates.

In some embodiments, the actual emissions rates are analyzed to identify historical periods of higher emissions. Higher emissions may be defined as a period of time during which emissions are, on average, 10% greater than a long-term average over a longer duration period of time. For example, a given day may be defined as having higher emissions if it is expected to result in at least 10% higher emissions than for the monthly average. In other embodiments, the percentage may be varied, such as 5%, 15%, 20%, or some other greater or lesser value. Alternatively, higher emissions may be defined as a period of time during which the emissions are predicted to be 10% higher than the same period of time in the past. For example, a given week may be defined as having higher emissions if it is expected to result in at least 10% higher emissions than the same week of the year in a prior year. In other embodiments, the percentage may be varied, such as 5%, 15%, 20%, or some other greater or lesser value.

In some embodiments, the historical periods of higher emissions are analyzed to predict future periods of higher emissions. The future period of higher emissions may be determined from repeated higher emissions for the same period in previous years. For example, because emissions rates have typically been higher at the end of July, as illustrated by historical emissions rate 2612, compared with the beginning of July, the system may determine that emissions rates will likely be higher at the end of July in the future. In some embodiments, weather forecasts are used to increase the accuracy of the predicted future periods of higher emissions. For example, if the ten day average high temperature forecast, as illustrated by average temperature forecast 2620, indicates that there will be a heatwave at the end of July, the system may determine that there is an even higher likelihood that the expected emissions rates will increase at the end of July.

In some embodiments, additional data is used to improve accuracy, such as historical temperatures. For example, if the forecast temperatures resemble the historical temperatures, the system may determine that the emissions rates during that period of time will similarly resemble the historical emissions rates. As another example, if the forecast temperatures are higher or lower than historical temperatures, the system may determine that the actual emissions rates during that time will be higher or lower than the historical rates respectively. In some embodiments, these predictions may be made by various components of cloud-based power control server system 110, such as forecast engine 217.

In some embodiments, a prediction that there will be higher emissions during an extended period of time may be used as an opportunity to increase the amount and magnitude of EDR events generated for that period. For example, the system may identify high emissions week 2624 as an opportunity to further reduce carbon emissions by generating more EDR events during high emissions week 2624 than are generally created during other times of the year. While high emissions week 2624 is approximately one week in this example, any suitable period of time may be used such as five days, one week, 2 weeks, and/or one month.

In some embodiments, a user associated with a user account will be able to increase their level of participation in EDR events during periods when higher emissions are expected to occur. For example, user management module 216 of cloud-based power control server system 110 may send a notification to a user account with a linked smart thermostat announcing that there is a time period of expected high emissions and providing a user associated with the account an opportunity to increase the number or magnitude of EDR events during the time period.

In some embodiments, a user account with an increased level of participation in EDR events will result in a thermostat linked to the user account receiving more EDR events per day. For example, instead of a thermostat receiving up to three EDR events per day, the thermostat may receive up to six EDR events per day after the level of participation in EDR events associated with the user account is increased. In some embodiments, a user account with an increased level of participation in EDR events will result in a thermostat linked to the user account receiving EDR events of a greater magnitude. For example, instead of receiving EDR events with a maximum duration of one hour or a maximum setpoint deviation of two degrees, a thermostat linked to a user account with a higher level of EDR participation may receive EDR events greater than an hour and/or with setpoint deviations greater than two degrees.

In some embodiments, a user associated with a user account will choose between two available participation levels. In other embodiments, there are 3, 4, 5, or more participation levels to choose from. In some embodiments, a user associated with a user account will be able to define the level of participation for the user account by individually increasing or decreasing specific settings, such as the maximum number of events per day, the maximum event duration, and/or the maximum setpoint temperature adjustment.

Figure 27A:
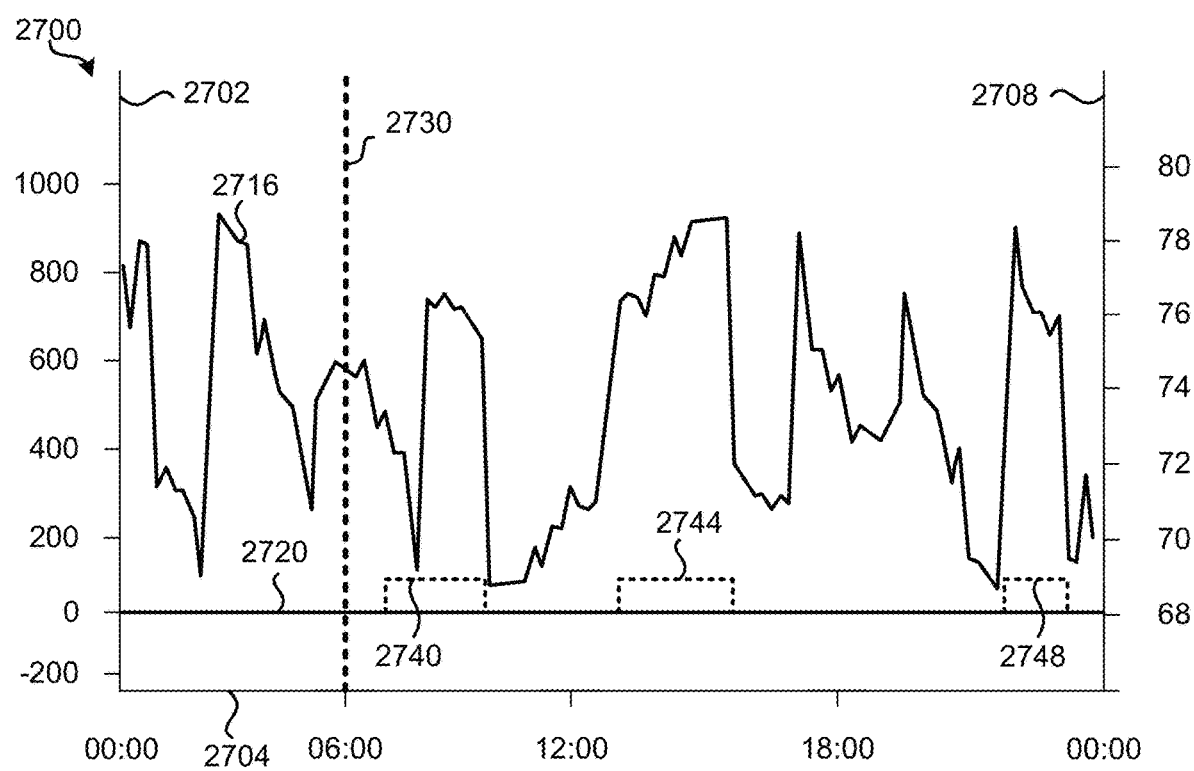
FIGS. 27A and 27B illustrate graphs of modified event participation levels based on a canceled emissions demand response event.
Figure 27B:
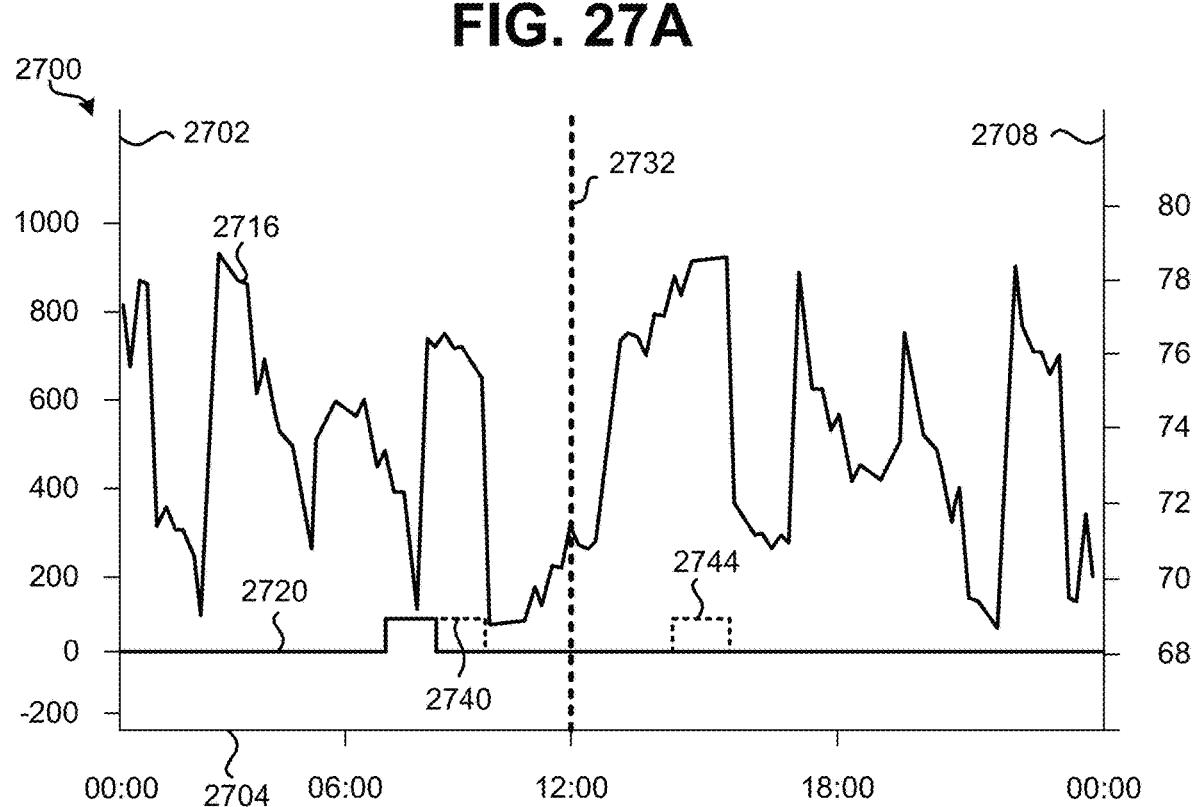

FIGS. 27A and 27B illustrate graphs 2700 of modified event participation levels based on a canceled EDR event. Graphs 2700 represent the same x-axis 2704 and y axes 2702 and 2708 as graph 400 described in relation to FIG. 4, supra. Graphs 2700 also illustrate setpoint temperature 2720 of a thermostat as a function of time and predicted emissions rate 2716 as a function of time. Graphs 2700 also illustrate time 2730 (e.g., 6:00) before any scheduled EDR events have been executed and time 2732 (e.g., 12:00) after EDR event 2740 has been executed. As illustrated in FIG. 27A, multiple EDR events may be scheduled for a 24 hour period of time, such as EDR events 2740, 2744, and 2748. In some embodiments, the number of EDR events generated per day may be based on a participation level of a particular user account. For example, as illustrated in FIG. 27A, a user account set to an increased level of participation may receive three EDR events per day instead of two events per day. Stated more generally, a user account set to a higher level of participation may receive at least one additional EDR event within a defined period of time, such as a day or week, than a user account set to a lower level of participation.

In some embodiments, an EDR event may be canceled by a person overriding the setpoint temperature of the thermostat while the EDR event is in progress. For example, as illustrated in FIG. 27B, after event 2740 had already begun and setpoint temperature 2720 had been increased, a person may have adjusted setpoint temperature 2720 to return it to its previous setting. A person may so cancel an EDR event at any point during the execution of an EDR event. For example, EDR event 2740 may have been scheduled to end after two hours; however, a person may have only started to become uncomfortable due to the temperature change after EDR event 2740 had been ongoing for one hour. There may be any number of reasons why a user might want to cancel an EDR event early. For example, it may take some people a longer or shorter time to notice that the temperature has increased or decreased, in which case the event may have initially been scheduled for longer than acceptable for that particular user account than other user accounts.

In some embodiments, an adjustment to a thermostat while an EDR event is in progress will not cause any changes to the thermostat's, or the associated user account's, participation in a future EDR event. For example, an adjustment to setpoint temperature 2720 during EDR event 2740 may only cancel the ongoing event and all future events will still take place as originally scheduled. As another example, if the setpoint temperature is adjusted in the same direction as the adjustment for the EDR event, the system may interpret this as a new setpoint temperature going forward and make the same magnitude deviation from the new setpoint temperature for future events. However, an adjustment in the opposite direction (e.g., away from the EDR event deviation) may indicate that a person associated with the user account of the thermostat will perform similar adjustments during future EDR events, thereby reducing the ability of the system to optimize carbon emissions reduction.

In some embodiments, the EDR participation level associated with a user account will be reduced based on an adjustment during an EDR event. For example, if a user associated with a user account chooses to participate in an increased number of EDR events for a period of time, one or more adjustments to the setpoint temperature of the thermostat associated with the user account during EDR events may be interpreted as an indication that a person associated with the user account no longer wishes to participate in the increased number of EDR events. For example, a thermostat associated with a user account with a higher participation level may begin receiving three EDR events per day, such as EDR events 2740, 2744, and 2748, as illustrated in FIG. 27A. However, as illustrated in FIG. 27B, after a person cancels EDR event 2740 before its scheduled end time, the system may decrease the user account's level of participation by reducing the number of events per day to correspond with a lower level of participation, such as two events per day, and cancel any excess events (e.g., EDR event 2748).

In some embodiments, EDR events are generated with a longer duration for user accounts set to a higher level of participation. For example, the system may only generate EDR events with a duration of up to one hour for user accounts set to a lower level of participation while EDR events generated for user accounts set to an increased level of participation may have a duration of up to three hours. In some embodiments, the duration of EDR events may be based on an adjustment to the setpoint temperature. For example, as illustrated in FIG. 27A, a user account set to an increased level of participation in EDR events of greater duration may receive EDR events 2740 and 2744 scheduled with a duration of at least two hours. However, as illustrated in FIG. 27B, someone may have overridden EDR event 2740 after only one hour of execution by adjusting the setpoint temperature of the thermostat. Based on the adjustment to the setpoint temperature, the system may determine that future events should not have a duration greater than the elapsed time of EDR event 2740 before it was overridden. As illustrated in FIG. 27B, the system may shorten the duration of EDR event 2744 to be the same or a similar duration as EDR event 2740 before it was overridden. In some embodiments, future events will be similarly adjusted and/or EDR events will only be generated with the new duration going forward.

Figure 28A:
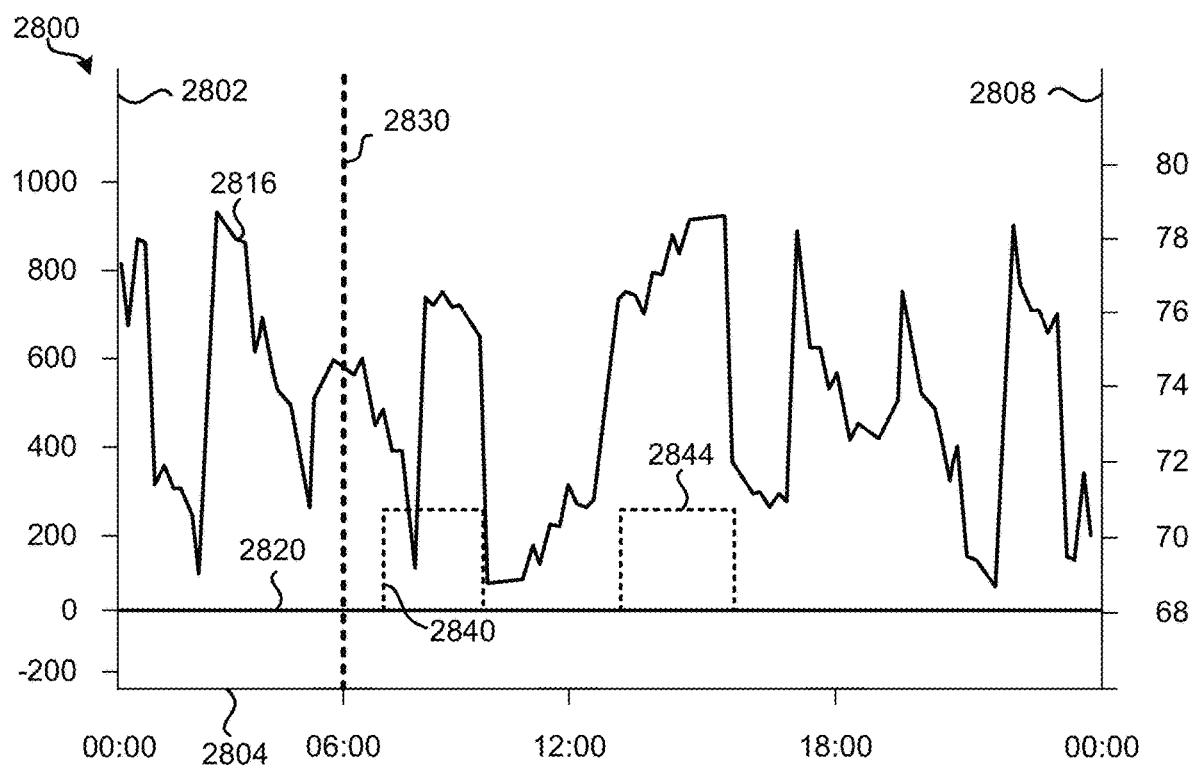
FIGS. 28A and 28B illustrate graphs of modified event participation levels based on a setpoint adjustment during an emissions demand response event.
Figure 28B:
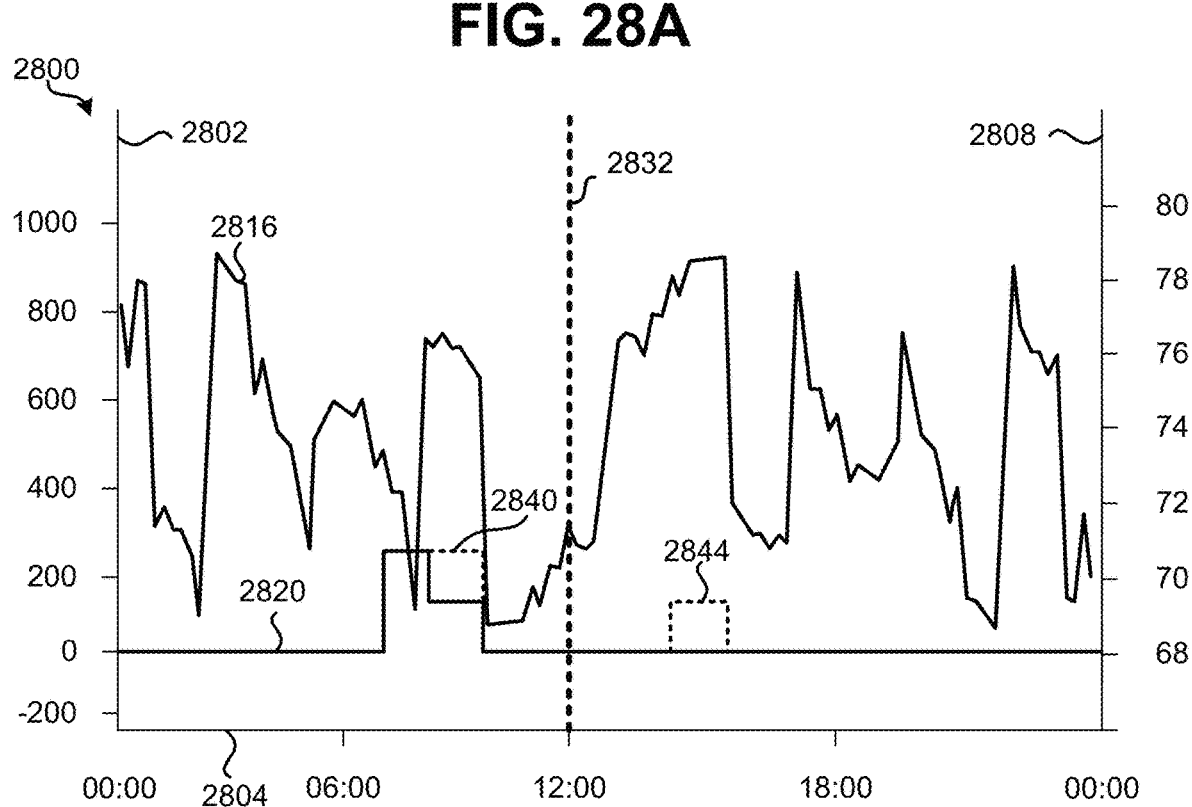

FIGS. 28A and 28B illustrate graphs 2800 of modified event participation levels based on a user input during an emissions demand response event. Graphs 2800 represent the same x-axis 2804 and y axes 2802 and 2808 as graph 400 described in relation to FIG. 4, supra. Graphs 2800 also illustrate setpoint temperature 2820 of a thermostat as a function of time and predicted emissions rate 2816 as a function of time. Graphs 2800 also illustrate time 2830 (e.g., 6:00) before any scheduled EDR events have been executed and time 2832 (e.g., 12:00) after EDR event 2840 has been executed. As illustrated in FIG. 28A, multiple EDR events may be scheduled for a 24 hour period of time, such as EDR events 2840 and 2844.

In some embodiments, an adjustment to the setpoint temperature of a thermostat while an EDR event is in progress will adjust the magnitude of the EDR event for the remainder of the EDR event. For example, as illustrated in FIG. 28B, after event 2840 had already begun with an initial adjustment to setpoint temperature 2820 (e.g., a 3 degree offset), a person may adjust setpoint temperature 2820 by less than the magnitude of EDR event 2840 (e.g., less than 3 degrees). In some embodiments, an adjustment will be interpreted as canceling the EDR event and setting a new setpoint temperature. For example, if the setpoint temperature of the thermostat is adjusted down by 2 degrees, the setpoint may remain at that temperature after the EDR event was scheduled to end. In other embodiments, the adjustment will be interpreted as reducing the offset associated with the EDR event currently in progress. For example, the setpoint temperature may remain at the new temperature only until the end of the scheduled event and then return to the original setpoint after the EDR event ends.

In some embodiments, the setpoint temperature offset of generated EDR events is based on a participation level of a particular user account. For example, as illustrated in FIG. 28A, EDR events 2840 and 2844 may have been generated with a greater adjustment (e.g., 3 degrees) to setpoint temperature 2820 for a user account set to an increased participation level compared to a user account set to a lower participation level. In some embodiments, a user account's participation level in EDR events will be modified based on an adjustment to the setpoint temperature made during an EDR event. For example, as illustrated by FIG. 28B, the system may reduce the participation level of a user based on the adjustment to EDR event 2840 made after the event had begun. In some embodiments, the reduction of the user account's level of participation in future EDR events will be a reduction in the setpoint temperature offset of future events. For example, as illustrated in FIGS. 28A and 28B, the setpoint temperature offset of EDR event 2844 may be reduced after the system determines that an adjustment was made during EDR event 2840. In some embodiments, both the setpoint temperature offset and duration of future events will be reduced based on an adjustment to the setpoint temperature.

Figure 29:
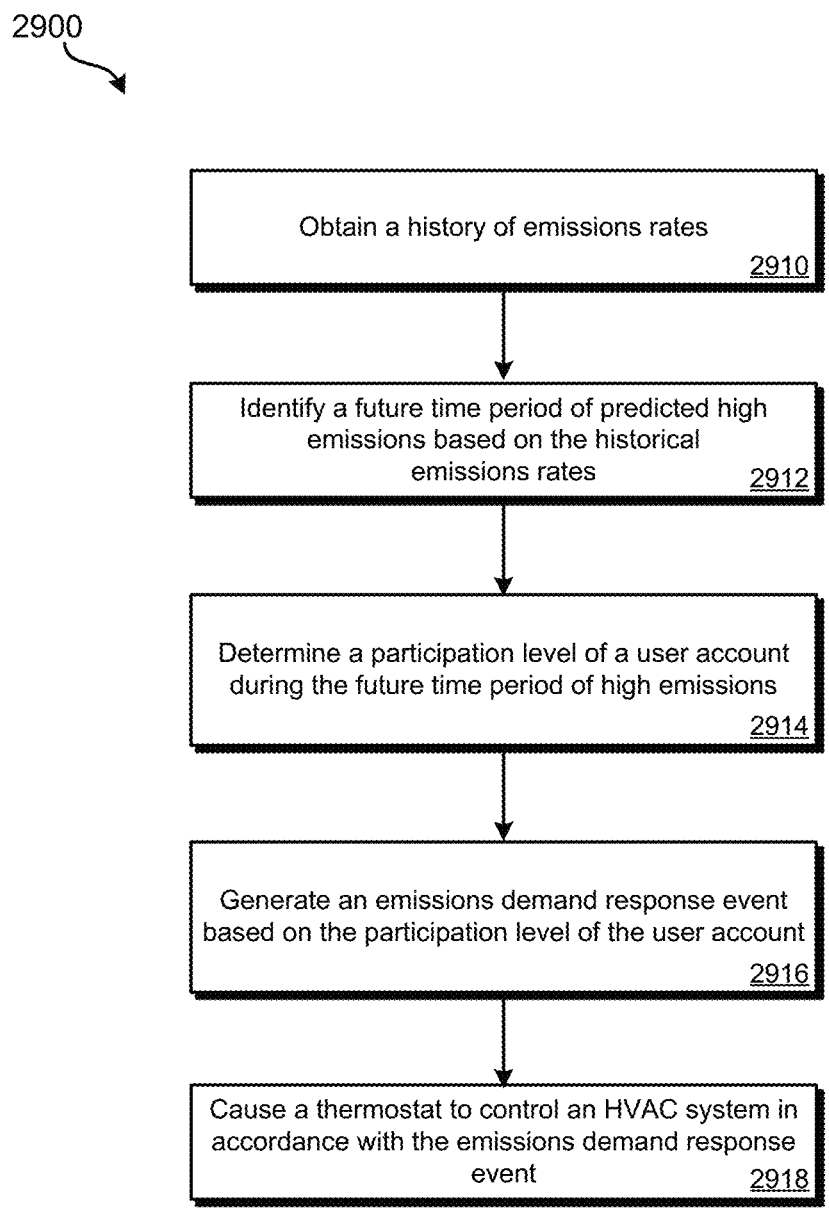
FIG. 29 illustrates an embodiment of a method for generating emissions demand response events based on user account participation levels.

Various methods may be performed using the systems detailed in FIGS. 1-3, supra, to implement EDR events as detailed in relation to FIGS. 26-28B, supra. FIG. 29 illustrates an embodiment of a method 2900 for generating emissions demand response events based on user account participation levels. In some embodiments, method 2900 may be performed by a cloud-based power control server system, such as cloud-based power control server system 110 as described in relation to FIG. 2, supra. For example, processing system 219 of cloud-based power control server system 110 may execute software from one or more modules such as event scheduler 213, constraints engine 214, historical data engine 215, user management module 216, and/or forecast engine 217. In some embodiments, various steps of method 2900 may be performed by a smart device, such as smart thermostat 160 as described in relation to FIG. 3, supra. For example, processing system 319 of smart thermostat 160 may execute software from one or more modules such as event scheduler 314 and constraints engine 315. In some embodiments, some steps of method 2900 may be performed by a cloud-based power control server system, such as cloud-based power control server system 110 while other steps are performed by a smart device, such as smart thermostat 160.

Method 2900 may include, at block 2910, obtaining a history of emissions rates. In some embodiments, a cloud-based power control server system may obtain the history of emissions rates. For example, historical data engine 215 of cloud-based power control server system 110 may obtain the history of emissions rates. In some embodiments, the history of emissions rates may be obtained from one or more third party sources. For example, cloud-based power control server system 110 may obtain the history of emissions rates from emissions data system 120 or any number of utility companies providing electricity to a city or region. In some embodiments, the history of emissions rates may be obtained from recorded emissions rates over a period of time. For example, historical data engine 215 may record actual emissions rates as they occur and store them in a database or similar data store. In some embodiments, the history of emissions rates may span one or more years of recorded emissions rates. In some embodiments, the historical emissions rates may be represented as an average historical emissions rate per day, per week, or per month of the year. For example, based on the recorded emissions rate for a certain day of the year over the past 3 years, 5 years, 10 years or more, an average historical emissions rate for that day of the year may be determined.

At block 2912, a future time period of predicted higher emissions may be identified based on the historical emissions rates. Higher emissions may be defined as a period of time during which emissions are, on average, 10% greater than a long-term average over a longer duration period of time. For example, a given day may be defined as having higher emissions if it is expected to result in at least 10% higher emissions than for the monthly average. In other embodiments, the percentage may be varied, such as 5%, 15%, 20%, or some other greater or lesser value. In some embodiments, the system identifies a future period of predicted higher emissions using historical emissions rates. For example, historical data engine 215 of cloud-based power control server system 110 may analyze the historical emissions rates and identify trends in the historical emissions rates that are likely to repeat in the future. In some embodiments, the future period of predicted high emissions may be based on a week of the year that has historically seen higher emissions rates than normal. For example, if the last week of July has historically had higher emissions rates than the surrounding times of year, the system may identify that same period in the future as having a high likelihood of higher emissions rates.

In some embodiments, identifying the future time period of predicted high emissions may be based on additional factors such as the weather. For example, the last week of July may historically be the hottest time of year and therefore be associated with historical increases in emissions rates during that time of year. Similarly, the beginning of January may historically be the coldest time of year, and therefore be associated with historical increases in emissions rates due to increased heater usage. In some embodiments, the weather forecast may be used to increase the accuracy of identifying the future time period of predicted high emissions. For example, when the historical temperatures and emissions rates indicate that a certain time of year is associated with higher than average emissions rates, if the weather forecast indicates that temperatures will be higher for that time in the future, the system may determine that there is a higher likelihood that the actual emissions rates during that time may be as high or higher than historical emissions rates for that time. Similarly, if the weather forecast indicates that temperatures will be lower than the historical average, the system may determine that there is less of a likelihood that the actual emissions rates during that time will be as high as the historical emissions rates.

At block 2914, a participation level of a user account may be determined for the future time period of predicted high emissions. In some embodiments, there will be one or more available levels of participation for reducing carbon emissions through EDR events. For example, there may be a basic entry level of participation and a more advanced or rigorous level of participation. While two levels of participation are described here for example, it should be understood that there may be additional levels and gradations between levels that apply to each individual user account. For example, participation levels may be defined by increasing or decreasing individual settings of a user account, such as a maximum number of EDR events per day, a maximum EDR event duration, and/or a maximum setpoint temperature offset per EDR event. In some embodiments, a user will set the participation level of a user account through an application installed on a computerized device such as a smartphone or tablet computer. In some embodiments, user accounts are managed by user management module 216 of cloud-based power control server system 110 as described in relation to FIG. 2, supra.

In some embodiments, the participation level may apply to a user account indefinitely. For example, when a user account is created, the desired level of participation will be selected and remain in effect until a user associated with the account modifies the level of participation. In some embodiments, certain participation levels will expire after a certain period of time. For example, an increased level of participation may only apply for time periods of predicted higher emissions, such as those identified and described above in relation to block 2912. After the time period of predicted higher emissions the user account's level of participation will revert to a previous or original setting. In some embodiments, after identifying the future times of predicted higher emissions, a user account may receive a request or invitation to increase the level of participation in generated EDR events. For example, user management module 216 may send a notification to mobile device 140 associated with a user account as described in relation to FIG. 2, supra. In some embodiments, the input received in response to a request to increase the level of participation will be stored as a preference or setting associated with the user account. In some embodiments, a user account setting will be used to determine the participation level of a user account during future time periods of predicted higher emissions. For example, user management module 216 may retrieve a setting from a user account associated with the participation level of an account.

At block 2916, an EDR event may be generated based on the participation level of a user account. In some embodiments, the participation level of a user account will affect the generation of EDR events for devices associated with the user account. For example, the constraints on generating events, as described in relation to FIGS. 10-11, supra, may be different based on the participation level of a particular user account. In some embodiments, an increased or higher level of participation is associated with a higher maximum number of EDR events per day. For example, if a baseline constraint restricts the number of generated EDR events per day to no more than 3 EDR events, the constraints for a higher participation level may allow the generation of up to 6 EDR events per day. In some embodiments, an increased or higher level of participation is associated with generating EDR events with a greater magnitude. For example, if a baseline constraint restricts the setpoint temperature adjustment associated with generated EDR events to no more than 2 degrees, an increased participation level may allow for events with setpoint temperature adjustments of up to 4 degrees. In some embodiments, an increased or higher level of participation is associated with generating EDR events having greater durations. For example, if a baseline constraint restricts the generation of EDR events having a duration greater than two hours, the constraints associated with a higher participation level may only restrict events having a duration greater than 4 hours. In some embodiments, an increased or higher level of participation is associated with an increase in any combination of the above factors. For example, a user account set to a higher level of participation may receive more EDR events lasting longer and having a greater setpoint temperature adjustment.

In some embodiments, the EDR event may be generated in accordance with any of the methods as described in relation to FIGS. 13-15, supra. For example, the EDR event may be generated with an end time corresponding with the time of an emissions differential value calculated from the first emissions rate forecast. The first emissions rate forecast may be any emissions rate forecast received at any time. In some embodiments, the EDR event may be generated by event scheduler 213 of cloud-based power control server system 110 as described in relation to FIG. 2, supra. In some embodiments, the EDR event may be generated by event scheduler 314 of smart thermostat 160 as described in relation to FIG. 3, supra. The EDR event may be a preemptive EDR event or a deferred EDR event.

At block 2918, a thermostat associated with the user account may be caused to control an HVAC system in accordance with the modified EDR event. The thermostat may be caused to control the HVAC system in accordance with any of the methods as described in relation to FIGS. 13-15, supra. For example, at the start time of the EDR event, the EDR event may cause the thermostat to increase or decrease a setpoint temperature of the thermostat in order to increase or decrease the usage of the HVAC system depending on whether the HVAC system is in a heating mode or a cooling mode. In some embodiments, a cloud-based power control server system, such as cloud-based power control server system 110 as described in relation to FIG. 2, supra, may cause a smart thermostat, such as smart thermostat 160 as described in relation to FIG. 3, supra, to control the HVAC system.

Figure 30:
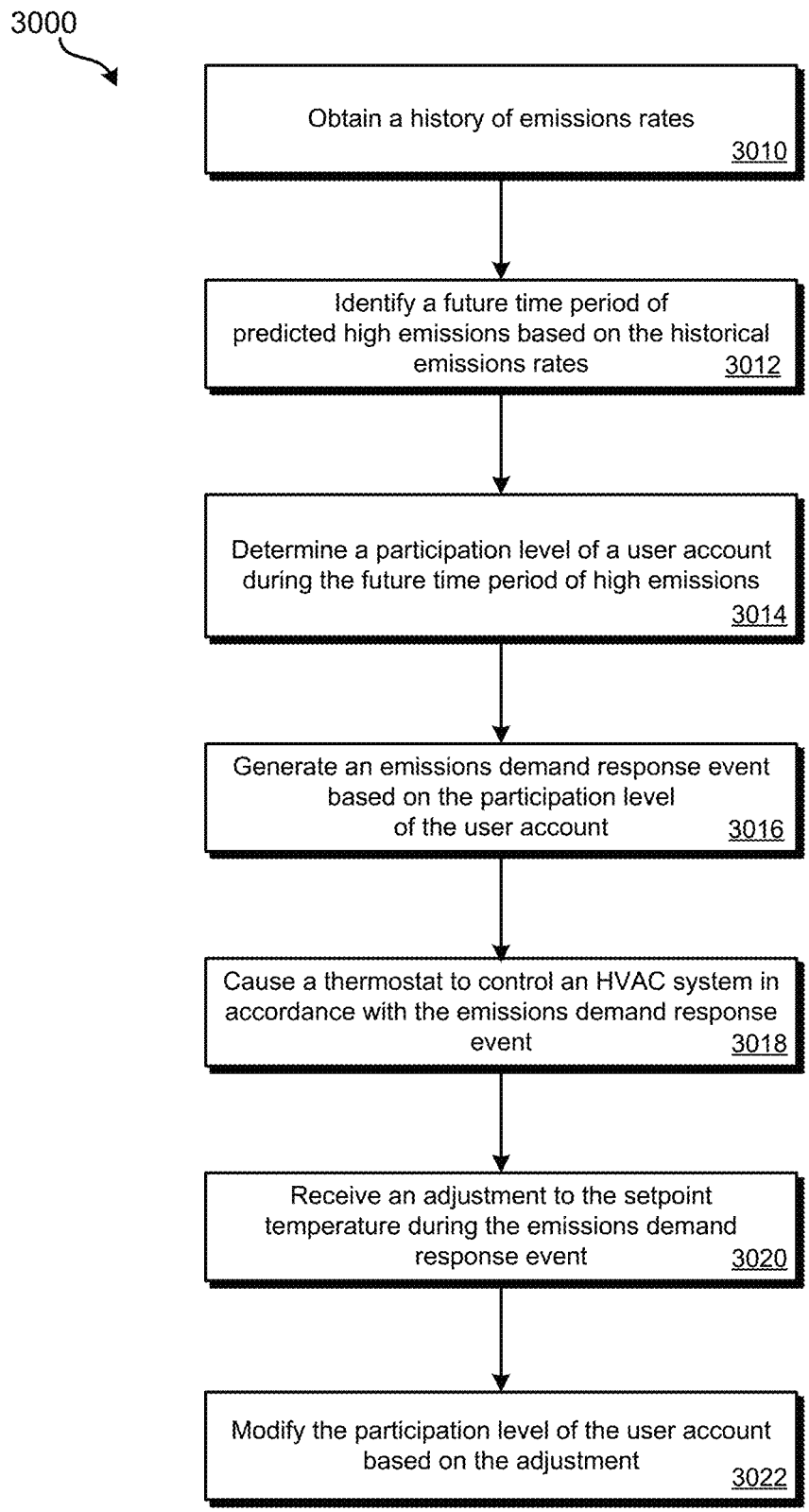
FIG. 30 illustrates an embodiment of a method for modifying a user account participation level based on a setpoint adjustment.

FIG. 30 illustrates an embodiment of a method 3000 for modifying a user account participation level based on an adjustment to the setpoint temperature during an EDR event. In some embodiments, method 3000 may be performed by any or all of the same components as described in relation to method 2900 described in relation to FIG. 29, supra. Method 3000 may include, at block 3010, obtaining a history of emissions rates. In some embodiments, a cloud-based power control server system may obtain the history of emissions rates. For example, historical data engine 215 of cloud-based power control server system 110 may obtain the history of emissions rates. In some embodiments, the history of emissions rates may be obtained from one or more third party sources. For example, cloud-based power control server system 110 may obtain the history of emissions rates from emissions data system 120 or any number of utility companies providing electricity to a city or region. In some embodiments, the history of emissions rates may be obtained from recorded emissions rates over a period of time. For example, historical data engine 215 may record actual emissions rates as they occur and store them in a database or similar data store. In some embodiments, the history of emissions rates may span one or more years of recorded emissions rates. In some embodiments, the historical emissions rates may be represented as an average historical emissions rate per day, per week, or per month of the year. For example, based on the recorded emissions rate for a certain day of the year over the past 3 years, 5 years, 10 years or more, an average historical emissions rate for that day of the year may be determined.

At block 3012, a future time period of predicted higher emissions may be identified based on the historical emissions rates. Higher emissions may be defined as a period of time during which emissions are, on average, 10% greater than a long-term average over a longer duration period of time. For example, a given day may be defined as having higher emissions if it is expected to result in at least 10% higher emissions than for the monthly average. In other embodiments, the percentage may be varied, such as 5%, 15%, 20%, or some other greater, intermediate, or lesser value. In some embodiments, the system identifies a future period of predicted higher emissions using historical emissions rates. For example, historical data engine 215 of cloud-based power control server system 110 may analyze the historical emissions rates and identify trends in the historical emissions rates that are likely to repeat in the future. In some embodiments, the future period of predicted high emissions may be based on a week of the year that has historically seen higher emissions rates than normal. For example, if the last week of July has historically had higher emissions rates than the surrounding times of year, the system may identify that same period in the future as having a high likelihood of higher emissions rates.

In some embodiments, identifying the future time period of predicted high emissions may be based on additional factors such as the weather. For example, the last week of July may historically be the hottest time of year and therefore be associated with historical increases in emissions rates during that time of year. Similarly, the beginning of January may historically be the coldest time of year, and therefore be associated with historical increases in emissions rates due to increased heater usage. In some embodiments, the weather forecast may be used to increase the accuracy of identifying the future time period of predicted high emissions. For example, when the historical temperatures and emissions rates indicate that a certain time of year is associated with higher than average emissions rates, if the weather forecast indicates that temperatures will be higher for that time in the future, the system may determine that there is a higher likelihood that the actual emissions rates during that time may be as high or higher than historical emissions rates for that time. Similarly, if the weather forecast indicates that temperatures will be lower than the historical average, the system may determine that there is less of a likelihood that the actual emissions rates during that time will be as high as the historical emissions rates.

At block 3014, a participation level of a user account may be determined for the future time period of predicted high emissions. In some embodiments, there will be one or more available levels of participation for reducing carbon emissions through EDR events. For example, there may be a basic entry level of participation and a more advanced or rigorous level of participation. While two levels of participation are described here for example, it should be understood that there may be additional levels and gradations between levels that apply to each individual user. For example, participation levels may be defined by increasing or decreasing individual settings of a user account, such as a maximum number of EDR events per day, a maximum EDR event duration, and/or a maximum setpoint temperature offset per EDR event. In some embodiments, a user will set the participation level of a user account through an application installed on a computerized device such as a smartphone or tablet computer. In some embodiments, user accounts are managed by user management module 216 of cloud-based power control server system 110 as described in relation to FIG. 2, supra.

In some embodiments, the participation level may apply to a user account indefinitely. For example, when a user account is created, the desired level of participation will be selected and remain in effect until a user associated with the account modifies the level of participation. In some embodiments, certain participation levels will expire after a certain period of time. For example, an increased level of participation may only apply for time periods of predicted higher emissions, such as those identified and described above in relation to block 3012. After the time period of predicted higher emissions, the user account's level of participation will revert to a previous or original setting. In some embodiments, after identifying the future times of predicted higher emissions, a user account may receive a request or invitation to increase the level of participation in generated EDR events. For example, user management module 216 may send a notification to mobile device 140 associated with a user account as described in relation to FIG. 2, supra. In some embodiments, the input received in response to a request to increase the level of participation will be stored as a preference or setting associated with the user account. In some embodiments, a user account setting will be used to determine the participation level of a user account during future time periods of predicted higher. For example, user management module 216 may retrieve a setting from a user account associated with the participation level of an account.

At block 3016, an EDR event may be generated based on the participation level of a user account. In some embodiments, the participation level of a user account will affect the generation of EDR events for devices associated with the user account. For example, the constraints on generating events, as described in relation to FIGS. 10-11, supra, may be different based on the participation level of a particular user account. In some embodiments, an increased or higher level of participation is associated with a higher maximum number of EDR events per day. For example, if a baseline constraint restricts the number of generated EDR events per day to no more than 3 EDR events, the constraints for a higher participation level may allow the generation of up to 6 EDR events per day. In some embodiments, an increased or higher level of participation is associated with generating EDR events with a greater magnitude. For example, if a baseline constraint restricts the setpoint temperature adjustment associated with generated EDR events to no more than 2 degrees, an increased participation level may allow for events with setpoint temperature adjustments of up to 4 degrees. In some embodiments, an increased or higher level of participation is associated with generating EDR events having greater durations. For example, if a baseline constraint restricts the generation of EDR events having a duration greater than two hours, the constraints associated with a higher participation level may only restrict events having a duration greater than 4 hours. In some embodiments, an increased or higher level of participation is associated with an increase in any combination of the above factors. For example, a user account set to a higher level of participation may receive more EDR events lasting longer and having a greater setpoint temperature adjustment.

In some embodiments, the EDR event may be generated in accordance with any of the methods as described in relation to FIGS. 13-15, supra. For example, the EDR event may be generated with an end time corresponding with the time of an emissions differential value calculated from the first emissions rate forecast. The first emissions rate forecast may be any emissions rate forecast received at any time. In some embodiments, the EDR event may be generated by event scheduler 213 of cloud-based power control server system 110 as described in relation to FIG. 2, supra. In some embodiments, the EDR event may be generated by event scheduler 314 of smart thermostat 160 as described in relation to FIG. 3, supra. The EDR event may be a preemptive EDR event or a deferred EDR event.

At block 3018, a thermostat associated with the user account may be caused to control an HVAC system in accordance with the modified EDR event. The thermostat may be caused to control the HVAC system in accordance with any of the methods as described in relation to FIGS. 13-15, supra. For example, at the start time of the EDR event, the EDR event may cause the thermostat to increase or decrease a setpoint temperature of the thermostat in order to increase or decrease the usage of the HVAC system depending on whether the HVAC system is in a heating mode or a cooling mode. In some embodiments, a cloud-based power control server system, such as cloud-based power control server system 110 as described in relation to FIG. 2, supra, may cause a smart thermostat, such as smart thermostat 160 as described in relation to FIG. 3, supra, to control the HVAC system.

At block 3020, an adjustment to the setpoint temperature may be received during the execution of an EDR event. In some embodiments, after a thermostat has increased or decreased the setpoint temperature in accordance with an EDR event, and before the thermostat has restored the setpoint temperature to its original setting, the setpoint temperature will be adjusted. For example, if an EDR event has caused the setpoint temperature to increase by two degrees for two hours, after some period of time, a person may adjust the setpoint temperature by further increasing the setpoint temperature or decreasing the setpoint temperature. In some embodiments, the setpoint temperature is manually adjusted at the thermostat or through remote communication with the thermostat. For example, a person may adjust a nob or dial on the face of the thermostat, such as smart thermostat 160 as described in relation to FIG. 3, supra. As another example, a user associated with a user account linked to the thermostat may adjust the setpoint through an application on a mobile device such as mobile device 140 as described in relation to FIG. 1, supra.

In some embodiments, an adjustment to the setpoint temperature during an EDR event will cancel the execution of the EDR event. For example, if an EDR event was scheduled to increase the setpoint temperature by two degrees for two hours, the EDR event may be canceled by decreasing the setpoint temperature by two degrees before the end of the two hours. In some embodiments, an adjustment during an EDR event will only modify the remainder of the EDR event. Using the same example, if the setpoint temperature is only decreased by one degree, the setpoint temperature may remain at that temperature until the end of the scheduled event, at which point the setpoint temperature may revert to the original setpoint temperature.

At block 3022, the participation level of the user account may be modified based on the adjustment to the setpoint temperature. In some embodiments, one or more adjustments that cancel or modify an EDR event in progress will be used as the basis to modify the participation level of a user account. For example, after multiple EDR events are canceled in a row, the system my reduce the participation level of a user account. In some embodiments, the participation level of a user account will be reduced gradually and/or based on certain trends identified in multiple adjustments to the setpoint temperature while EDR events are in progress. For example, when a user account is set to an increased level of participation resulting in more EDR events with a longer durations (e.g., 2 hours) and multiple events in a row are canceled after a shorter period of time (e.g., 1 hour), the system may continue to generate the same number of events but with a shorter duration (e.g., 1 hour). In some embodiments, one or more adjustments will be used as a basis for reducing the participation level of a user account to a previous or original level of participation. For example, when a user account is set to participate in a week of increased EDR event activity, the system may identify one or more canceled events and set the user account to no longer participate in the week of increased EDR event activity. In some embodiments, a notification may be sent to a user account before decreasing the level of participation. For example, user management module 216 of cloud-based power control server 110 may send a notification to mobile device 140 associated with the user account requesting verification that the user account should or should not remain at the same participation level.

Figure 31:
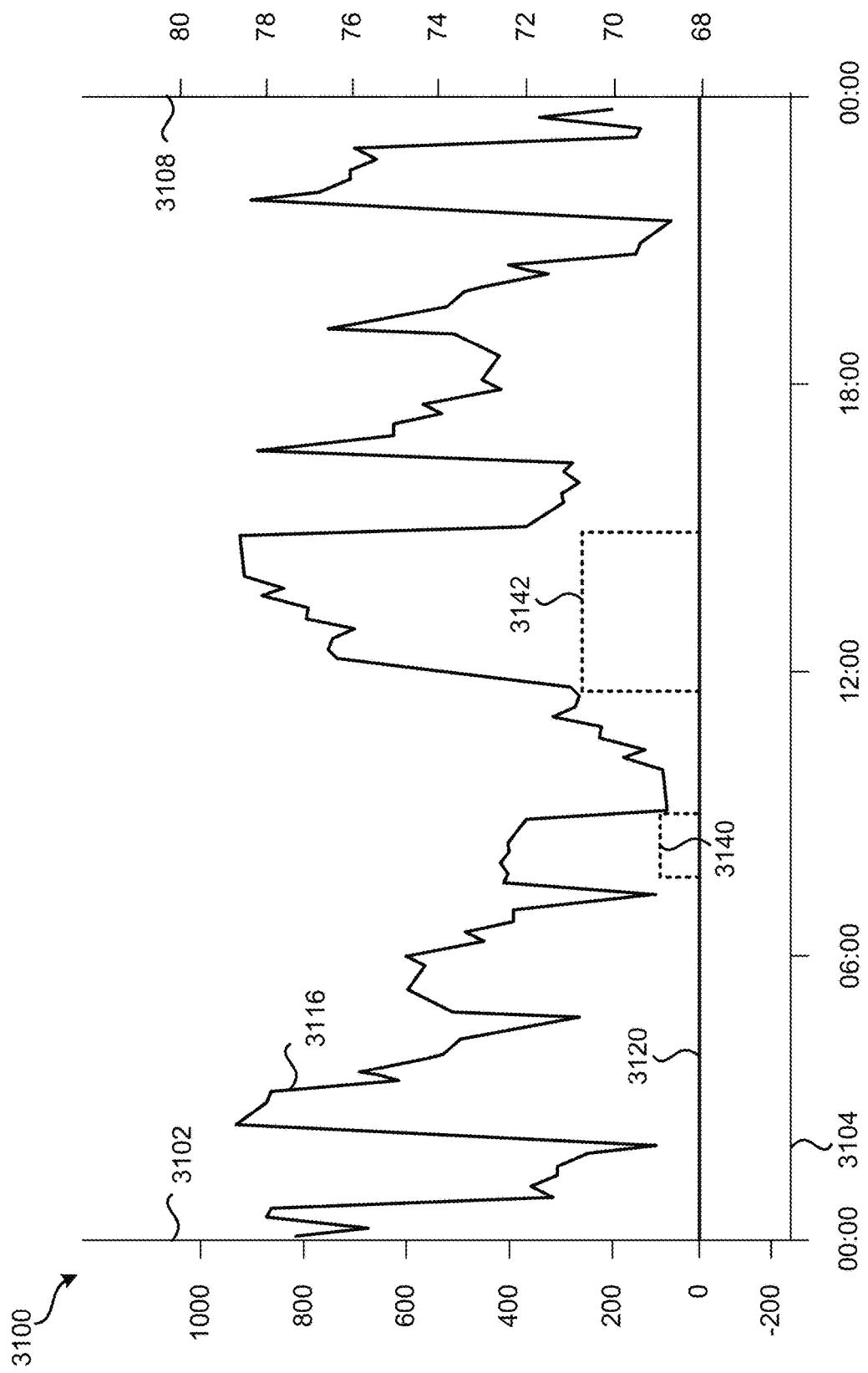
FIG. 31 illustrates a graph of emissions demand response events based on future emissions rate event magnitudes.

In some embodiments, additional factors and data are used to generate and execute EDR events such as confidence values and/or forecast volatility. These and other features in accordance with some embodiments will be discussed further herein in relation to FIGS. 31-37. FIG. 31 illustrates graph 3100 of emissions demand response events based on future emissions rate event magnitudes. Graph 3100 represents the same x-axis 3104 and y axes 3102 and 3108 as graph 400 described in relation to FIG. 4, supra. Graph 3100 illustrates predicted emissions rate 3116 over a period of time. Graph 3100 also illustrates setpoint temperature 3120 of a thermostat. As indicated in graph 3100 by the deviations to setpoint temperature 3120, the system may have already generated EDR events 3140 and 3142.

In some embodiments, EDR events are generated based on future emissions rate events. A future emissions rate event may be any period of time in the future when the emissions rate is expected to be at an increased or decreased level. The increased or decreased level may be based on any suitable measurement, such as the deviation from a running average emissions rate for a prior period of time. For example, if the average emissions rate over the last 1, 2, 3, or more weeks was a certain amount, a deviation of 10% in the emissions rate may be considered an increased or decreased level of emissions. In other embodiments, the deviation may be 10%, 20%, 30%, or some other percentage deviation from the average emissions rate. A future emissions rate event could also be defined as a time period when the rate of change of the emissions level, or the emissions differential is higher or lower than a threshold value. The running average emissions rate may be more or less specific, such as an average emissions rate for a time of day based on the average emissions rate at that same time of day in the past. A future emissions rate event may also be a time when there is an expected increase or decrease in emissions rate, based on the expected emissions differential or some other estimate of the rate of change of the emissions rate. In some embodiments, after identifying a future emissions rate event, an EDR event is generated to coincide with the future emissions rate event as described further in relation to FIGS. 4-15, supra.

In some embodiments, EDR events are generated based on the shape or magnitude of a future emissions rate event. The shape or magnitude of a future emissions rate event may be the amount of time when the predicted emissions rate is expected to be at an increased or decreased level and/or the amount of deviation from a threshold emissions rate value. For example, an increased level of emissions lasting for two hours may be considered to have a greater magnitude than the same increased level of emissions lasting for only one hour. As another example, an increase in the emissions rate by 600 lbs-CO2/MWh lasting for one hour may be considered to have a greater magnitude than a 200 lbs-CO2/MWh increase lasting for one hour.

In some embodiments, EDR events are generated with different shapes or magnitudes. The shape or magnitude of an EDR event may be the size of the adjustment to a setpoint temperature of a thermostat and/or the amount of time the setpoint temperature is adjusted. For example, an EDR event that adjusts the setpoint temperature by three degrees for two hours may be considered to have a greater magnitude than an EDR event that adjusts the setpoint temperature by one degree for one hour.

In some embodiments, the shape or magnitude of an EDR event is based on the shape or magnitude of a future emissions rate event. Stated more generally, a future emissions rate event with a magnitude greater than a threshold magnitude may result in increasing the duration, setpoint adjustment, or both, of an EDR event. For example, as illustrated in FIG. 31, EDR event 3140 may have been generated with a magnitude (e.g., a one degree offset for one hour) to correspond with a smaller magnitude future emissions rate event. Similarly, EDR event 3142 may have been generated with a larger magnitude (e.g., a three degree offset for three hours) than EDR event 3140 to correspond with a larger magnitude future emissions rate event.

Figure 32:
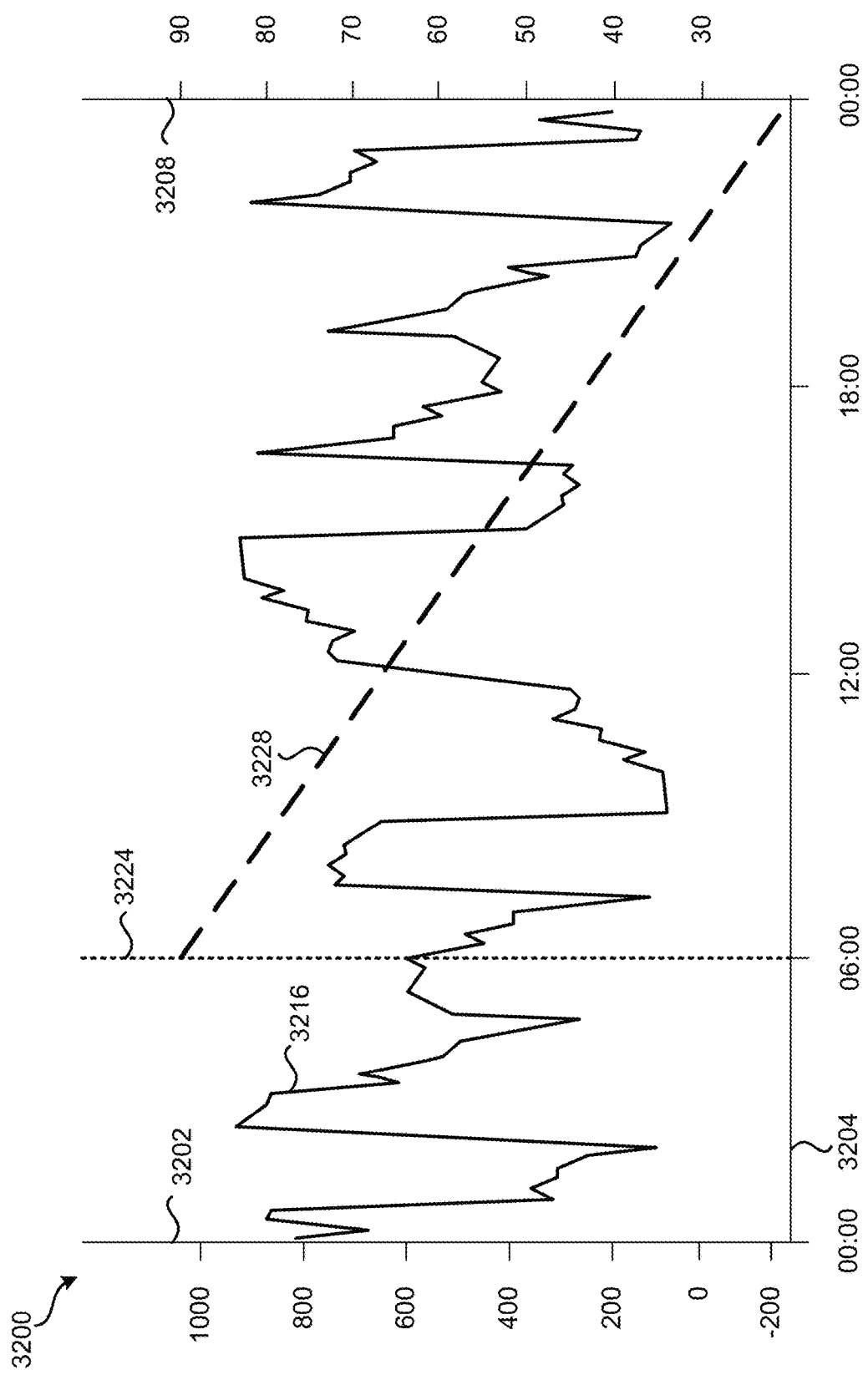
FIG. 32 illustrates another graph of forecast emissions data with decreasing confidence values.

FIG. 32 illustrates graph 3200 of forecast emissions data with decreasing confidence values. Graph 3200 represents the same x-axis 3204 and y-axis 3202 as graph 400 described in relation to FIG. 4, supra. Graph 3200 illustrates predicted emissions rate 3216 over a period of time. Graph 3200 also illustrates confidence value 3228 as a measure of the certainty in predicted emissions rate 3216 occurring as predicted over time. Right vertical axis 3208 indicates the percentage confidence.

In some embodiments, confidence values are obtained for the predicted emissions rate in a forecast. The confidence values may measure the certainty of the actual emissions rate matching the predicted emissions rate at the time when it was predicted to occur. The confidence values might also measure the certainty of the actual rate of change of the emissions rate as quantified by the emissions differential matching the predicted rate of change. A confidence value may be any form of measurement, such as a percentage likelihood of the emissions rate occurring at the same rate as predicted. For example, a confidence value of 90% may indicate a high likelihood that the actual emissions rate will occur as predicted while a confidence value of 30% may indicate that it is less likely for the actual emissions rate to occur as predicted. In some embodiments, the confidence value is obtained from a third party source such as emissions data system 120 as further described in relation to FIG. 1, supra.

In some embodiments, the confidence value is based on a time decay applied to the predicted emissions rate at the time when the predicted emissions rate is received or generated. The time decay may be a measure of the rate of decline in the confidence value over time, such that the confidence value will decrease at a certain rate with the passage of time. The rate of decay may be any suitable rate such as 5, 10, 15, or more percent per hour. For example, as illustrated by FIG. 32, confidence value 3228 may initially begin at 90% at time 3224 when predicted emissions rate 3216 is received (e.g., 06:00), and decrease to approximately 20% by the end of the forecast (e.g. 00:00). While a straight line rate of decay is illustrated in FIG. 32, any other suitable rate of decay, such as parabolic or exponential, may be applied to the predicted emissions rates in a forecast. In some embodiments, one or more modules in cloud-based power control server system 110 may determine the confidence value for a predicted emissions rate, such as historical data engine 215 and/or forecast engine 217 as described in relation to FIG. 2, supra.

In some embodiments, a confidence value is determined for a future emissions rate event. The confidence value for a future emissions rate event may be the average confidence value over the duration of the future emissions rate event. For example, if the confidence value at the beginning of a one hour future emissions rate event is 90% and the confidence values decay at a rate of 10% per hour (i.e., the confidence value at the end of the future emissions rate event is 80%), then the confidence value for the future emissions rate event may be 85% (i.e., the average of 90% and 80%). In some embodiments, the confidence value for a future emissions rate event is the confidence value at the beginning or end of the future emissions rate event.

Figure 33:
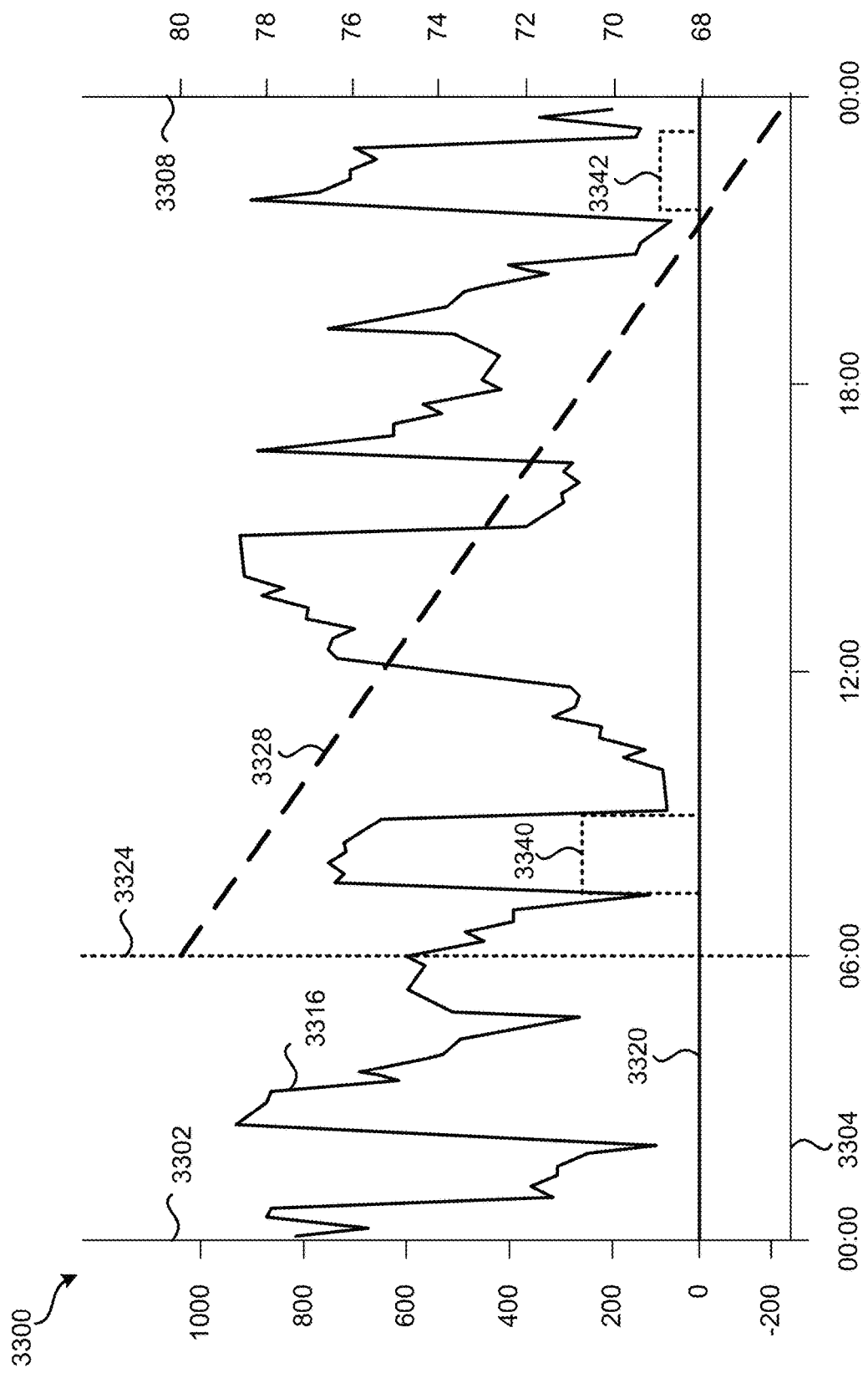
FIG. 33 illustrates a graph of emissions demand response events generated based on confidence values.

FIG. 33 illustrates graph 3300 of emissions demand response events generated based on confidence values. Graph 3300 represents the same x-axis 3304 and y axes 3302 and 3308 as graph 400 described in relation to FIG. 4, supra. Graph 3300 illustrates time 3324 when predicted emissions rate 3316 was received. Graph 3300 also illustrates setpoint temperature 3320 of a thermostat. As indicated in graph 3300 by the deviations to setpoint temperature 3320, the system may have already generated EDR events 3340 and 3342. Graph 3300 also illustrates confidence value 3328 as a measure of the certainty of predicted emissions rate 3316 occurring as predicted over time.

In some embodiments, the shape or magnitude of EDR events is based on the confidence value associated with a future emissions rate event. For example, when the confidence value for a future emissions rate event is greater than a threshold confidence value, the magnitude of an EDR event may be increased. Similarly, when the confidence value for a future emissions rate event is lower than a threshold confidence value, the magnitude of an EDR event may be decreased. As described in relation to FIG. 31, supra, the increase or decrease in magnitude may include increasing or decreasing the duration of an EDR event and/or increasing or decreasing the size of the adjustment to the setpoint temperature of a thermostat. For example, as illustrated in FIG. 33, EDR event 3340 has a larger setpoint adjustment (e.g., 3 degrees instead of 2 degrees) because the confidence value associated with the future emissions rate event used to generate EDR event 3340 was greater than a threshold confidence value. Similarly, EDR event 3342 has a smaller setpoint adjustment (e.g., 1 degree instead of 2 degrees) because the confidence value associated with the future emissions rate event used to generate EDR event 3342 was less than a threshold confidence value. In some embodiments, the confidence value is used to adjust an event score, as described in relation to FIG. 9, supra. For example, a potential event may get a higher score if the confidence value is higher which would make it more likely to be one of the actual scheduled events.

In some embodiments, there may be one or more threshold values associated with various EDR event magnitudes. For example, when the confidence value is above 75%, EDR events may be generated with a setpoint adjustment of three degrees, while a confidence value below 75% and above 50% may be generated with a two degree adjustment, and a confidence value below 50% may be generated with only a one degree adjustment to the setpoint temperature.

Figure 34:
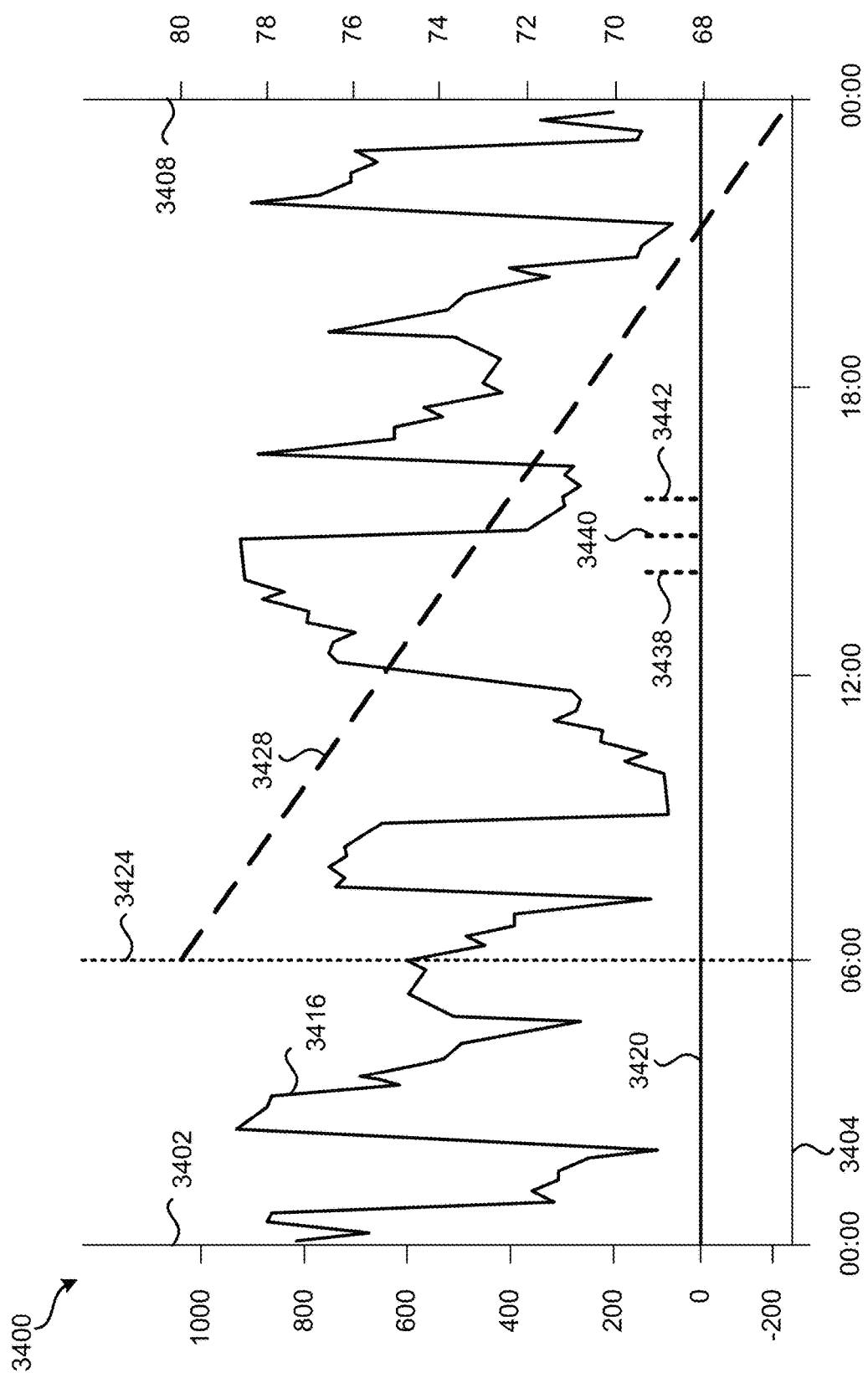
FIG. 34 illustrates a graph of multiple emissions demand response event end times based on confidence values.

FIG. 34 illustrates graph 3400 of multiple emissions demand response event end times based on confidence values. Graph 3400 represents the same x-axis 3404 and y axes 3402 and 3408 as graph 400 described in relation to FIG. 4, supra. Graph 3400 illustrates time 3424 when predicted emissions rate 3416 was received. Graph 3400 also illustrates setpoint temperature 3420 of a thermostat. Graph 3400 illustrates confidence value 3428 as a measure of the certainty of predicted emissions rate 3416 occurring as predicted over time. Graph 3400 also illustrates potential EDR event end times 3438, 3440, and 3442.

In some embodiments, multiple different EDR events are generated for a future emissions rate event. After identifying a future emissions rate event, the system may generate a first EDR event for one or more thermostats, and generate a second EDR event, with different characteristics than the first, for one or more other thermostats. The different characteristics may include the size of the adjustment to the setpoint temperature of a thermostat and/or the duration of the EDR event. In some embodiments, the magnitude of the EDR events differs because of different constraints among user accounts as described in relation to FIGS. 4-15, supra. In some embodiments, the different EDR events are generated because of different user account participation levels, as described in relation to FIGS. 26-30, supra.

In some embodiments, multiple EDR events are generated with different start and/or end times for a future emissions rate event based on a confidence value associated with the future emissions rate event. This may be due to the uncertainty involved in predicting when an emissions rate increase/decrease will occur. When the confidence value is lower, there may be a greater chance that the emissions rate event will end earlier or later than the currently predicted time. For example, a future emissions rate event with a predicted end time of 15:00 and confidence value of 50% may end 5 minutes, 10 minutes, 15 minutes, or more before or after 15:00. When the confidence value is lower than a threshold confidence value, one or more additional EDR events may be generated with different end times. For example, as illustrated in FIG. 34, multiple EDR events with event end times 3438, 3440, and 3442 may be generated around the same time because the confidence value was less than a threshold confidence value (e.g., less than 50%).

In some embodiments, the number of different EDR events is based on the confidence value for the future emissions rate event. When the confidence value of a future emissions rate event is less than a threshold confidence value, the number of EDR events generated may increase by at least one. For example, a confidence value over 50% for a future emissions rate event may result in the generation of one EDR event, such as an EDR event with event end time 3440, while a confidence value under 50% may result in the generation of additional EDR events with different end times, such as event end times 3438 and 3442.

In some embodiments, multiple different EDR events for a future emissions rate event are distributed across available thermostats or similar devices. The distribution of the different EDR events may be the percentage of devices receiving each different EDR event. For example, if there are 100 available devices for three different EDR events, an even distribution may be when the number of available devices receiving one of the EDR events is the same as the number of devices receiving each of the other EDR events. On the other hand, a smaller distribution may mean that more devices receive one of the EDR events than receive the other EDR events. In some embodiments, the distribution of the different EDR events is based on the confidence value for the future emissions rate event. In some embodiments, when the confidence value of a future emissions rate event is less than a threshold confidence value, the distribution increases towards an even distribution.

Figure 35:
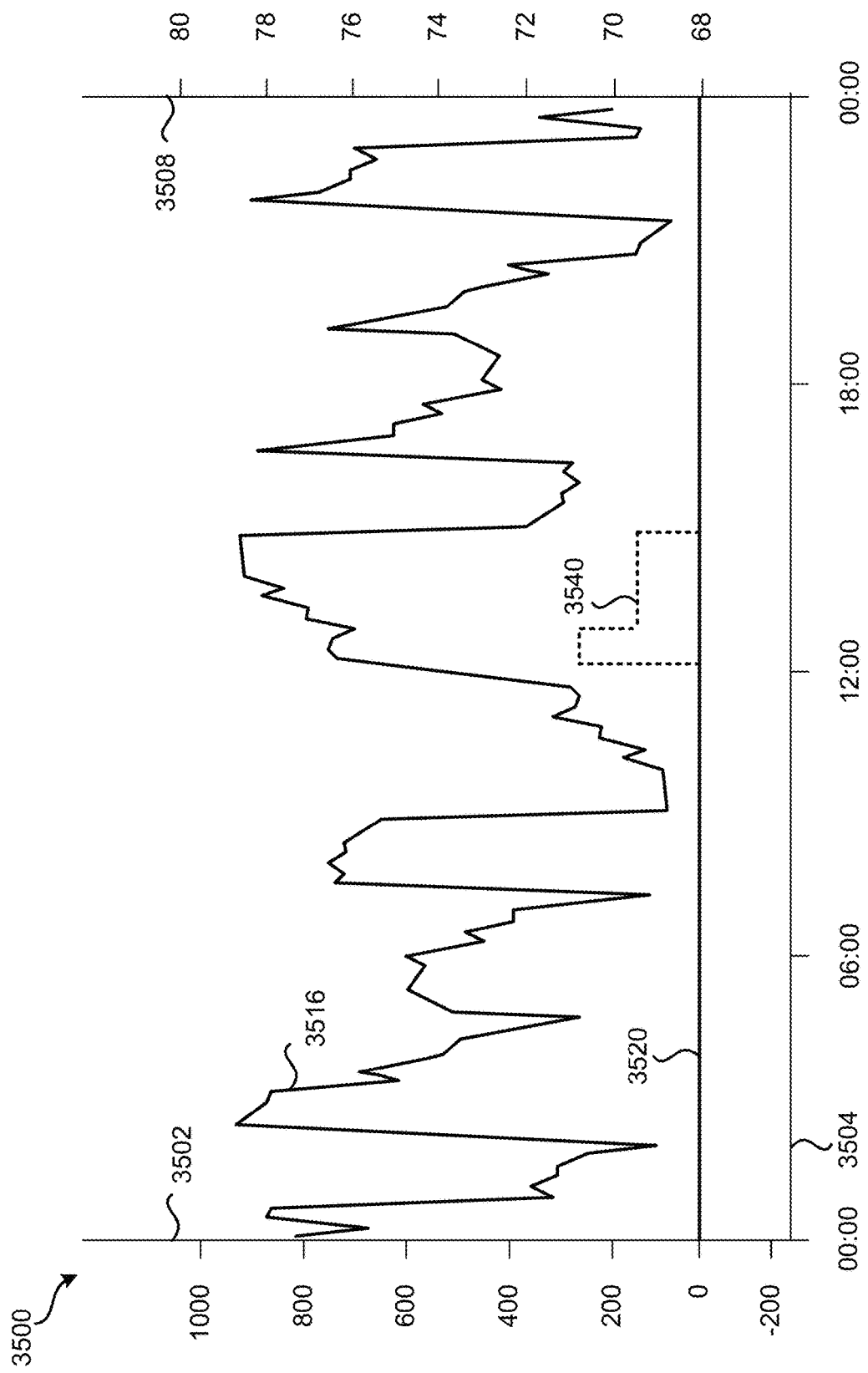
FIG. 35 illustrates a graph of an emissions demand response event with stepwise adjustments to the setpoint temperature.

FIG. 35 illustrates graph 3500 of an emissions demand response event with stepwise adjustments to the setpoint temperature. Graph 3500 represents the same x-axis 3504 and y axes 3502 and 3508 as graph 400 described in relation to FIG. 4, supra. Graph 3500 illustrates predicted emissions rate 3516 over a period of time. Graph 3500 also illustrates setpoint temperature 3520 of a thermostat. As indicated in graph 3500 by the deviations to setpoint temperature 3520, the system may have already generated EDR events 3540.

In some embodiments, an EDR event will cause a thermostat to adjust the setpoint temperature one or more times during the EDR event. For example, as illustrated in FIG. 35, EDR event 3540 includes a first setpoint adjustment of approximately three degrees (e.g., from 20 to 23) for a first portion of the event before reducing the adjustment by approximately half (e.g., from 23 to 21.5). In some embodiments, the different adjustments during an EDR event are based on different predicted emissions rates. As described in relation to FIG. 31, supra, a greater increase or decrease in the emissions rate may correspond with a greater adjustment to the setpoint temperature of a thermostat.

In some embodiments, an initial adjustment to the setpoint temperature is greater than the adjustment for the remainder of the EDR event in order to trigger a change in the state of the HVAC system. This may be due to the hysteresis setpoint temperatures of a thermostat. The hysteresis setpoint temperatures may be boundary temperatures around the desired setpoint temperature that trigger the HVAC to change from a running state to an idle state and to change from an idle state to a running state. For example, if the desired setpoint temperature is 60 degrees, a thermostat in a cooling mode may allow the ambient temperature to increase to 61 degrees before causing the HVAC system to turn on, and may allow the ambient temperature to decrease to 59 degrees before causing the HVAC system to turn off again.

When the HVAC system is already running, a larger adjustment may be used to cause the HVAC system to turn off earlier. For example, using the same setpoint temperatures as above, if the HVAC system is running in a cooling mode and the ambient temperature is 60.9 degrees, a one degree increase in the setpoint temperature may not cause the HVAC system to turn off because the new lower hysteresis setpoint temperature would be 60 degrees (i.e., lower than the ambient temperature); however a two degree adjustment would cause the HVAC system to turn off because the new lower hysteresis setpoint temperature would be 61 degrees (i.e., higher than the ambient temperature). Similarly, when the HVAC system is in an idle state, a larger adjustment may be used to cause the HVAC system to turn on earlier. To continue the example from above, if the ambient temperature was 59.1 degrees, a one degree decrease in the setpoint temperature may not cause the HVAC system to turn on because the new upper hysteresis setpoint temperature would be 60 degrees (e.g., higher than the ambient temperature); however, a two degree adjustment would cause the HVAC system to turn on because the new upper hysteresis setpoint temperature would be 59 degrees (e.g., lower than the ambient temperature).

In some embodiments, an EDR event will adjust the upper and/or lower hysteresis setpoint temperatures. For example, instead of adjusting the desired setpoint temperature of the thermostat, the EDR event may cause the upper and lower hysteresis setpoint temperatures to increase or decrease by the same adjustment that would have been made to a desired setpoint temperature. In some embodiments, the upper and lower hysteresis setpoint temperatures receive different adjustments based on the type of EDR event. For example, a deferred heating event or a preemptive cooling event may decrease the lower hysteresis setpoint temperature by a first amount while reducing the upper hysteresis setpoint temperature by a lesser amount than the first amount. Similarly, a deferred cooling event or a preemptive heating event may increase the upper hysteresis setpoint temperature by a first amount while increasing the lower hysteresis setpoint temperature by a lesser amount than the first amount.

Figure 36A:
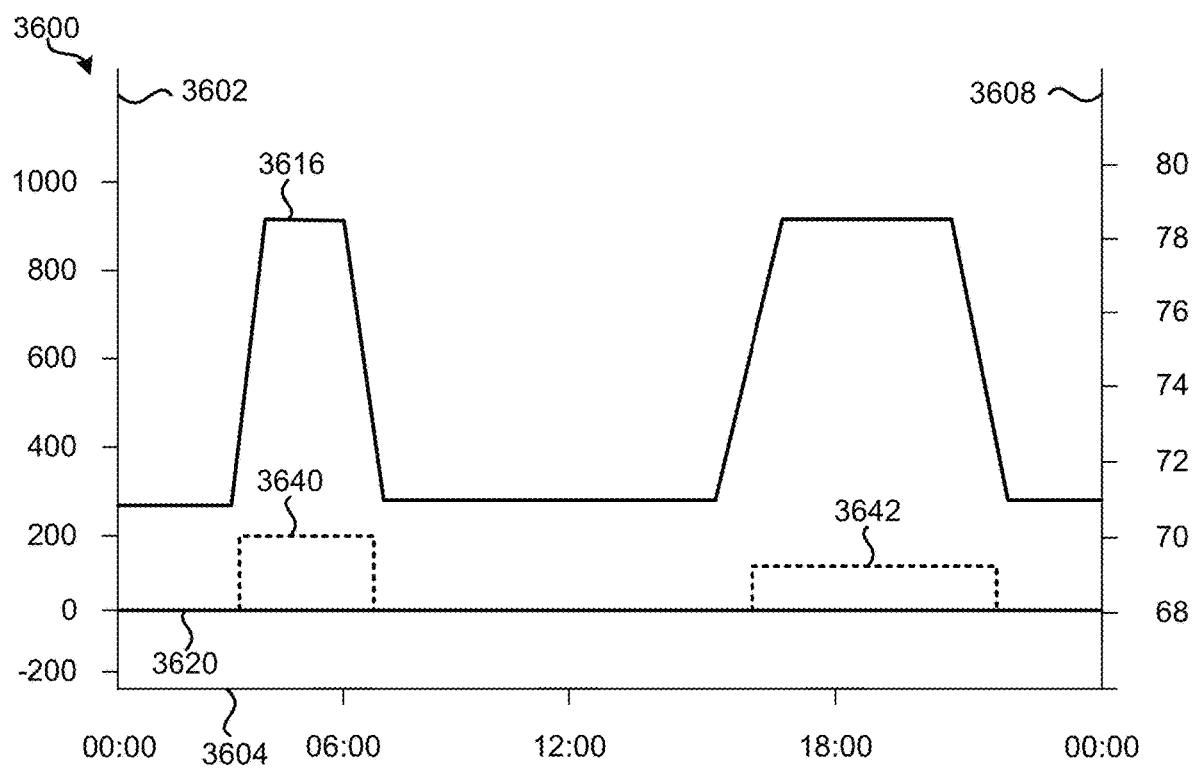
FIGS. 36A and 36B illustrate graphs of emissions demand response events generated based on forecast volatility.
Figure 36B:
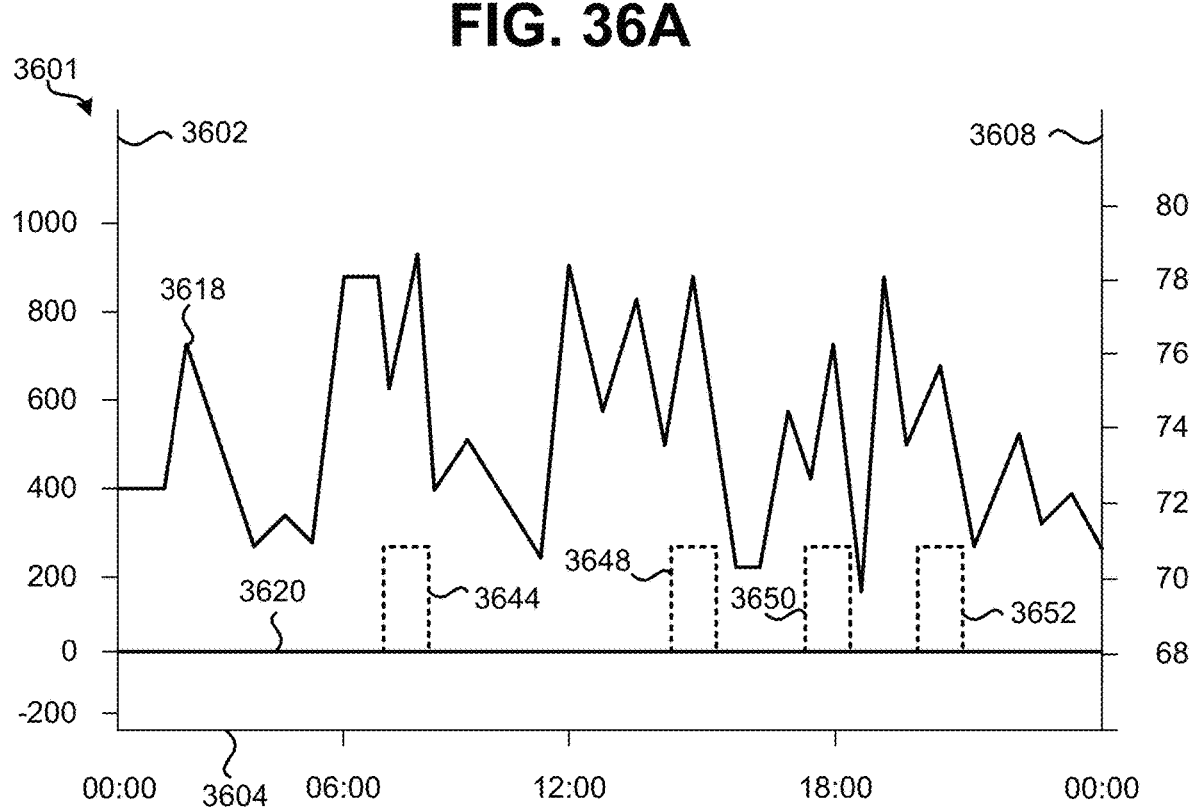

FIGS. 36A and 36B illustrate graphs 3600 and 3601 of emissions demand response events generated based on forecast volatility. Graphs 3600 and 3601 represent the same x-axis 3604 and y axes 3602 and 3608 as graph 400 described in relation to FIG. 4, supra. Graphs 3600 and 3601 also illustrate setpoint temperature 3620 of a thermostat as a function of time. As illustrated by FIGS. 36A and 36B, predicted emissions rates 3616 and 3618 may have different amounts of emissions rate volatility.

In some embodiments, an emissions rate volatility value is determined based on the predicted emissions rate forecast. An emissions rate volatility value may measure the relative volatility in the predicted emissions rate over a period of time, such as the forecast period. The emissions rate volatility value may be represented as a percentage value or any other suitable unit of measurement. In some embodiments, the emissions rate volatility value is a measure of the relative volatility in a predicted emissions rate forecast as compared to the historical emissions rate volatility for a region. In some embodiments, the emissions rate volatility value is a measure of the relative volatility in a predicted emissions rate forecast as compared to the volatility of a region.

In some embodiments, a predefined maximum number of EDR events per day is modified based on the emissions rate volatility value. Stated more generally, the predefined maximum number of EDR events per day may be increased by at least one event per day when the emissions rate volatility value is greater than a threshold volatility value. For example, as illustrated in FIGS. 36A and 36B, four EDR events 3644, 3648, 3650, and 3652 may be generated based on a relatively high emissions rate volatility value associated with predicted emissions rate 3618 compared to only two EDR events, 3640 and 3642, generated based on a relatively low emissions rate volatility value associated with predicted emissions rate 3616.

In some embodiments, the setpoint adjustment of an EDR event is modified based on the emissions rate volatility value. Stated more generally, the temperature offset caused by an EDR event may be increased by at least one degree when the emissions rate volatility value is greater than a threshold volatility value. For example, as illustrated in FIGS. 36A and 36B, EDR events 3644, 3648, 3650, and 3652 may be generated with a three degree offset from the setpoint temperature based on a relatively high emissions rate volatility value associated with predicted emissions rate 3618 compared to only two degrees for EDR events 3640 and 3642, generated based on relatively low emissions rate volatility value associated with predicted emissions rate 3616.

In some embodiments, a predefined maximum EDR event duration is modified based on the emissions rate volatility value. Stated more generally, the predefined maximum EDR event duration may be increased by at least 5 minutes, 30 minutes, 60 minutes or more per event when the emissions rate volatility value is less than a threshold volatility value. For example, as illustrated in FIGS. 36A and 36B, EDR events 3640 and 3642 may be generated with a duration greater than 2 hours based on a relatively low emissions rate volatility value associated with predicted emissions rate 3616 compared to only one hour for EDR events 3644, 3648, 3650, and 3652 based a relatively high emissions rate volatility value associated with predicted emissions rate 3618. In some embodiments, the predefined maximum number of EDR events per day and the predefined maximum EDR event duration are inversely correlated based on the emissions rate volatility value. For example, when the emissions rate volatility value is greater than a threshold volatility value, the predefined maximum number of EDR events per day is increased while the predefined maximum EDR event duration is decreased.

Figure 37:
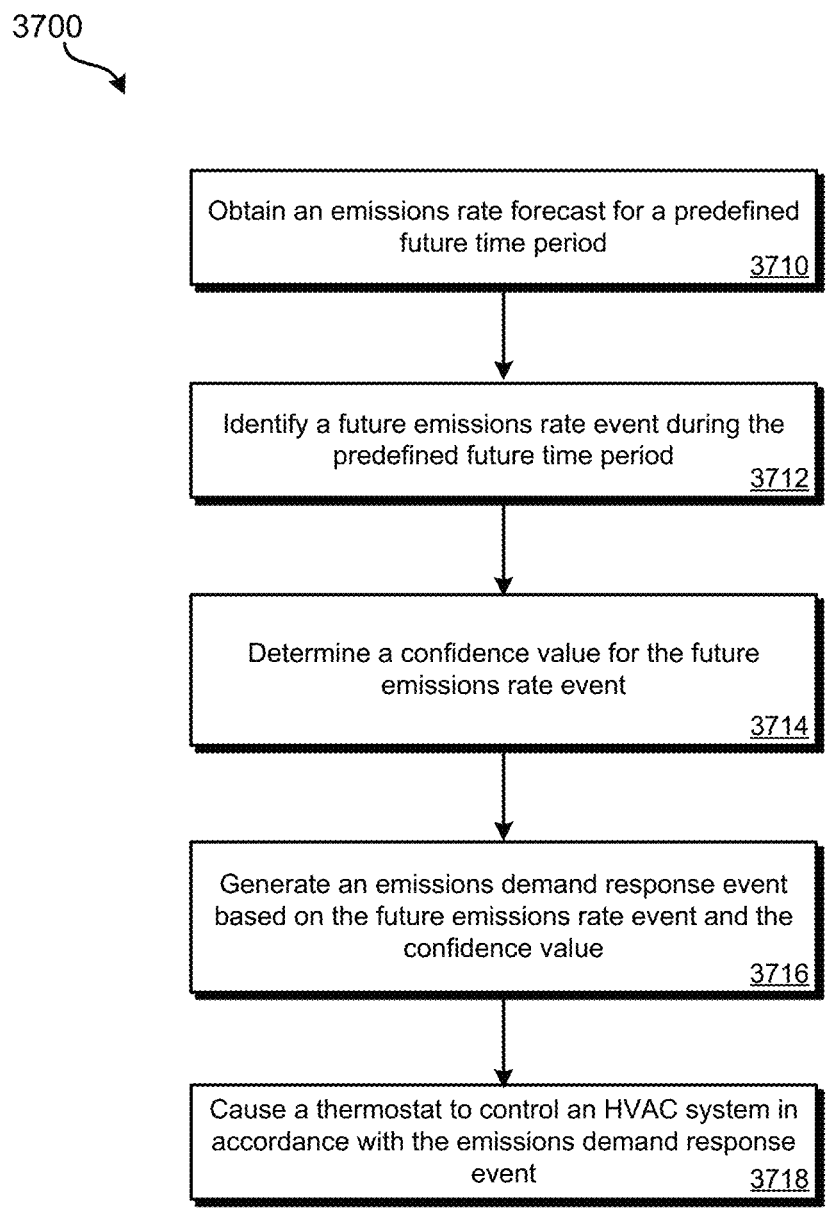
FIG. 37 illustrates an embodiment of a method for shaping emissions demand response events based on a forecast emissions rate confidence value.

Various methods may be performed using the systems detailed in FIGS. 1-3, supra, to implement EDR events as detailed in relation to FIGS. 31-36B, supra. FIG. 37 illustrates an embodiment of a method 3700 for shaping emissions demand response events based on a forecast emissions rate confidence value. In some embodiments, method 3700 may be performed by a cloud-based power control server system, such as cloud-based power control server system 110 as described in relation to FIG. 2, supra. For example, processing system 219 of cloud-based power control server system 110 may execute software from one or more modules such as event scheduler 213, constraints engine 214, historical data engine 215, user management module 216, and/or forecast engine 217. In some embodiments, various steps of method 3700 may be performed by a smart device, such as smart thermostat 160 as described in relation to FIG. 3, supra. For example, processing system 319 of smart thermostat 160 may execute software from one or more modules such as event scheduler 314 and constraints engine 315. In some embodiments, some steps of method 3700 may be performed by a cloud-based power control server system, such as cloud-based power control server system 110 while other steps are performed by a smart device, such as smart thermostat 160.

Method 3700 may include, at block 3710, obtaining an emissions rate forecast for a predefined future time period. The emissions rate forecast may include the predicted rate of carbon emissions over a period of time into the future. The rate of carbon emissions may be measured in lbs-CO2/MWh or any similar unit of measurement. The period of time into the future may be any number of hours including 24 hours into the future. The emissions rate forecast may be received from a commercial service that collects and analyzes emissions rate data from various sources such as utility companies that provide electricity to cities or regions. In some embodiments, the emissions rate forecast may be generated by a cloud-based power control server system using data collected from one or more sources such as utility companies and weather services. In some embodiments, the emissions rate forecast may be received by a cloud-based power control server system such as cloud-based power control server system 110 as described in relation to FIG. 2, supra. The emissions rate forecast may also be received by a smart thermostat. In some embodiments, a smart thermostat, such as smart thermostat 160 as described in relation to FIG. 3, supra, may receive the emissions rate forecast from cloud-based power control server system 110.

At block 3712, a future emissions rate event may be identified based on the emissions rate forecast. A future emissions rate event may be any period of time in the future when the emissions rate is expected to be at an increased or decreased level. The increased or decreased level may be based on any suitable measurement, such as a deviation from a running average emissions rate for a prior period of time. For example, an increased or decreased level of emissions may be identified when there is a 10% deviation from the average emissions rate over the last 1, 2, 3, or more weeks. In other embodiments, the deviation may be 10%, 20%, 30%, or some other percentage deviation from the average emissions rate. The running average emissions rate may be more or less specific, such as an average emissions rate for a time of day based on the average emissions rate at that same time of day in the past.

In some embodiments, the future emissions rate event is identified by a cloud-based power control server system. For example, forecast engine 217 of cloud-based power control server system 110 may analyze the emissions rate forecast to identify the future emissions rate event. In some embodiments, a cloud-based power control server system determines a shape or magnitude of the future emissions rate event. The shape or magnitude of a future emissions rate event may be the amount of time when the predicted emissions rate is expected to be at an increased or decreased level and/or the amount of deviation from a threshold emissions rate value, such as a running average emissions rate. For example, an increased level of emissions lasting for two hours may be considered to have a greater magnitude than the same increased level of emissions lasting for only one hour.

At block 3714, a confidence value may be determined for the future emissions rate event. The confidence value may measure the certainty of the actual emissions rate matching the predicted emissions rate over the course of the future emissions rate event. A confidence value may be any form of measurement, such as a percentage likelihood of the emissions rate occurring at the same rate as predicted. For example, a confidence value of 90% may indicate a high likelihood that the actual emissions rate will occur as predicted while a confidence value of 30% may indicate that it is less likely for the actual emissions rate to occur as predicted. In some embodiments, the confidence value is obtained from a third party source such as emissions data system 120 as further described in relation to FIG. 1, supra. In some embodiments, the confidence value is determined by a cloud-based power control server system as described in relation to FIG. 32, supra.

At block 3716, an EDR event may be generated based on the future emissions rate event and the confidence value. In some embodiments, the shape or magnitude of the generated EDR event is based on the future emissions rate event. The shape or magnitude of a EDR event may be the size of the adjustment to a setpoint temperature of a thermostat and/or the amount of time the setpoint temperature is adjusted. In some embodiments, the shape or magnitude of an EDR event is based on the shape or magnitude of a future emissions rate event, as described in relation to FIG. 31, supra.

In some embodiments, the shape or magnitude of EDR events is based on the confidence value associated with a future emissions rate event. For example, when the confidence value for a future emissions rate event is greater than a threshold confidence value, the magnitude of an EDR event may be increased. Similarly, when the confidence value for a future emissions rate event is lower than a threshold confidence value, the magnitude of an EDR event may be decreased. In some embodiments, there may be one or more threshold values associated with various EDR event magnitudes, as described in relation to FIG. 33, supra.

In some embodiments, the EDR event is also based on an emissions rate volatility value for the emissions rate forecast. An emissions rate volatility value may measure the relative volatility in the predicted emissions rate over a period of time, such as the forecast period. The emissions rate volatility value may be represented as a percentage value or any other suitable unit of measurement. The emissions rate volatility value may measure the relative volatility in the predicted emissions rate forecast compared to various other sources, as described in relation to FIGS. 36A and 36B, supra. In some embodiments, the emissions rate volatility value modifies a predefined maximum number of EDR events per day, resulting in greater or fewer generated EDR events. In some embodiments, the emissions rate volatility value modifies the setpoint adjustment of an EDR event resulting in a larger or smaller adjustment to the setpoint temperature of a thermostat. In some embodiments, the emissions rate volatility value modifies a predefined maximum EDR event duration resulting in the generation of EDR events with longer or shorter durations.

In some embodiments, the EDR event may be generated in accordance with any of the methods as described in relation to FIGS. 13-15, supra. For example, the EDR event may be generated with an end time corresponding with the time of an emissions differential value calculated from the emissions rate forecast. In some embodiments, multiple EDR events are generated with different start and/or end times for the future emissions rate event based on the confidence value associated with the future emissions rate event as described in relation to FIG. 34, supra. In some embodiments, the EDR event may be generated by event scheduler 213 of cloud-based power control server system 110 as described in relation to FIG. 2, supra. In some embodiments, the EDR event may be generated by event scheduler 314 of smart thermostat 160 as described in relation to FIG. 3, supra. The EDR event may be a preemptive EDR event or a deferred EDR event.

At block 3718, a thermostat may be caused to control an HVAC system in accordance with the EDR event. The thermostat may be caused to control the HVAC system in accordance with any of the methods as described in relation to FIGS. 13-15, supra. For example, at the start time of the EDR event, the EDR event may cause the thermostat to increase or decrease a setpoint temperature of the thermostat in order to increase or decrease the usage of the HVAC system depending on whether the HVAC system is in a heating mode or a cooling mode. In some embodiments, causing the thermostat to control the HVAC system is accomplished by adjusting hysteresis setpoint temperatures of the thermostat as described in relation to FIG. 35, supra. In some embodiments, multiple thermostats are caused to control an HVAC system in accordance with multiple different EDR events, as described in relation to FIG. 34, supra. In some embodiments, a cloud-based power control server system, such as cloud-based power control server system 110 as described in relation to FIG. 2, supra, may cause a smart thermostat, such as smart thermostat 160 as described in relation to FIG. 3, supra, to control the HVAC system.

Figure 38:
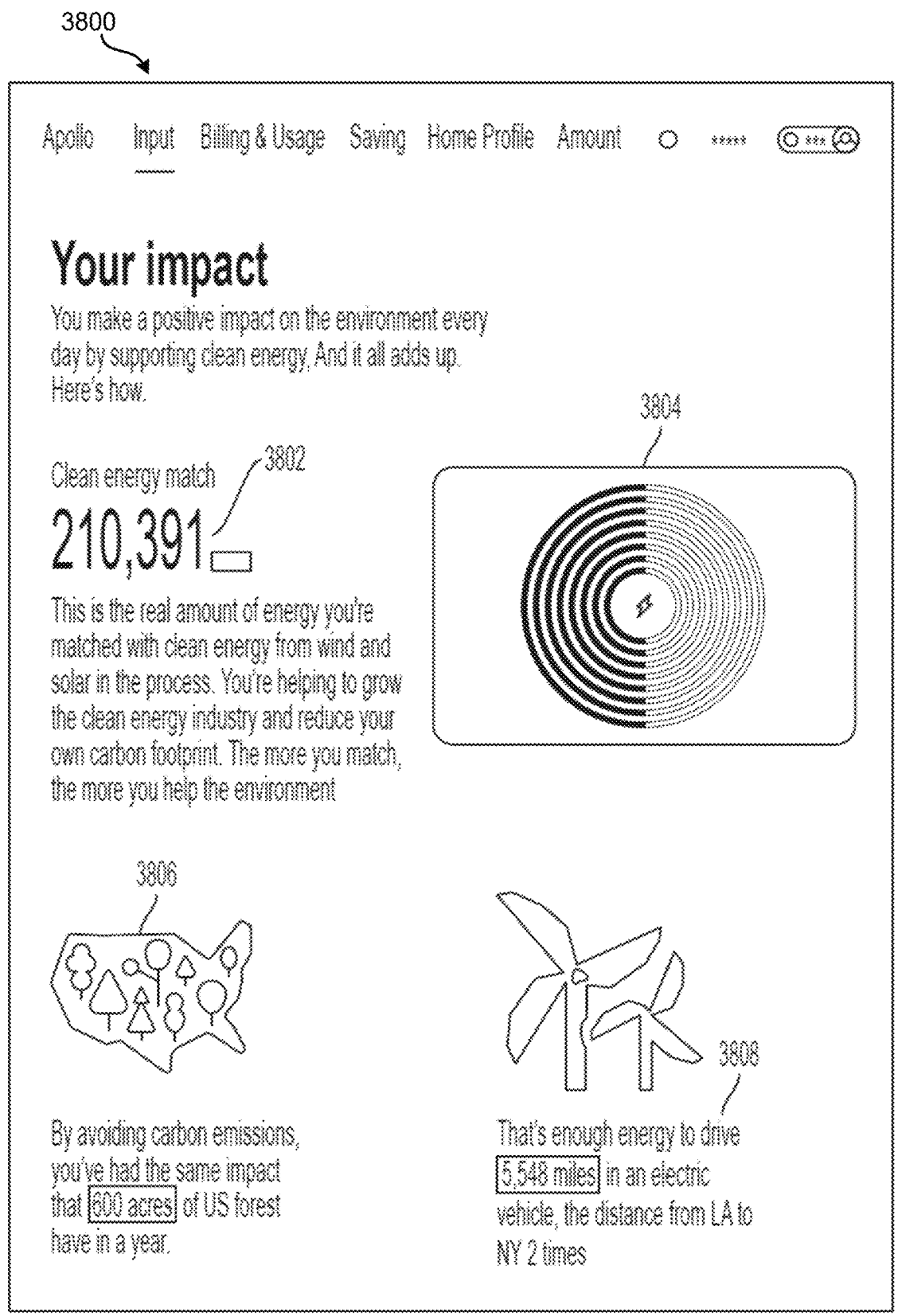
FIG. 38 illustrates an embodiment of a user interface indicating the carbon emissions savings generated by a user account.

FIG. 38 illustrates an embodiment of an indication of the impact on carbon emissions generated by a user account. In some embodiments, the system will quantify the impact on carbon emissions generated by a user account. By quantifying the impact generated by a user account in a meaningful way, users associated with the account may be encouraged to continue pursuing cleaner electricity practices and reducing their impact on the environment.

In some embodiments, the impact generated by a user account is displayed in a graphical user interface. For example, as illustrated in FIG. 38, the impact may be displayed on a webpage, such as homepage 3800 of a user account. In other embodiments, the impact is displayed through an application on a mobile device or personal computer. For example, an application running on a mobile device, such as mobile device 140 as described in relation to FIG. 1, supra, may have a page or section of pages displaying the impact achieved by the user account overall and/or individual devices linked to the user account, such as smart thermostat 160 as described in relation to FIG. 3, supra. In some embodiments, the impact generated by a user account is sent to a user associated with the user account on a periodic or occasional basis. For example, a cloud-based power control server system, such as cloud-based power control server system 110 as described in relation to FIG. 2, may send an email to an email address mapped to the user account every week or every month indicating a total amount of carbon emissions savings since the user account was created and/or the amount of carbon emissions savings generated by the user account since a last notification was sent. It should be understood that the interface illustrated in FIG. 38 is one of many potential examples of visual representations and the same or similar information could be displayed in any number of visual formats or layouts.

In some embodiments, the impact generated by a user account is quantified by the actual amount of cleaner electricity consumed by a user account or the actual amount of dirtier electricity avoided. In other embodiments, the emissions savings may be quantified by the amount of clean electricity matching achieved by a user account, such as a measurement in kWh or any similar measurement of electricity. For example, as illustrated in FIG. 38, homepage 3800 may include clean electricity match value 3802 indicating the amount of cleaner electricity matched by a user account's participation in EDR events. In some embodiments, the impact may be quantified by the actual amount of carbon emission reduction, such as a measurement in lbs-$CO_2$/MWh. In some embodiments, the impact generated by a user account includes multiple periods of time. For example, the system may display an overall impact as well as the impact generated in the last month, week, day, or any other measure of time.

In some embodiments, the impact generated by a user account is represented in one or more graphical figures. For example, homepage 3800 may include status indicator ring 3804 illustrating an amount of carbon emissions saved out of a total amount of electricity consumed. Other graphical representations may be used instead of status indicator ring 3804. For example, any number of bar charts, line graphs, pie charts, or similar methods of graphically displaying data may be used. In some embodiments, the impact generated by a user account is quantified in more relatable terms. For example, homepage 3800 may include an icon 3806 depicting a recognizable image with an associated description relating the impact generated by avoiding carbon emissions by comparing the impact to an equivalent impact generated from some number of trees or acres in a forest. As another example, homepage 3800 may include additional descriptions, such as description 3808 indicating that the amount of electricity savings is the equivalent savings by replacing some number of gas cars with electric vehicles, or the amount of carbon emissions generated by one flight from New York to Los Angeles. Any other relatable measure may be used to quantify the amount of emissions savings generated by a user account's participation in EDR events.

Figure 39:
FIG. 39 illustrates an embodiment of a user interface indicating aggregate carbon emissions savings generated by a community.

FIG. 39 illustrates an embodiment of an indication of the collective impact on carbon emissions generated by a community. In some embodiments, the system will quantify the collective impact on carbon emissions generated by a community. By quantifying the impact generated by a community in a meaningful way, individual users can feel a greater sense of community and satisfaction by being a part of a larger cause. In some embodiments, the community may include every user account participating in EDR events. In other embodiments, the system may quantify the collective impact at other program levels, such as by region, by city, and/or by electricity production facility. In some embodiments, the collective impact generated by a community is displayed in a graphical user interface. For example, as illustrated in FIG. 39, various figures and data may be displayed on a website or a homepage 3900 of a user account. One or more of the same methods and interfaces as described in relation to FIG. 38, supra, may be used to quantify the collective impact on carbon emissions generated by a community of user accounts.

In some embodiments, the collective carbon emissions savings are quantified by the amount of cleaner electricity matching achieved throughout a community. For example, as illustrated in FIG. 39, homepage 3900 may include clean electricity match value 3902 indicating the amount of cleaner electricity matched by a community's participation in EDR events. In some embodiments, the collective carbon emissions savings are quantified and displayed in a more relatable manner. For example, homepage 3900 may include an icon 3904 with an associated description of the number of homes that could be powered by the amount of clean electricity matching generated by the program.

In some embodiments, information regarding local or regional clean electricity power plants is displayed. For example, homepage 3900 may include clean electricity output 3906 indicating the amount of clean electricity produced by local clean electricity power plants. In some embodiments, details for individual power plants are provided. For example, homepage 3900 may include one or more tiles 3908, 3910, and 3912 for individual clean electricity power plants that provide electricity to a local community. Any other relatable measure may be used to quantify the impact generated by a group or community of user accounts, such as those described in relation to FIG. 38, supra.

Figure 40:
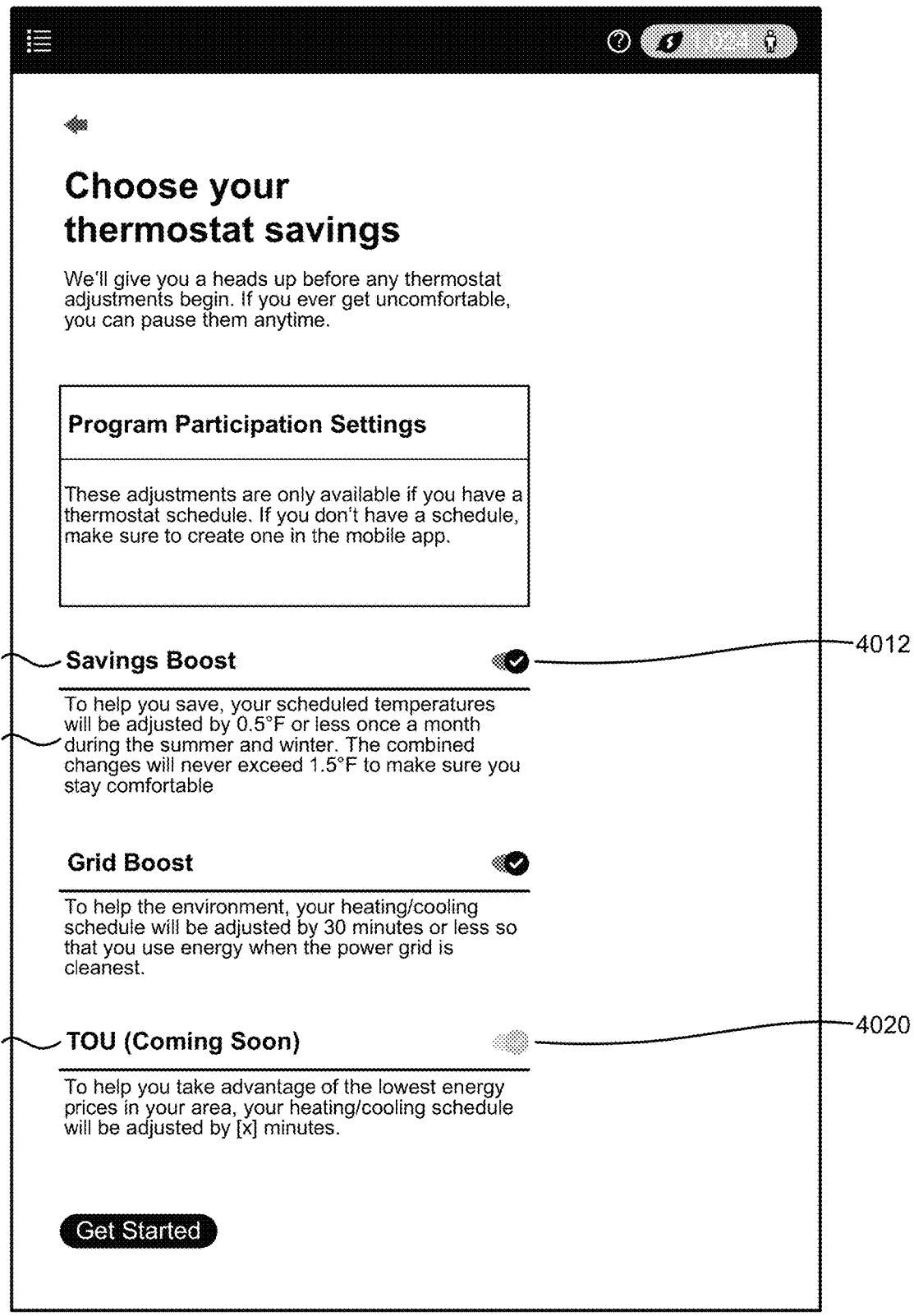
FIG. 40 illustrates an embodiment of a user interface indicating account settings for managing participation in emissions demand response events.

FIG. 40 illustrates an embodiment of a user interface indicating account settings for managing participation in emissions demand response events. In some embodiments, the system will generate EDR events for a thermostat associated with a user account based on one or more account settings. For example, as discussed in relation to FIGS. 26-30, supra, settings may specify the duration and magnitude of EDR events and/or a participation level in EDR event programs. In some embodiments, a user associated with the user account may specify one or more account settings. For example, a user may select a maximum event duration for all future EDR events. As another example, the user may select to participate in one or more programs offered by the system. In some embodiments, account settings will be accessible through one or more user interfaces. For example, as illustrated in FIG. 40, a user may access application interface 4000 on a personal device. As another example, account settings may be accessible through one or more webpages on the Internet. In some embodiments, a settings user interface may be displayed to a user upon creating an account. In other embodiments, a user will be able to access settings associated with their account at any time after creating the account in order to change or update their existing settings.

In some embodiments, a graphical user interface will display one or more settings associated with the generation of future EDR events. For example, as illustrated in FIG. 40, there may be one or more fields 4004 for each setting. In some embodiments, the user interface will include a description of the associated setting. For example each field 4004 may have an associated description 4008 describing how each particular setting will affect the generation of future EDR events and the participation of a thermostat associated with the user account. In some embodiments, the user interface will have one or more input controls allowing a user associated with a user account to specify a desired setting for each available setting. For example, field 4004 may be associated with toggle button 4012 allowing a user associated with an account to toggle the setting on or off. In other embodiments, the input control may be a drop down, a slider, a checkbox, a text field, a dialog box, or any other suitable input control. In some embodiments, the user interface will include fields for settings that are not yet available as a preview of new features currently in development. For example, field 4016 may be associated with a new setting or program that is not yet available, as indicated by greyed out toggle button 4020. In some embodiments, the graphical user interface will have an option for a user to save any changes made to the settings of the user account.

Figure 41A:
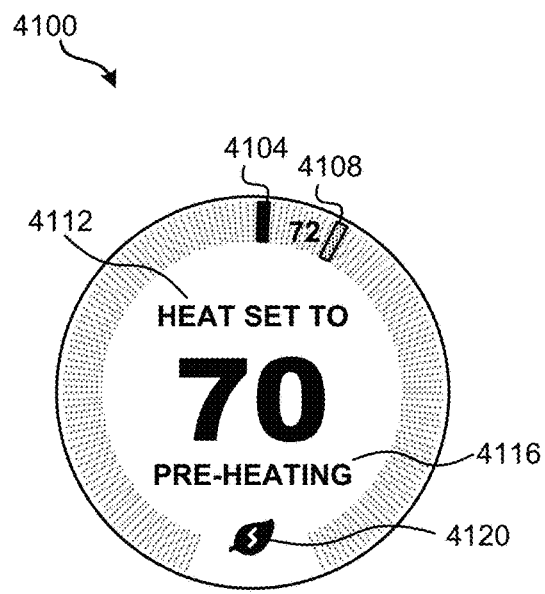
FIGS. 41A-D illustrate embodiments of a smart thermostat user interface.
Figure 41B:
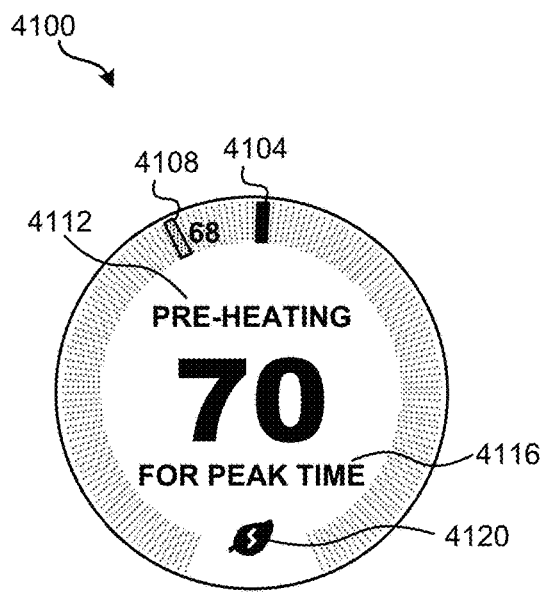

FIGS. 41A-D illustrate embodiments of a smart thermostat user interface. In some embodiments, a smart thermostat may indicate that it is about to control, or is already controlling, an HVAC system in accordance with a generated EDR event. For example, a smart thermostat may make a sound or alter a graphical display, such as electronic display 311, as discussed in relation to FIG. 3, supra. In some embodiments, a smart thermostat may indicate the setpoint temperature and current temperature in accordance with an EDR event. For example as illustrated in FIGS. 41A and 41B, smart thermostat display 4100 may indicate setpoint temperature 4104 and current temperature 4108 as marks on a dial. In other embodiments, the setpoint temperature and current temperature may be represented as text, digits, or any suitable method of indicating the temperature. In some embodiments, a smart thermostat display will include text describing the current operation of the thermostat in accordance with the generated EDR event. For example, smart thermostat display 4100 may include one or more text boxes 4112 and 4116 indicating the current operation of the thermostat. As illustrated in FIGS. 41A and 41B, text boxes 4112 and 4116 may indicate that the smart thermostat is preconditioning the environment in advance of an EDR event by increasing the temperature before the temperature is reduced by an EDR event.

Figure 41C:
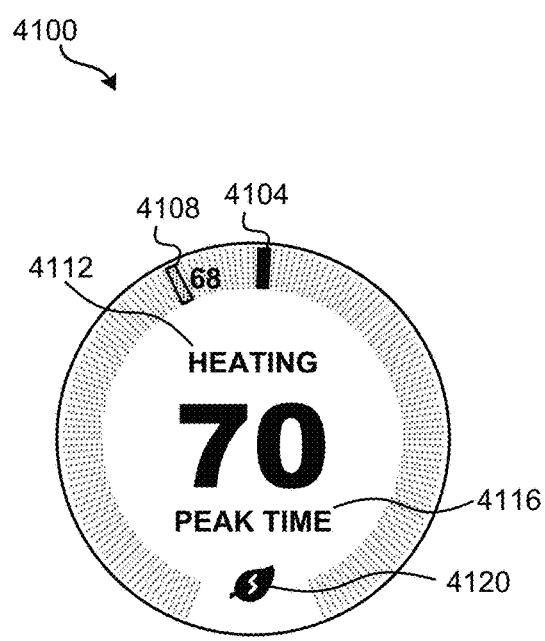
Figure 41D:
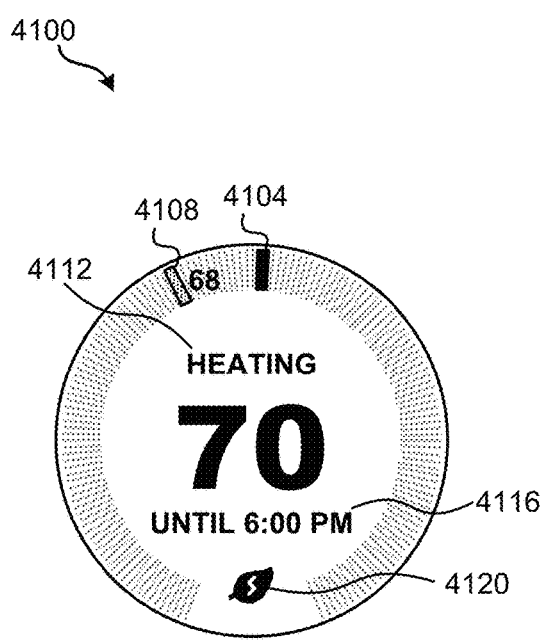

In some embodiments, the smart thermostat display will change depending on the current operation of the smart thermostat in accordance with an EDR event. For example, as illustrated in FIG. 41A and indicated by text box 4112, the thermostat may be in an idle mode allowing the temperature in the environment to increase without the use of an HVAC system. As another example, as illustrated in FIG. 41B and indicated by text box 4112, the smart thermostat may be actively controlling an HVAC system to increase the temperature in the environment prior to an EDR event. In some embodiments, the smart thermostat display will scroll or loop text to display additional information that could not otherwise fit on the display at the same time. For example, as illustrated in FIGS. 41C and D, text box 4116 may loop between text indicating the current mode and the time at which the mode is expected to change.

In some embodiments, the smart thermostat display will include additional indications that the thermostat is operating in accordance with an EDR event. For example, as illustrated in FIGS. 41A-D, icon 4120 may include a symbol associated with EDR events. By including a recognizable symbol, the smart thermostat may quickly and easily inform a user operating the smart thermostat that the smart thermostat is currently operating in accordance with an EDR event. In some embodiments, one or more features of smart thermostat displayed 4100 can be presented remotely on a computerized device such as a smart phone. For example, as described below in relation to FIG. 42, supra, a mobile device associated with the user account linked to a smart thermostat, such as mobile device 140 as described in relation to FIGS. 1-3, supra, may display some or all of the same features displayed on the smart thermostat itself.

Figure 42:
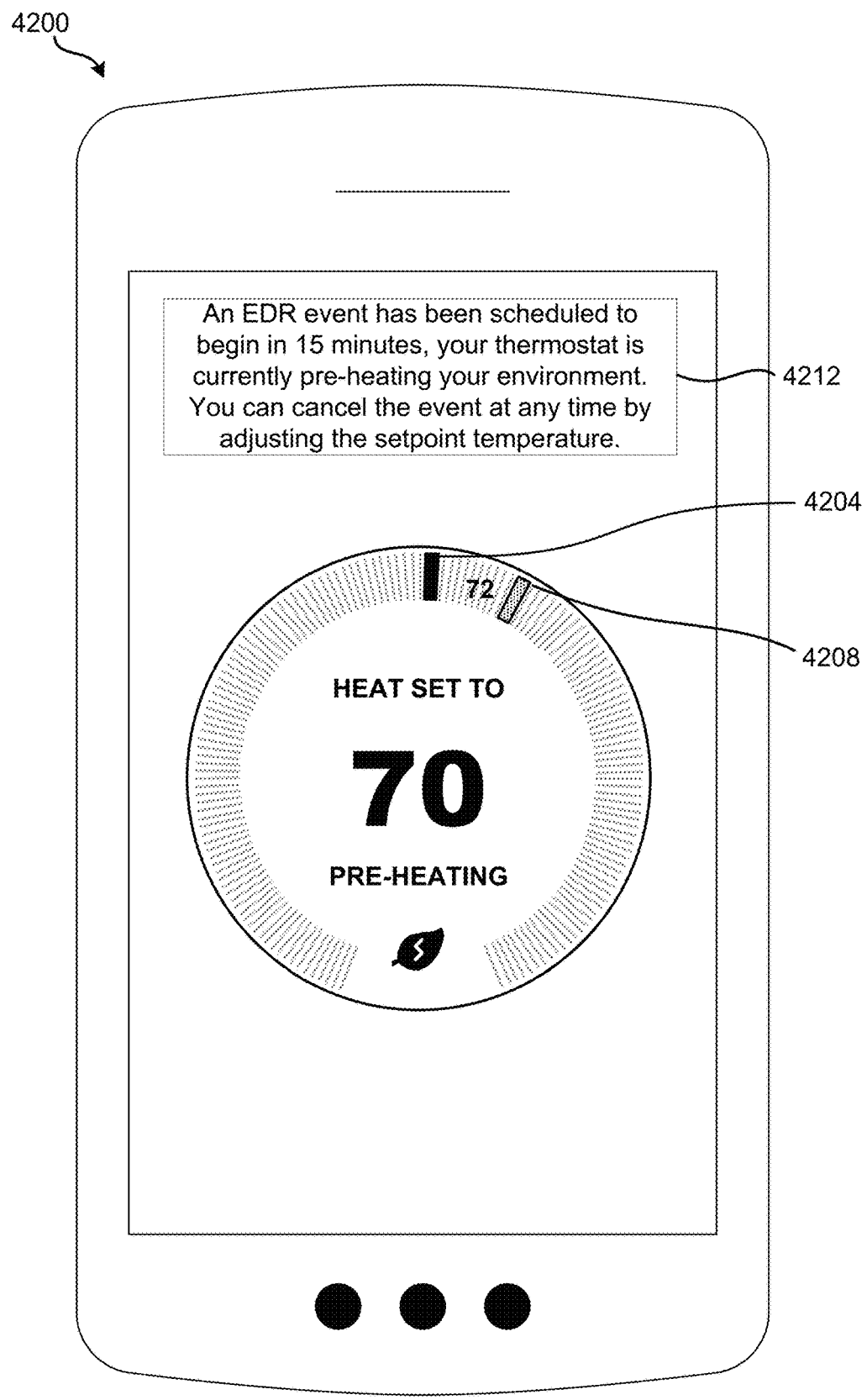
FIG. 42 illustrates an embodiment of a personal device interface for managing EDR events.

FIG. 42 illustrates an embodiment of a personal device interface for managing EDR events. In some embodiments, the system may notify user associated with the user account that a thermostat associated with the user account is operating in accordance with a generated EDR event. For example, the system may send a notification to a mobile device, such as mobile device 140 as described in relation to FIGS. 1-3, supra. In some embodiments, the status of a smart thermostat associated with a user account may be viewed from a mobile device or personal computer associated with the user account. For example, as illustrated in FIG. 42, an application running on mobile device for 4200 may indicate setpoint temperature 4204 and current temperature 4208 for the environment in which the smart thermostat is controlling an HVAC system. In some embodiments, the mobile device will display the same information accessible from the display of the smart thermostat, as described in relation to FIGS. 41A-D, supra.

In some embodiments, the system will send notification to a mobile device associated with the user account indicating that a thermostat linked with the user account is about to control an HVAC system in accordance with an EDR event. For example, as illustrated in FIG. 42, an application running on mobile device 4200 may receive an indication from the system that an EDR event is about to begin, and display banner notification 4212 to a user of the mobile device. In other embodiments, an application running on the mobile device may use a pop-up dialog, a badge, an alert, or any other suitable notification method to alert a user that a thermostat associated with the user's account will be controlling an HVAC system in accordance with the generated EDR event.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known, processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for performing an emissions demand response event, the method comprising:
    obtaining, by a cloud-based HVAC control server system, a history of emissions rates;
    identifying, by the cloud-based HVAC control server system, based on the history of emissions rates, a future time period of predicted high emissions, wherein identifying the future time period of predicted high emissions comprises:
        determining that average emissions for the future time period are predicted to be greater than average emissions for a longer duration period of time that comprises the future time period;
    determining, by the cloud-based HVAC control server system, from a plurality of emissions demand response event participation levels, an emissions demand response event participation level of an account associated with a thermostat that is applicable for the future time period of predicted high emissions;
    generating, by the cloud-based HVAC control server system, based on the emissions demand response event participation level of the account, an emissions demand response event to occur within the future time period of predicted high emissions; and
    causing, by the cloud-based HVAC control server system, the thermostat associated with the account to control an HVAC system in accordance with the generated emissions demand response event.

2. The method for performing the emissions demand response event of claim 1, wherein:
    the plurality of emissions demand response event participation levels comprises a first participation level and a second participation level; and
    the second participation level causes a greater amount of emissions savings than the first participation level.

3. The method for performing the emissions demand response event of claim 2, wherein determining the emissions demand response event participation level of the account further comprises:
    outputting a request for a selection between the first participation level and the second participation level;
    receiving, in response to the request, a selection from the first participation level and the second participation level for the future time period of predicted high emissions; and
    storing an indication of the selection of the first participation level or the second participation level for the future time period of predicted high emissions.

4. The method for performing the emissions demand response event of claim 2, wherein a predefined maximum number of events per day is greater for the second participation level than the first participation level, and generating the emissions demand response event further comprises:
    determining that the emissions demand response event participation level of the account is set to the second participation level;
    determining that a number of previously generated emissions demand response events is fewer than the predefined maximum number of events per day; and
    wherein causing the thermostat associated with the account to control an HVAC system in accordance with the generated emissions demand response event is at least partially based on the determination that the number of previously generated emissions demand response events is fewer than the predefined maximum number of events per day.

5. The method for performing the emissions demand response event of claim 2, wherein a predefined maximum event duration is longer for the second participation level than the first participation level, and generating the emissions demand response event further comprises:
    determining that the emissions demand response event participation level of the account is set to the second participation level; and
    increasing a duration of the generated emissions demand response event in response to determining that the emissions demand response event participation level of the account is set to the second participation level.

6. The method for performing the emissions demand response event of claim 2, wherein causing the thermostat associated with the account to control the HVAC system in accordance with the emissions demand response event comprises adjusting a setpoint temperature of the thermostat, and generating the emissions demand response event further comprises:
    determining that the emissions demand response event participation level of the account is set to the second participation level; and
    increasing an adjustment to the setpoint temperature of the thermostat in response to determining that the emissions demand response event participation level of the account is set to the second participation level.

7. The method for performing the emissions demand response event of claim 1, wherein causing the thermostat associated with the account to control the HVAC system in accordance with the emissions demand response event comprises adjusting a setpoint temperature of the thermostat, the method further comprising:
    receiving, after adjusting the setpoint temperature, an adjustment to the setpoint temperature in an opposite direction; and
    causing the thermostat to stop controlling the HVAC system in accordance with the emissions demand response event.

8. The method for performing the emissions demand response event of claim 1, wherein causing the thermostat associated with the account to control the HVAC system in accordance with the emissions demand response event comprises adjusting a setpoint temperature of the thermostat, the method further comprising:

receiving, after adjusting the setpoint temperature, an adjustment to the setpoint temperature in an opposite direction; and modifying, based on the adjustment, the emissions demand response event participation level of the account mapped to the thermostat.

9. The method for performing the emissions demand response event of claim 8, wherein modifying the emissions demand response event participation level of the account associated with the thermostat comprises reducing a predefined maximum number of events per day.

10. The method for performing the emissions demand response event of claim 8, wherein modifying the emissions demand response event participation level of the account associated with the thermostat comprises reducing a predefined maximum event duration.

11. The method for performing the emissions demand response event of claim 1, wherein modifying the emissions demand response event participation level of the account associated with the thermostat comprises reducing a predefined maximum setpoint adjustment.

12. The method for performing the emissions demand response event of claim 1, the method further comprising:

obtaining, a weather forecast for a predefined future time period, and wherein identifying the future time period of predicted high emissions is further based on the weather forecast.

13. The method for performing the emissions demand response event of claim 1, wherein generating the emissions demand response event further comprises determining an energy price during the future time period of predicted high emissions, wherein the emissions demand response event participation level of the account associated with the thermostat is based on the energy price.

14. A system for performing an emissions demand response event, the system comprising:

a cloud-based power control server system, comprising:
one or more processors; and
a memory communicatively coupled with and readable by the one or more processors and having stored therein processor-readable instructions which, when executed by the one or more processors, cause the one or more processors to:
obtain a history of emissions rates;
identify, based on the history of emissions rates, a future time period of predicted high emissions, wherein identifying the future time period of predicted high emissions comprises:
determining that average emissions for the future time period are predicted to be greater than average emissions for a longer duration period of time that comprises the future time period;
determine from a plurality of emissions demand response event participation levels, an emissions demand response event participation level of an account associated with a thermostat that is applicable for the future time period of predicted high emissions;
generate based on the emissions demand response event participation level of the account, an emissions demand response event to occur within the future time period of predicted high emissions; and
cause the thermostat associated with the account to control an HVAC system in accordance with the generated emissions demand response event.

15. The system for performing an emissions demand response event of claim 14, further comprising a plurality of thermostats, the plurality of thermostats comprising the thermostat.

16. The system for performing an emissions demand response event of claim 14, further comprising an application executed on a mobile device, the application configured to control the thermostat via communication with the cloud-based power control server system.

17. The system for performing an emissions demand response event of claim 14, wherein:

the plurality of emissions demand response event participation levels comprises a first participation level and a second participation level;
a predefined maximum event duration is longer for the second participation level than the first participation level; and
the processor-readable instructions, when executed, further cause the one or more processors to generate the emissions demand response event by:
determining that the emissions demand response event participation level of the account is set to the second participation level; and
increasing a duration of the generated emissions demand response event in response to determining that the emissions demand response event participation level of the account is set to the second participation level.

18. A non-transitory processor-readable medium, comprising processor-readable instructions configured to cause one or more processors to:

obtain a history of emissions rates;
identify, based on the history of emissions rates, a future time period of predicted high emissions, wherein identifying the future time period of predicted high emissions comprises:
determining that average emissions for the future time period are predicted to be greater than average emissions for a longer duration period of time that comprises the future time period;
determine from a plurality of emissions demand response event participation levels, an emissions demand response event participation level of an account associated with a thermostat that is applicable for the future time period of predicted high emissions;
generate based on the emissions demand response event participation level of the account, an emissions demand response event to occur within the future time period of predicted high emissions; and
cause the thermostat associated with the account to control an HVAC system in accordance with the generated emissions demand response event.

19. The non-transitory processor-readable medium of claim 18, wherein causing the thermostat associated with the account to control the HVAC system in accordance with the emissions demand response event comprises adjusting a setpoint temperature of the thermostat, and the processor-readable instructions are further configured to:

receive, after adjusting the setpoint temperature, an adjustment to the setpoint temperature in an opposite direction; and
modify, based on the adjustment, the emissions demand response event participation level of the account associated with the thermostat.

20. The method for performing the emissions demand response event of claim 1, wherein generating the emissions demand response event comprises:

receiving an emissions rate forecast for a portion of the future time period of predicted high emission;

determining, using the emissions rate forecast, an emissions differential value at each of a plurality of points in time during the portion of the future time period, thereby creating a plurality of emissions differential values;

selecting, based on a comparison of the plurality of emissions differential values, a first point in time from the plurality of points in time associated with a first emissions differential value of the plurality of emissions differential values; and scheduling the emissions demand response event to start or stop at the first point in time.

* * * * *